United States Patent
Uehara

(10) Patent No.: US 10,732,767 B2
(45) Date of Patent: Aug. 4, 2020

(54) DETECTION DEVICE, DISPLAY DEVICE, AND DETECTION METHOD

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 531 days.

(21) Appl. No.: 15/464,588

(22) Filed: Mar. 21, 2017

(65) Prior Publication Data

US 2017/0285865 A1 Oct. 5, 2017

(30) Foreign Application Priority Data

Mar. 31, 2016 (JP) .................. 2016-070361

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ............................... G06F 3/0418; G06F 3/044
See application file for complete search history.

(56) References Cited

U.S. PATENT DOCUMENTS

| | | | |
|---|---|---|---|
| 9,904,407 B2 * | 2/2018 | Hong | G06F 3/0416 |
| 2010/0328257 A1 | 12/2010 | Noguchi et al. | |
| 2011/0074732 A1 | 3/2011 | Reynolds | |
| 2011/0148785 A1 | 6/2011 | Oda et al. | |
| 2012/0075240 A1 * | 3/2012 | Kida | G06F 3/044 345/174 |
| 2013/0082763 A1 * | 4/2013 | Inada | G01L 1/146 327/517 |
| 2014/0062907 A1 * | 3/2014 | Kim | G06F 3/038 345/173 |
| 2014/0292709 A1 | 10/2014 | Mizuhashi et al. | |
| 2016/0188097 A1 * | 6/2016 | Shin | G06F 3/0416 345/173 |
| 2016/0291784 A1 * | 10/2016 | Zhai | G06F 3/0416 |
| 2017/0147141 A1 * | 5/2017 | Khazeni | G06F 3/0418 |

FOREIGN PATENT DOCUMENTS

| | | |
|---|---|---|
| CN | 101937295 A | 1/2011 |
| JP | 09-292950 A | 11/1997 |
| JP | 3281256 B2 | 2/2002 |
| JP | 2014-199605 A | 10/2014 |

OTHER PUBLICATIONS

Chinese Office Action dated Jul. 15, 2019 for corresponding Chinese Application No. 2017-10198717.5.

* cited by examiner

*Primary Examiner* — Antonio Xavier
(74) *Attorney, Agent, or Firm* — Michael Best & Friedrich LLP

(57) ABSTRACT

Provided is a detection device including at least one first electrode group that includes a plurality of first electrodes. The first electrode outputs a detection signal. A selection driver is configured to perform a first driving during a first period and a second driving during a second period, which is different from the first period.

19 Claims, 30 Drawing Sheets

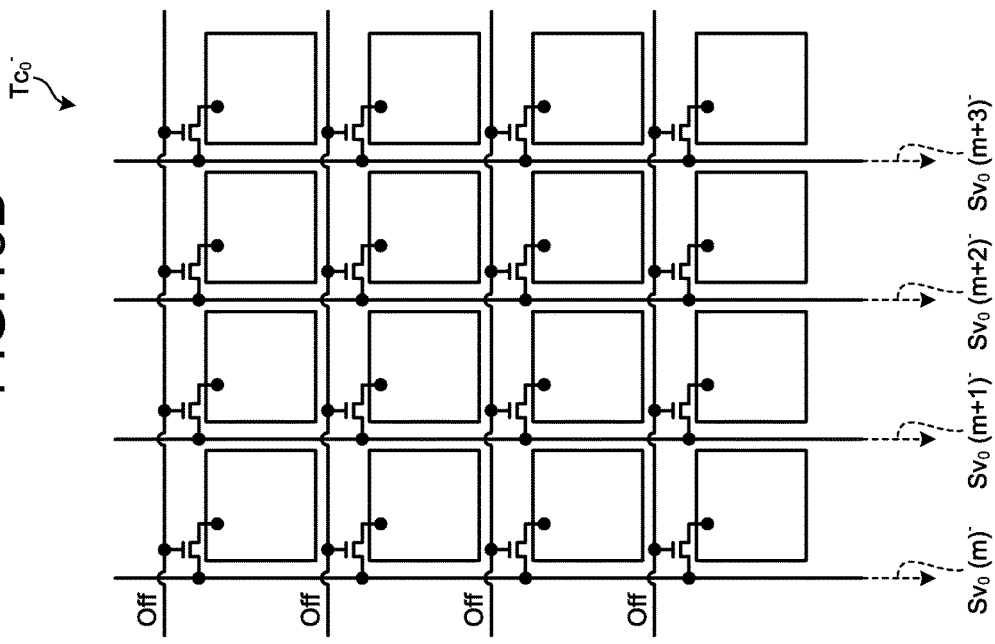
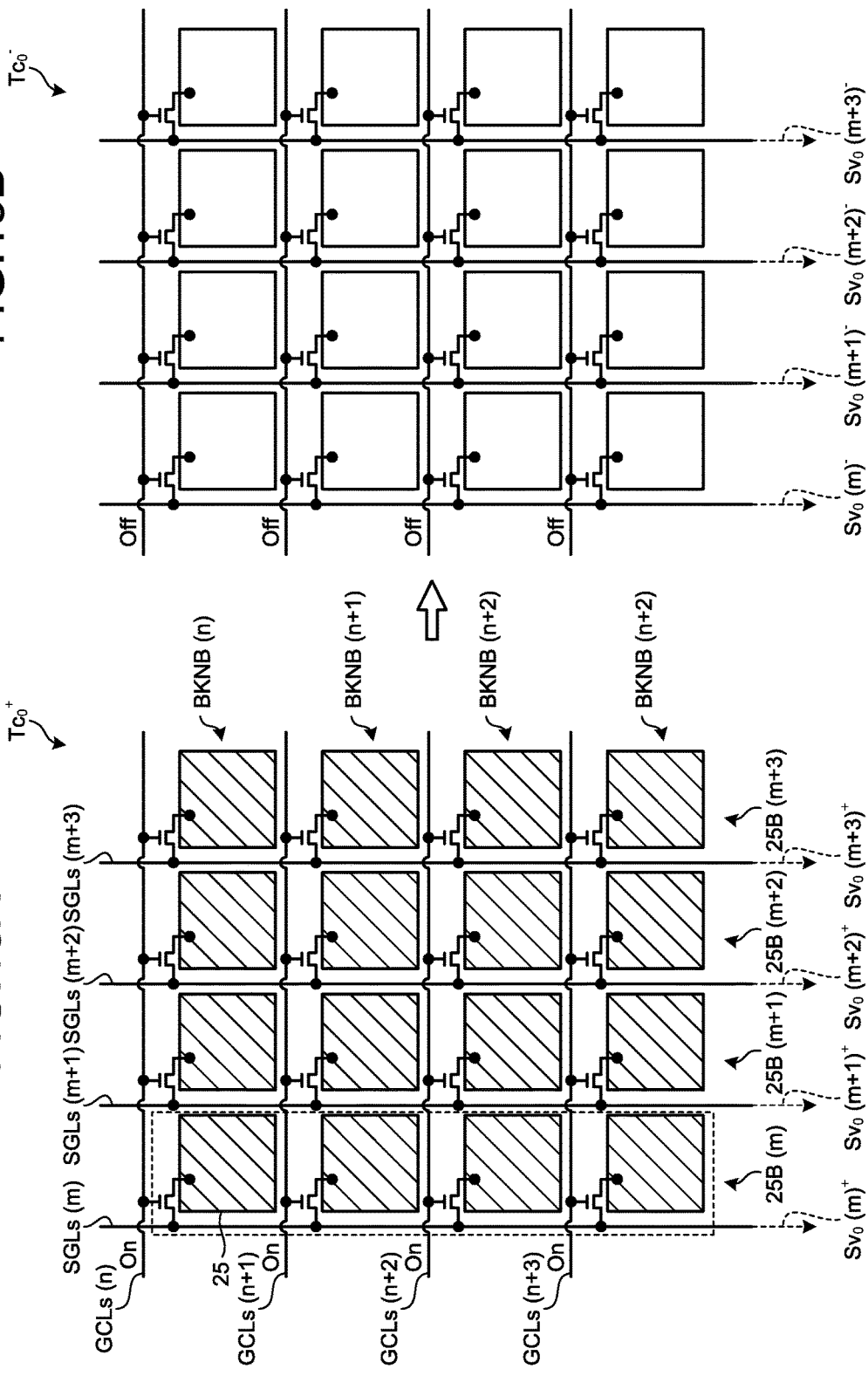
FIG.13B
FIG.13A

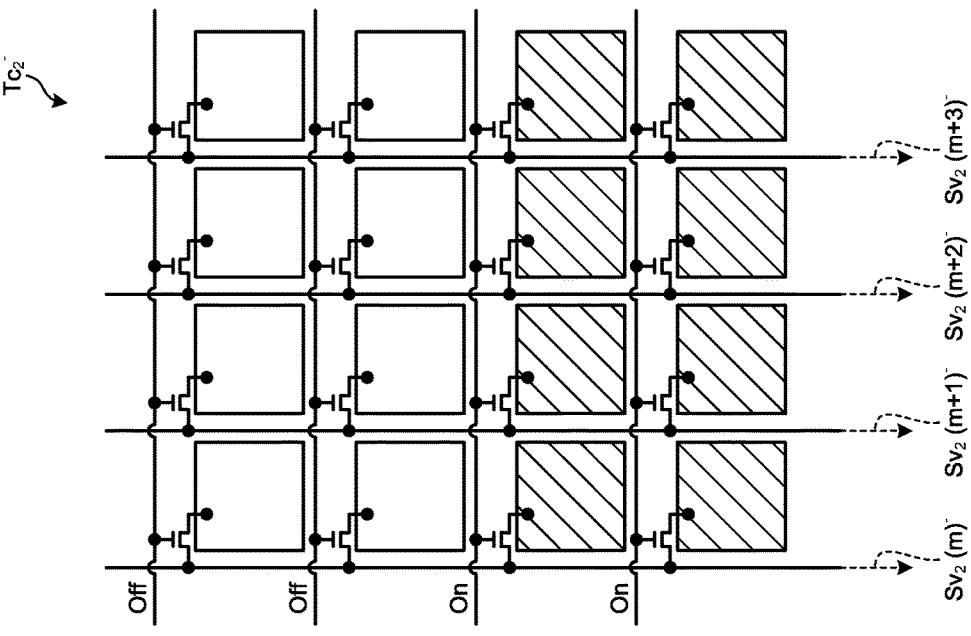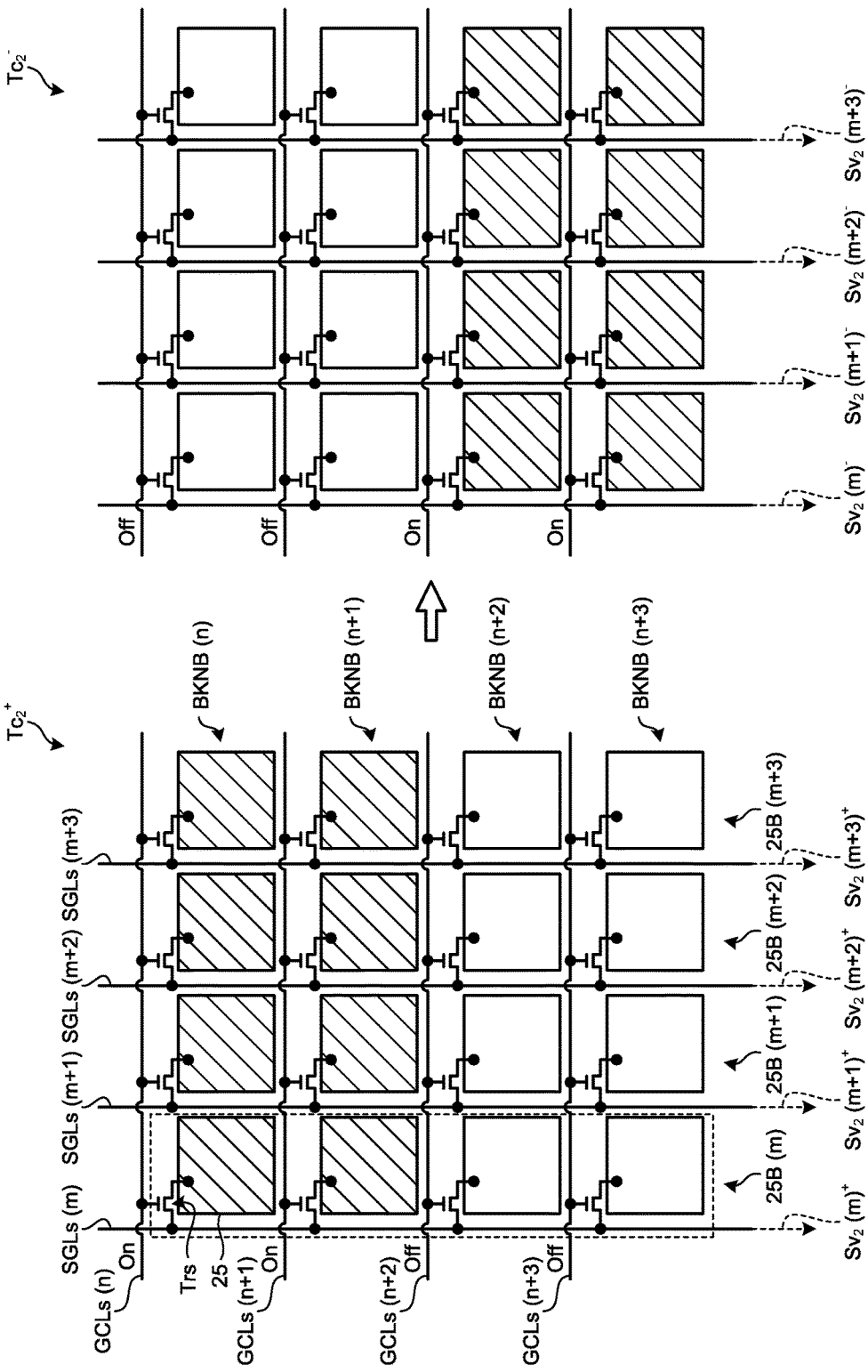

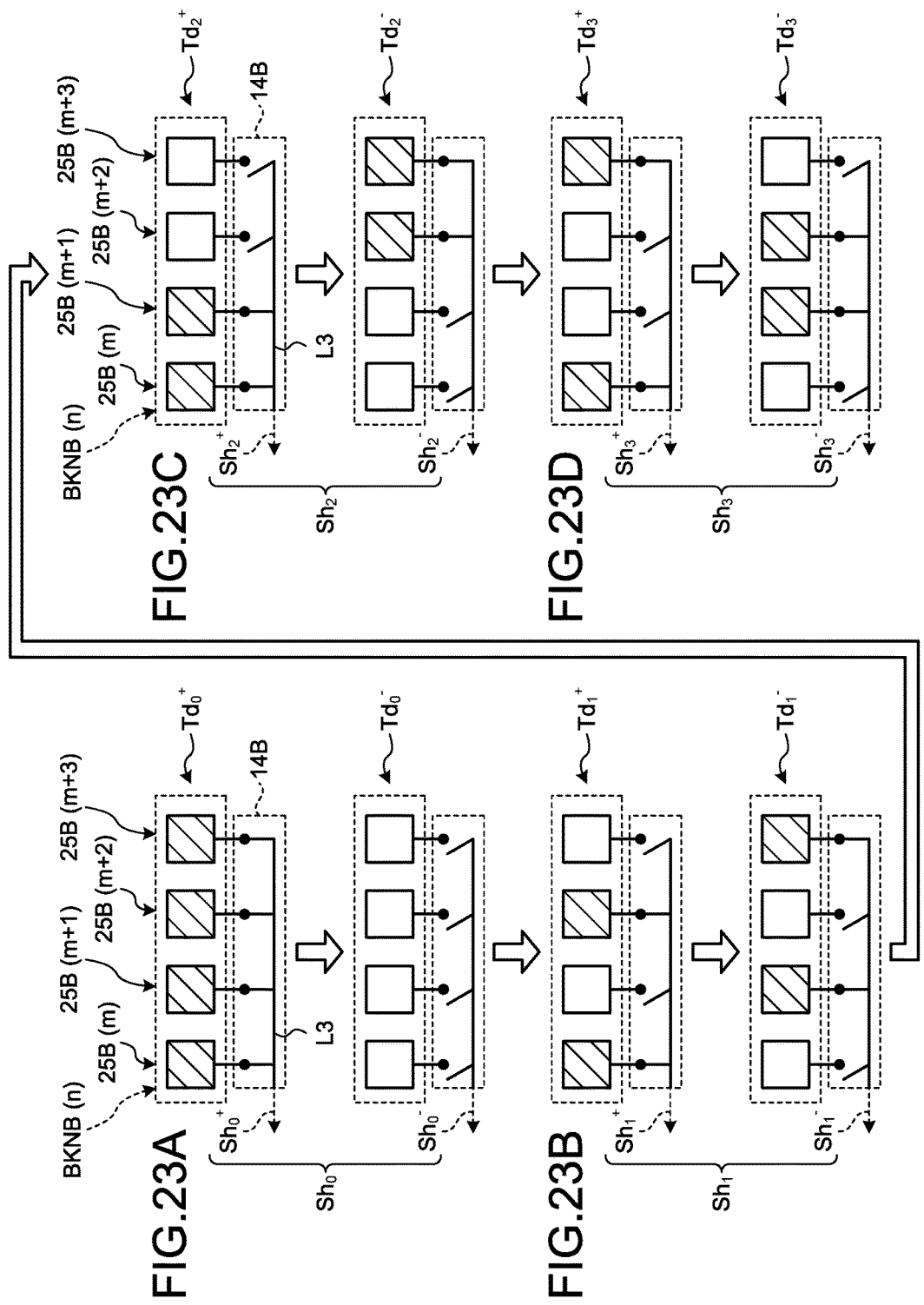

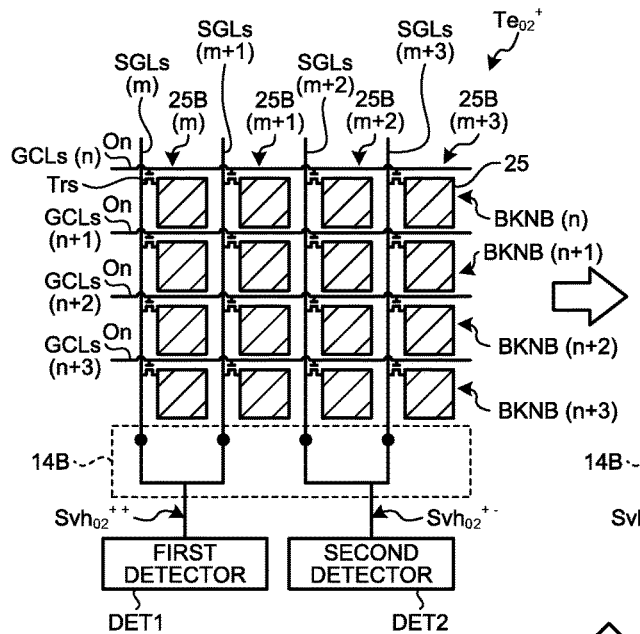
FIG.25A
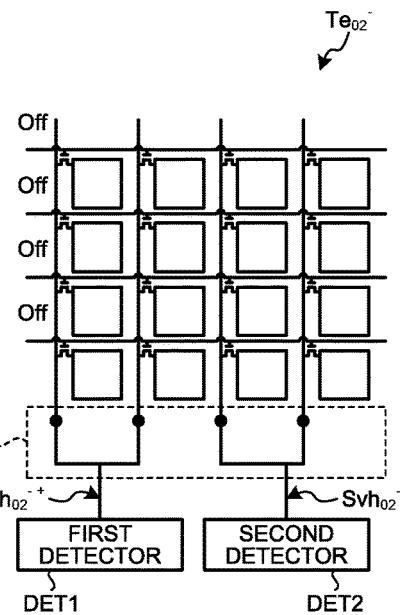
FIG.25B
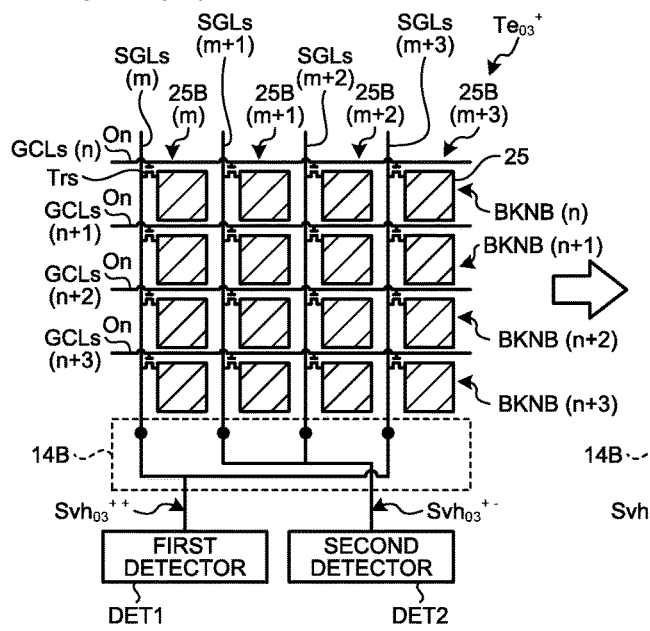
FIG.25C
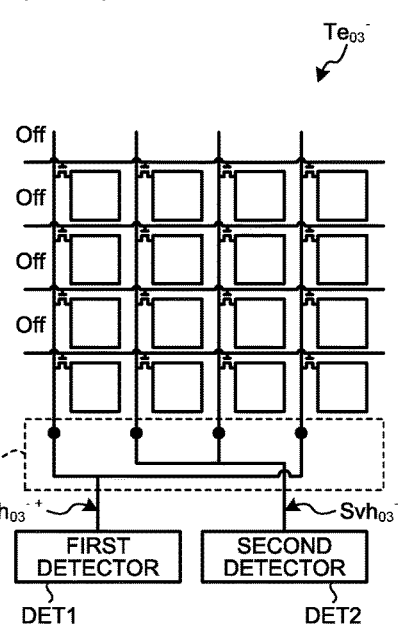
FIG.25D
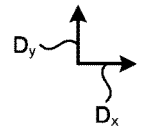

FIG.28A
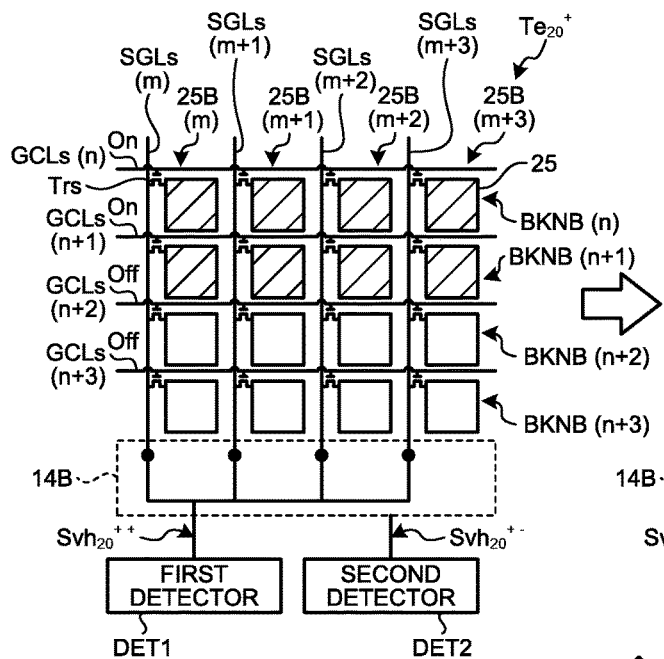
FIG.28B
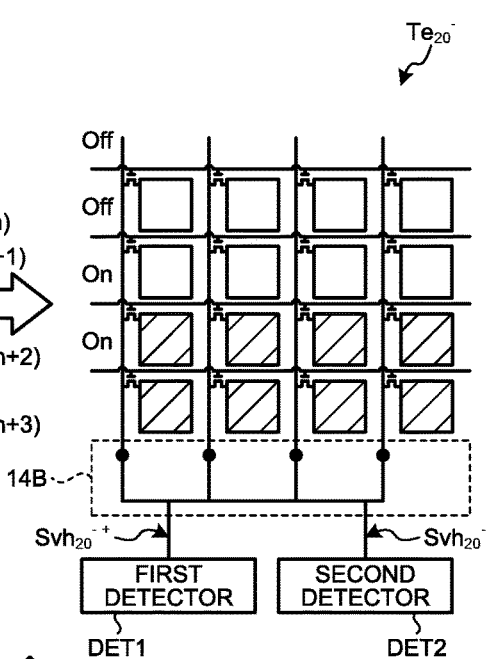
FIG.28C
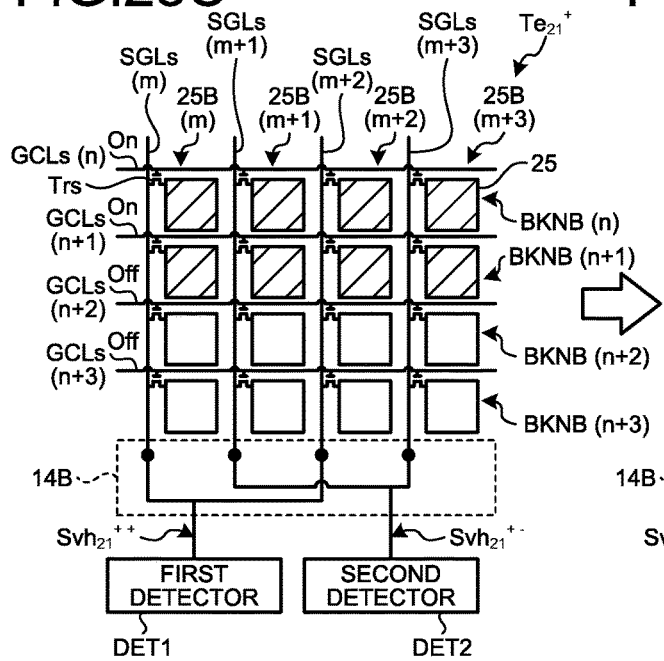
FIG.28D
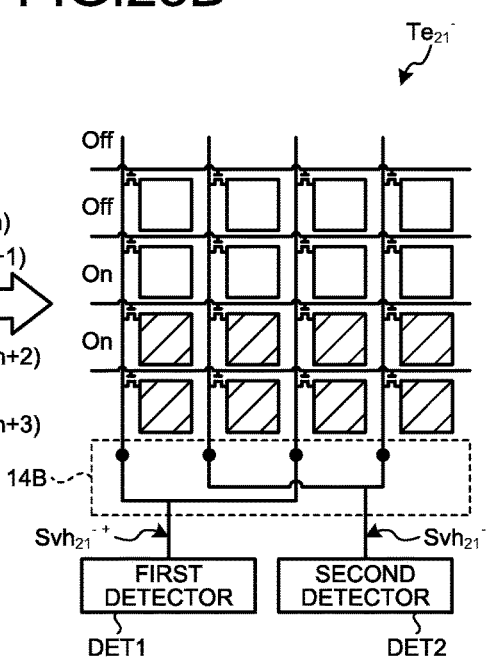
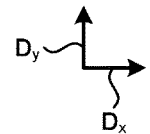

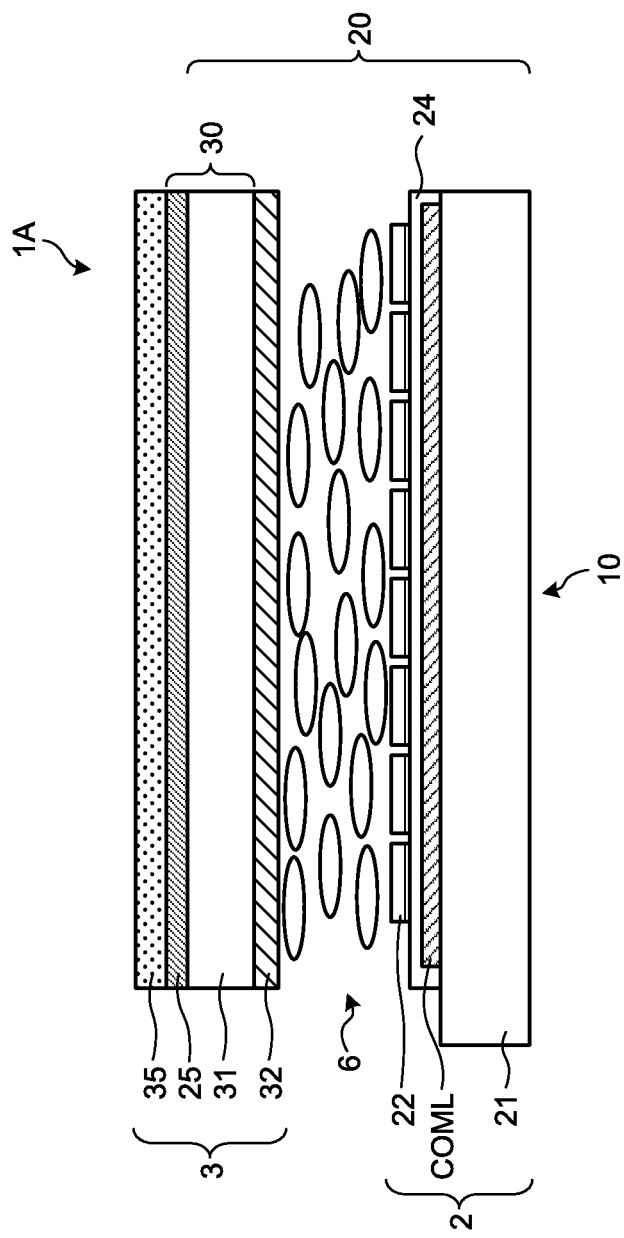

DETECTION DEVICE, DISPLAY DEVICE, AND DETECTION METHOD

CROSS-REFERENCE TO RELATED APPLICATIONS

This application claims priority from Japanese Application No. 2016-070361, filed on Mar. 31, 2016, the contents of which are incorporated by reference herein in its entirety.

BACKGROUND

1. Technical Field

The present invention relates to a detection device, a display device, and a detection method.

2. Description of the Related Art

In recent years, detection devices capable of detecting an external proximity object that are called touch panels have attracted attention. The touch panel is mounted on or formed integrally with a display device such as a liquid crystal display device and used as a display device. In such a detection device, code division selection driving in which a plurality of drive electrodes are simultaneously selected, a drive signal whose phase is decided based on a predetermined code is supplied to each of a plurality of selected drive electrodes, and detection of an external proximity object is performed is known (see Japanese Patent Application Laid-open Publication No. 2014-199605).

However, unlike the mutual-capacitance scheme, in the self-capacitance scheme in which detection of an external proximity object is performed based on capacitance of a detection electrode, when drive signals of different phases are supplied to a plurality of detection electrodes, capacitive coupling between the detection electrodes increases, and thus detection sensitivity may be lowered.

For the foregoing reasons, there is a need for providing a detection device, a display device, and a detection method, which are capable of excellent detection sensitivity by suppressing capacitive coupling between electrodes.

SUMMARY

According to an aspect, a detection device includes at least one first electrode group that includes a plurality of first electrodes, the first electrode outputting a detection signal, and a selection driver configured to perform a first driving during a first period and a second driving during a second period, which is different from the first period. The selection driver is configured to, during the first driving, select a plurality of first detection electrodes from the first electrode group in accordance with a first selection signal, and output a plurality of first integrated signals, the first integrated signal being an integrated value of a plurality of first detection signals, and each of the first detection signals being output by the first detection electrodes on a one-to-one basis. The selection driver is configured to, during the second driving, select a plurality of second detection electrodes from the first electrode group in accordance with a second selection signal, the second detection electrodes being different from the first detection electrodes, and the second selection signal being different from the first selection signal, and output a plurality of second integrated signals, the second integrated signal being an integrated value of a plurality of second detection signals, and each of the second detection signals being output by the second detection electrodes on a one-to-one basis.

According to an aspect, a display device includes a display function layer that displays an image, at least one first electrode group that includes a plurality of first electrodes, the first electrode outputting a detection signal, and a selection driver configured to perform a first driving during a first period and a second driving during a second period which is different from the first period. The selection driver is configured to, during the first driving, select a plurality of first detection electrodes from the first electrode group according to a first selection signal, and output a plurality of first integrated signals, the first integrated signal being an integrated value of a plurality of first detection signals, and each of the first detection signals being output by the first detection electrodes on a one-to-one basis. The selection driver is configured to, during the second driving, select a plurality of second detection electrodes from the first electrode group in accordance with a second selection signal, the second detection electrodes being different from the first detection electrodes, and the second selection signal being different from the first selection signal, and output a plurality of second integrated signals, the second integrated signal being an integrated value of a plurality of second detection signals, and each of the second detection signals being output by the second detection electrodes on a one-to-one basis.

According to an aspect, a detection method of a detection device includes at least one first electrode group that includes a plurality of first electrodes, the first electrode outputting a detection signal, and a selection driver configured to perform a first driving during a first period and a second driving during a second period, which is different from the first period. The detection method includes the steps of, during the first driving, selecting a plurality of first detection electrodes from the first electrode group according to a first selection signal, and outputting a plurality of first integrated signals, the first integrated signal being an integrated value of a plurality of first detection signals, and each of the first detection signals being output by the first detection electrodes on a one-to-one basis, and during the second driving, selecting a plurality of second detection electrodes from the first electrode group in accordance with a second selection signal, the second detection electrodes being different from the first detection electrodes, and the second selection signal being different from the first selection signal, and outputting a plurality of second integrated signals, the second integrated signal being an integrated value of a plurality of second detection signals, and each of the second detection signals being output by the second detection electrodes on a one-to-one basis.

BRIEF DESCRIPTION OF THE DRAWINGS

FIGS. 13A and 13B are schematic diagrams for describing an exemplary operation of code division selection driving of a detector according to the first embodiment;

FIGS. 14A and 14B are schematic diagrams for describing an exemplary operation of code division selection driving of a detector according to the first embodiment;

FIGS. 23A to 23D are explanatory diagrams for describing a selection pattern of first electrodes selected as a detection target according to a fourth embodiment;

FIGS. 25A to 25D are explanatory diagrams for describing an example of a selection pattern of first electrodes selected as a detection target in third and fourth detection operations;

FIGS. 28A to 28D are explanatory diagrams for describing an example of a selection pattern of first electrodes selected as a detection target in ninth and tenth detection operations;

FIG. 32 is a cross-sectional view illustrating a schematic cross-sectional structure of a display device according to the fourth embodiment.

DETAILED DESCRIPTION

Figure 1:
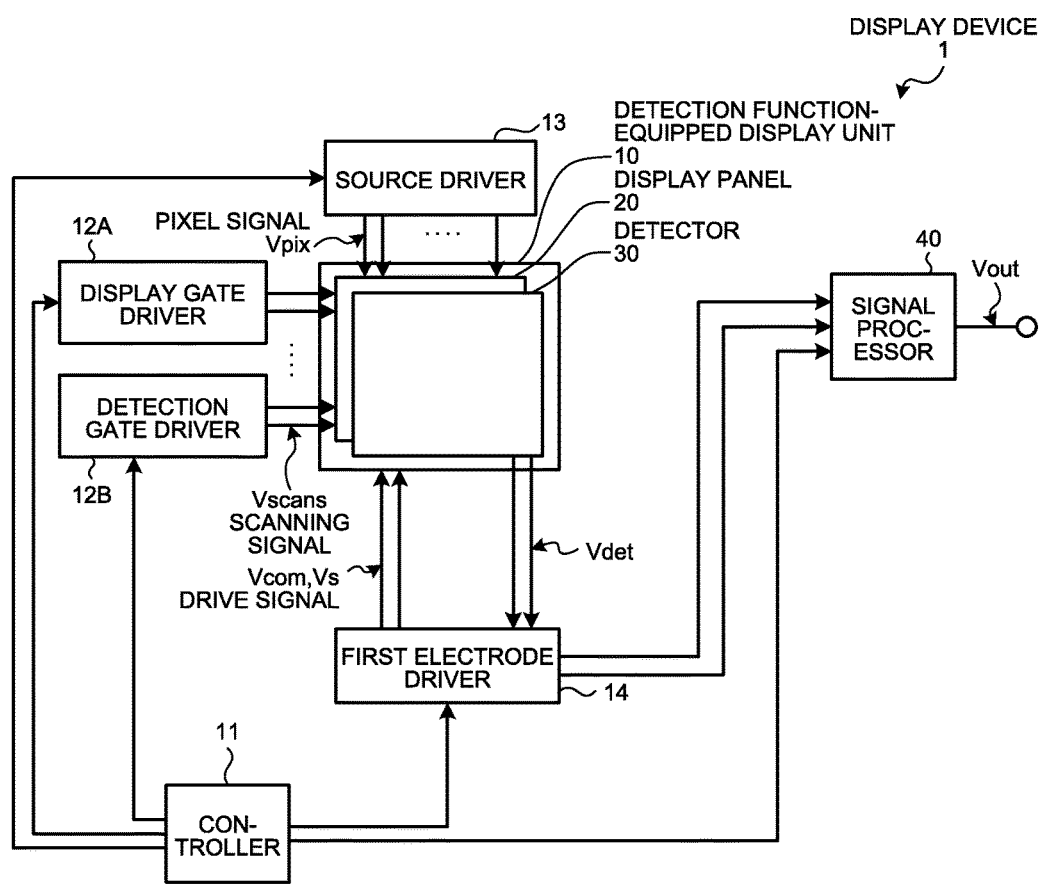
FIG. 1 is a block diagram illustrating an exemplary configuration of a display device according to a first embodiment.

Hereinafter, modes (embodiments) for carrying the present invention will be described in detail with reference to the appended drawings. The present invention is not limited by a description of the following embodiments. Further, components to be described below include ones which can be easily assumed by those having skill in the art and ones which are substantially the same. Further, components to be described below may be appropriately combined. The disclosure is merely an example, and it should be noted that an appropriate change which is made without departing from the gist of the invention but can be easily derived by those having skill in the art is included in the scope of the present invention. Further, in the drawings, in order to further clarify a description, a width, a thickness, a shape, and the like of each component are schematically illustrated compared to an actual form, but they are merely an example and not intended to limit interpretation of the present invention. In addition, in this specification and the drawings, the same components as those in the drawings which are already described are denoted by the same reference numerals, and a detailed description will be appropriately omitted.

First Embodiment

FIG. 1 is a block diagram illustrating an exemplary configuration of a display device according to the first embodiment. A display device 1 includes a detection function-equipped display unit 10, a controller 11, a display gate driver 12A, a detection gate driver 12B, a source driver 13, a first electrode driver 14, and a signal processor 40 as illustrated in FIG. 1. The display device 1 is a display device is a display device in which the detection function-equipped display unit 10 has a detection function therein. The detection function-equipped display unit 10 is a device in which a display panel 20 using a liquid crystal display element as a display element is integrated with a detector 30 serving as a detection device that detects a touch input. For example, the device in which the display panel 20 is integrated with the detector 30 indicates that a part of a substrate or an electrode used in the display panel 20 or the detector 30 is shared. The detection function-equipped display unit 10 may be any on cell type device in which the detector 30 is mounted on the display panel 20. For example, the display panel 20 may be an organic EL display panel. At least, the detection gate driver 12B and the first electrode driver 14 correspond to a selection driver.

As will be described later, the display panel 20 is a display device that sequentially scans horizontal lines one by one according to a scanning signal Vscan supplied from the display gate driver 12A and performs display.

The controller 11 is a circuit that supplies a control signal to the display gate driver 12A, the detection gate driver 12B, the source driver 13, the first electrode driver 14, and the signal processor 40, respectively based on a video signal supplied from the outside, and performs control such that the display gate driver 12A, the detection gate driver 12B, the source driver 13, the first electrode driver 14, and the signal processor 40 operate in synchronization or non-synchronization with one another.

The display gate driver 12A has a function of sequentially selecting one horizontal line serving as a display driving target of the detection function-equipped display unit 10 based on the control signal supplied from the controller 11. The detection gate driver 12B has a function of outputting the scanning signal Vscans for detection based on the control signal supplied from the controller 11 and selecting a first electrode 25 serving as a detection target among a plurality of first electrodes 25 (which will be described later) of the detector 30.

The source driver 13 is a circuit that supplies a pixel signal Vpix to each sub pixel SPix (which will be described later) of the detection function-equipped display unit 10 based on the control signal supplied from the controller 11. The controller 11 may generate the pixel signal Vpix and supply the pixel signal Vpix to the source driver 13.

The first electrode driver 14 is a circuit that supplies a detection drive signal Vs or a display drive signal Vcom to the first electrode 25 in the detection function-equipped display unit 10 based on the control signal supplied from the controller 11.

The detector 30 operates based on a basic principle of capacitance type touch detection, performs a touch detection operation according to the self-capacitance scheme, and detects touch or approach of an external conductor. When the touch or the approach of the external conductor is detected, the detector 30 outputs a detection signal Vdet.

Figure 2:
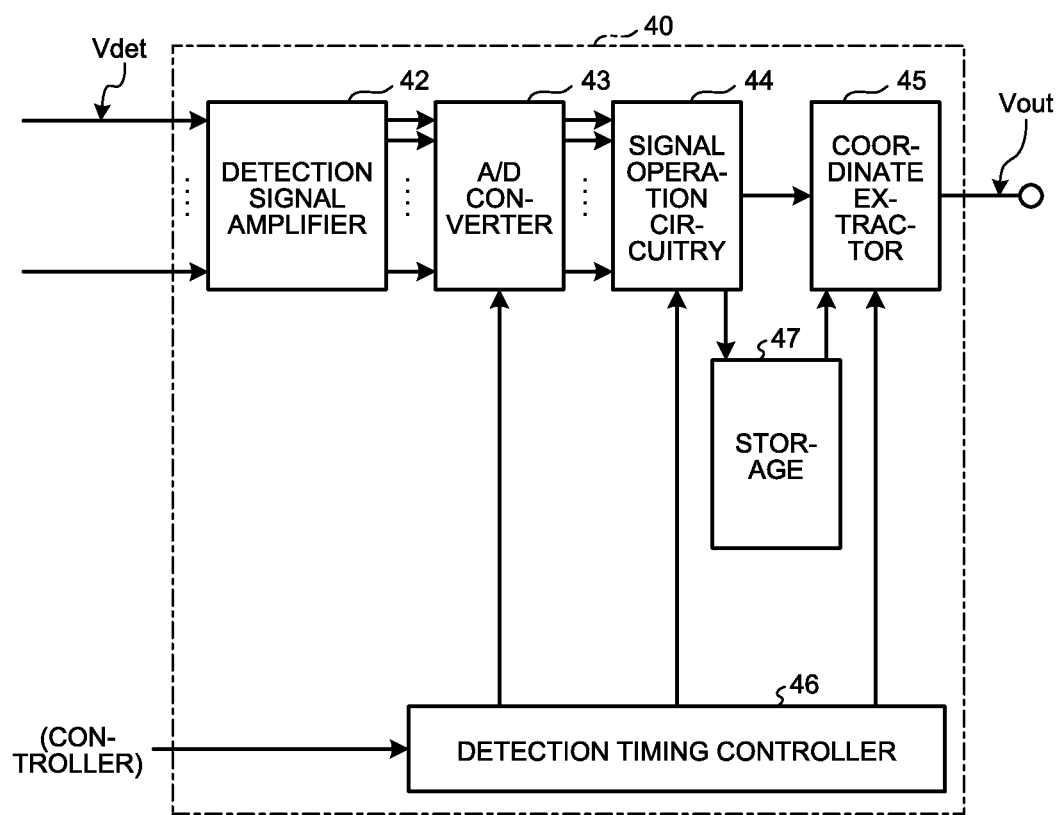
FIG. 2 is a block diagram illustrating an exemplary configuration of a signal processor.

FIG. 2 is a block diagram illustrating an exemplary configuration of the signal processor. The signal processor 40 is a circuit that detects the presence or absence of touch on the detector 30 based on the control signal supplied from the controller 11 and the detection signal Vdet supplied from the detector 30. When there is touch, the signal processor 40 obtains coordinates or the like at which a touch input is performed. The signal processor 40 includes a detection signal amplifier 42, an A/D converter 43, a signal operation circuitry 44, a coordinate extractor 45, and a storage 47. A detection timing controller 46 performs control such that the A/D converter 43, the signal operation circuitry 44, and the coordinate extractor 45 operate in synchronization with one another based on the control signal supplied from the controller 11.

Figure 3:
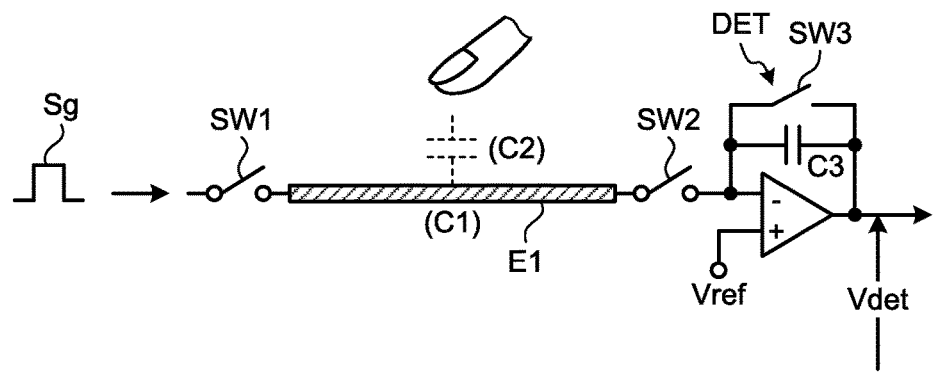
FIG. 3 is an explanatory diagram illustrating a state in which a finger touches or approaches to describe a basic principle of touch detection of a self-capacitance scheme.
Figure 4:
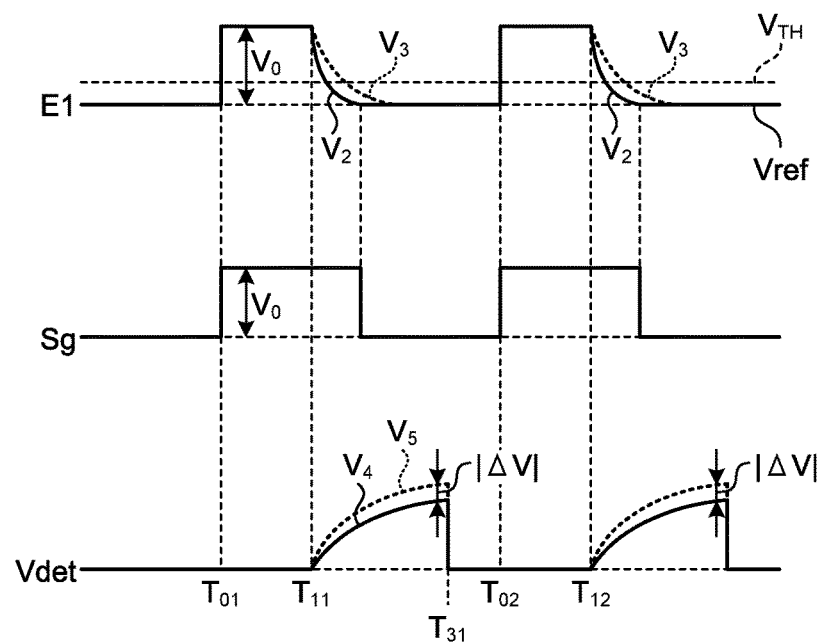
FIG. 4 is a diagram illustrating an example of waveforms of a detection drive signal and a touch detection signal of touch detection of a self-capacitance scheme.

As described above, the detector 30 operates based on the basic principle of the capacitance type touch detection. Here, the basic principle of the touch detection of the self-capacitance scheme will be described with reference to FIGS. 3 and 4. FIG. 3 is an explanatory diagram for describing the basic principle of the touch detection of the self-capacitance scheme. FIG. 4 is a diagram illustrating an example of waveforms of a detection drive signal and a touch detection signal of the touch detection of the self-capacitance scheme. FIG. 3 illustrates a detection circuit together.

In a state in which a finger neither touches nor approaches, an alternate current (AC) rectangular wave Sg of a predetermined frequency (for example, several kHz to several hundred kHz) is applied to a detection electrode E1. The detection electrode E1 has a capacitance C1, and an electric current according to the capacitance C1 flows to the detection electrode E1. A voltage detector DET converts a variation in an electric current according to the AC rectangular wave Sg into a variation in a voltage (a waveform $V_4$ of a solid line (see FIG. 4)). For example, the voltage detector DET is an integration circuit that included in the detection signal amplifier 42 illustrated in FIG. 2.

Then, in a state in the finger touches or approaches, a capacitance C2 between the finger and the detection electrode E1 is added to the capacitance C1 of the detection electrode E1 as illustrated in FIG. 3. Thus, when the AC rectangular wave Sg is applied to the detection electrode E1, an electric current according to the capacitance C1 and the capacitance C2 flows. The voltage detector DET converts a variation in an electric current according to the AC rectangular wave Sg into a variation in a voltage (a waveform $V_5$ of a dotted line) as illustrated in FIG. 4. Then, voltage values of the waveform $V_4$ and the waveform $V_5$ which are obtained are respectively integrated, and it is determined whether or not the finger touches or approaches the detection electrode E1 by comparing these values. The signal processor 40 is not limited thereto and may compare the voltage values without integrating them. In FIG. 4, a method of obtaining periods taken until a waveform $V_2$ and a waveform $V_3$ are lowered to a predetermined reference voltage $V_{TH}$ and comparing the periods may be used.

Specifically, the detection electrode E1 is configured to be separated by a switch SW1 and a switch SW2 as illustrated in FIG. 3. In FIG. 4, at a timing of a time $T_{01}$, the AC rectangular wave Sg is increased to a voltage level corresponding to a voltage $V_0$. At this time, the switch SW1 is turned on, and the switch SW2 is turned off. For this reason, the voltage of the detection electrode E1 is increased to the voltage $V_0$. Then, before a timing of a time $T_{11}$, the switch SW1 is turned off. At this time, the detection electrode E1 is in the floating state, but a potential $V_0$ of the detection electrode E1 is maintained due to the capacitance C1 of the detection electrode E1 or the capacitance C1+C2 (see FIG. 3) obtained by adding the capacitance C2 caused by the touch or the approach of the finger or the like to the capacitance C1 of the detection electrode E1. Further, before the timing of the time $T_{11}$, the switch SW3 is turned on and then turned off after a predetermined period of time elapses, and thus the voltage detector DET is reset. Through the reset operation, an output voltage becomes substantially equal to Vref.

Then, at the timing of the time $T_{11}$, when the switch SW2 is turned on, an inverting input portion of the voltage detector DET becomes the voltage $V_0$ of the detection electrode E1, and then the inverting input portion of the voltage detector DET is lowered to the reference voltage Vref according to time constants of the capacitance C1 (or C1+C2) of the detection electrode E1 and a capacitance C3 in the voltage detector DET. At this time, electric charges accumulated in the capacitance C1 (or C1+C2) of the detection electrode E1 move to the capacitance C3 of the voltage detector DET, and thus the output of the voltage detector DET is increased (Vdet). When the finger or the like does not approach the detection electrode E1, the output (Vdet) of the voltage detector DET is the waveform $V_4$ indicated by a solid line and becomes Vdet=C1·$V_0$/C3. When the capacitance is added due to influence of the finger or the like, the output (Vdet) of the voltage detector DET is the waveform $V_5$ indicated by a dotted line and becomes Vdet=(C1+C2)·$V_0$/C3.

Thereafter, after the electric charges of the capacitance C1 (or C1+C2) of the detection electrode E1 sufficiently move to the capacitance C3, at a timing of a time $T_{31}$, the switch SW2 is turned off, and the switch SW1 and the switch SW3 are turned on, and thus the potential of the detection electrode E1 becomes the low level of the same potential as the AC rectangular wave Sg, and the voltage detector DET is reset at the same time. At this time, the switch SW1 may be turned on at any timing before a time $T_{02}$ after the switch SW2 is turned off. The voltage detector DET may be reset at any timing before a time $T_{12}$ after the switch SW2 is turned off.

The above operation is repeated at a predetermined frequency (for example, several kHz to several hundred kHz). It is possible to measure the presence or absence of an external proximity object (the presence or absence of touch) based on an absolute value |ΔV| of a difference between the waveform $V_4$ and the waveform $V_5$. As illustrated in FIG. 4, the potential of the detection electrode E1 is the waveform $V_2$ when the finger or the like does not approach and the waveform $V_3$ when the capacitance C2 is added due to influence of the finger or the like. It is possible to measure periods of time taken until the waveform $V_2$ and the waveform $V_3$ are lowered to the predetermined reference voltage $V_{TH}$ and measure the presence or absence of an external proximity object (the presence or absence of touch).

The detection signal amplifier 42 illustrated in FIG. 2 amplifies the detection signal Vdet supplied from the detector 30. The detection signal amplifier 42 may include an analog low pass filter (LPF) that removes a high frequency component (a noise component) included in the detection signal Vdet and outputs a result.

The A/D converter 43 samples an analog signal output from the detection signal amplifier 42 at a timing synchronized with the detection drive signal Vs, thereby converting the sampled analog signal into a digital signal.

The signal operation circuitry 44 includes a digital filter that reduces a frequency component (a noise component) included in an output signal of the A/D converter 43 other than a frequency at which the detection drive signal Vs is sampled. The signal operation circuitry 44 is a logic circuit that detects the presence or absence of touch on the detector 30 based on the output signal of the A/D converter 43. The signal operation circuitry 44 performs a process of extracting only a difference of a detection signal by the finger. A signal of the difference by the finger is an absolute value |ΔV| of a difference between the waveform $V_4$ and the waveform $V_5$. The signal operation circuitry 44 compares the detected signal of the difference by the finger with a predetermined threshold voltage and determines it to be a state in which the external proximity object does not contact when the detected signal of the difference by the finger is less than the threshold voltage. On the other hand, the signal operation circuitry 44 compares the detected signal of the difference by the finger with a predetermined threshold voltage and determines it to be a state in which the external proximity object contacts when the detected signal of the difference by the finger is the threshold voltage or more. Accordingly, the signal processor 40 can perform the touch detection. As will be described later, the signal operation circuitry 44 receives the detection signal from a detection electrode block 25B serving as a detection target, and performs an operation process based on a predetermined code. A calculated output signal is temporarily stored in the storage 47. Examples of the storage 47 include random access memory (RAM), read only memory (ROM), and a register circuit.

The coordinate extractor 45 is a logic circuit that obtains touch panel coordinates when the touch is detected through the signal operation circuitry 44. The coordinate extractor 45 receives the output signal stored in the storage 47, and performs a decoding process based on a predetermined code. The coordinate extractor 45 calculates the touch panel coordinates based on decoded information, and outputs the obtained touch panel coordinates as a detection signal output Vout. As described above, the display device 1 of the present embodiment can detect touch panel coordinates of a position at which the conductor such as the finger touches or approaches based on the basic principle of the touch detection by the self-capacitance scheme.

Figure 5:
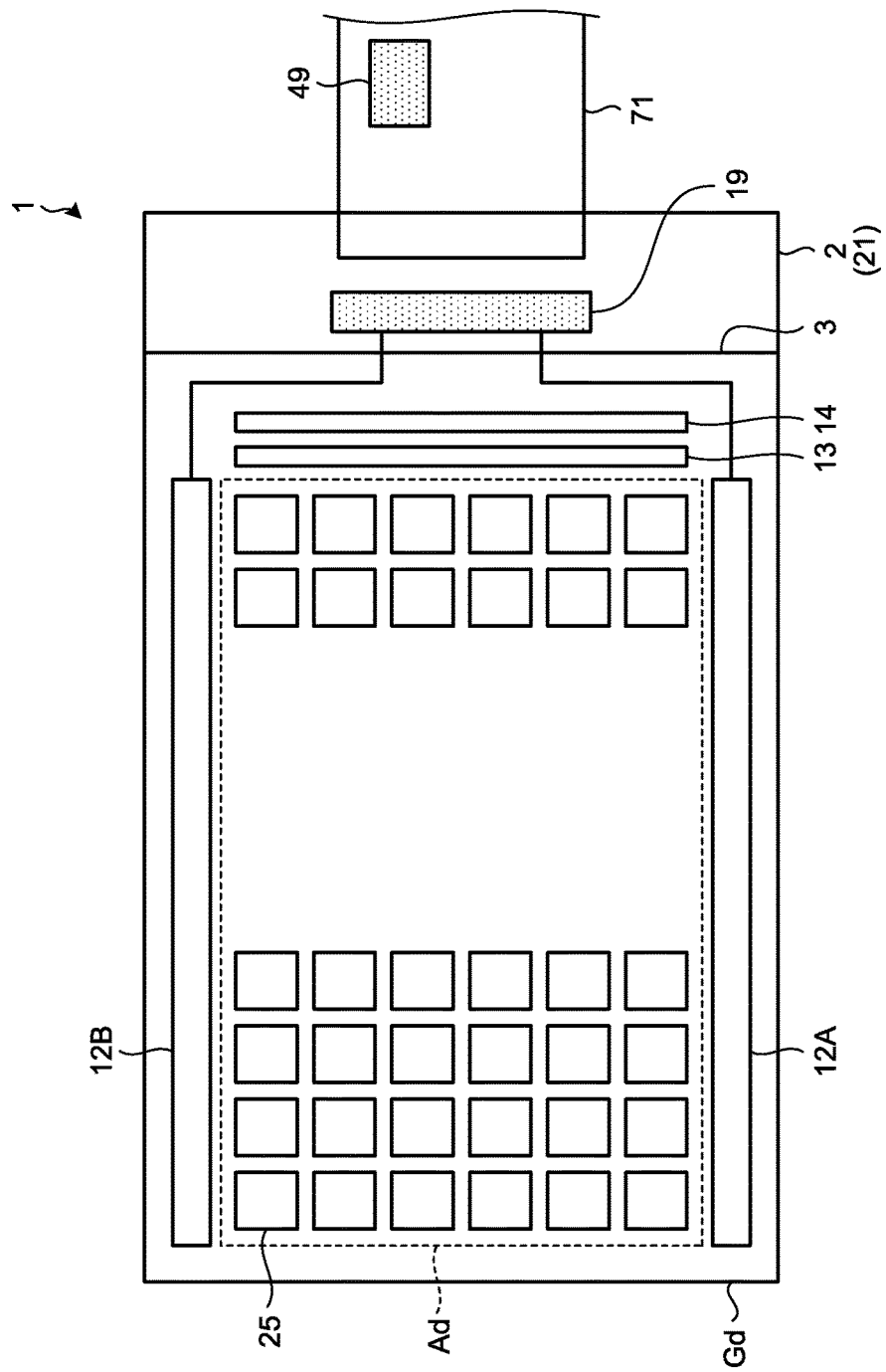
FIG. 5 is a diagram illustrating an example of a module in which a display device is mounted.

FIG. 5 is a diagram illustrating an example of a module equipped with the display device. The display device 1 includes a pixel substrate 2 (a first substrate 21) which will be described later and a printed circuit board 71 as illustrated in FIG. 5. For example, the printed circuit board 71 is a flexible printed circuit board. On the pixel substrate 2 (the first substrate 21), a first semiconductor integrated circuit (a first IC) 19, for example, a chip on glass (COG) is mounted, and a display region Ad of the display panel 20 and a frame region Gd which is a region outside the display region Ad are formed. The first semiconductor integrated circuit (the first IC) 19 is a chip of an IC driver mounted on the first substrate 21, that is, a control device which functions as the controller 11 illustrated in FIG. 1 and includes circuits therein which are necessary for a display operation. In the present embodiment, the display gate driver 12A, the detection gate driver 12B, the source driver 13, and the first electrode driver 14 are formed on the first substrate 21. The source driver 13 may be installed in the first semiconductor integrated circuit (the first IC) 19. Further, in the display device 1, the circuits such as the first electrode driver 14, the display gate driver 12A, the detection gate driver 12B may be installed in the first semiconductor integrated circuit (the first IC) 19. The COG is merely an implementation example, and the present invention is not limited thereto. For example, a component having the same function as the first semiconductor integrated circuit (the first IC) 19 may be installed through a chip on film or a chip on flexible (COF).

A plurality of first electrodes 25 are formed in a matrix form at a position overlapping the display region Ad of the first substrate 21 as illustrated in FIG. 5. The first electrode 25 has a rectangular shape, and a plurality of first electrodes 25 are arranged in directions along long and short sides of the display region Ad. The first electrode 25 is described as having a rectangular shape, but the present invention is not limited thereto, and the first electrode 25 may have any other shape. For example, the first electrode 25 may have a polygonal shape or a comb-tooth shape. The detection drive signal Vs is supplied to each of the first electrodes 25 by the first electrode driver 14. Each of the first electrodes 25 is coupled with a second semiconductor integrated circuit (the second IC) 49 mounted on the printed circuit board 71 via the printed circuit board 71. The second semiconductor integrated circuit (the second IC) 49 functions as the signal processor 40 illustrated in FIG. 1. The detection signal Vdet of each of the first electrodes 25 is output to the second semiconductor integrated circuit (the second IC) 49 via the printed circuit board 71. The first electrode 25 is respectively coupled to the second semiconductor integrated circuit (the second IC) 49, but the present invention is not limited thereto. For example, the first semiconductor integrated circuit (the first IC) 19 may be provided with the function of the signal processor 40, and the first electrodes 25 may be respectively coupled to the first semiconductor integrated circuit (the first IC) 19.

The printed circuit board 71 is not limited to a flexible printed circuit board and may be a rigid substrate or a rigid flexible substrate. The second semiconductor integrated circuit (the second IC) 49 may not be mounted on the printed circuit board 71 and may be mounted on a control substrate coupled via the printed circuit board 71 outside the module or the first substrate 21. In the present embodiment, the second semiconductor integrated circuit (the second IC) 49 is a touch driver IC mounted on the printed circuit board 71, but some functions of the signal processor 40 may be provided to serve as the first semiconductor integrated circuit (the first IC) 19 or any other MPU. Specifically, some functions (for example, noise reduction and the like) among various kinds of functions such as A/D conversion and noise reduction which can be provided as the function of the touch driver IC may be implemented through a circuit such as the first semiconductor integrated circuit (the first IC) 19 or the MPU which is installed separately from the touch driver IC. The signal operation circuitry 44, the coordinate extractor 45, and the storage 47 illustrated in FIG. 2 may be included in the first semiconductor integrated circuit (the first IC) 19, an external MPU, or the like. Further, for example, when the first semiconductor integrated circuit (the first IC) 19 and the second semiconductor integrated circuit (the second IC) 49 are implemented as one IC (a one-chip configuration), the detection signal may be transferred to the first semiconductor integrated circuit (the first IC) 19 on the first substrate 21 via, for example, a wire on the first substrate 21, a wire of the printed circuit board 71, or the like.

The source driver 13 is formed near the display region Ad on the first substrate 21. A plurality of sub pixels SPix which will be described later are arranged on the display region Ad in a matrix form. The frame region Gd is a region in which the sub pixel SPix is not arranged when the surface of the first substrate 21 is viewed in a vertical direction.

The display gate driver 12A, the detection gate driver 12B, and the first electrode driver 14 may be formed on the frame region Gd of the first substrate 21 using a thin film transistor (TFT) element. In the present embodiment, the two circuits of the display gate driver 12A and the detection gate driver 12B are installed, but the present invention is not limited thereto, and they may be implemented through, for example, one circuit installed on one side of the frame region Gd. The first electrode driver 14 is installed on one side of the frame region Gd on which the printed circuit board 71 is arranged, but the present invention is not limited thereto, and the first electrode driver 14 may be installed near the display gate driver 12A or the detection gate driver 12B. The first electrode driver 14 is configured with one circuit, but may be configured with two circuits.

Figure 6:
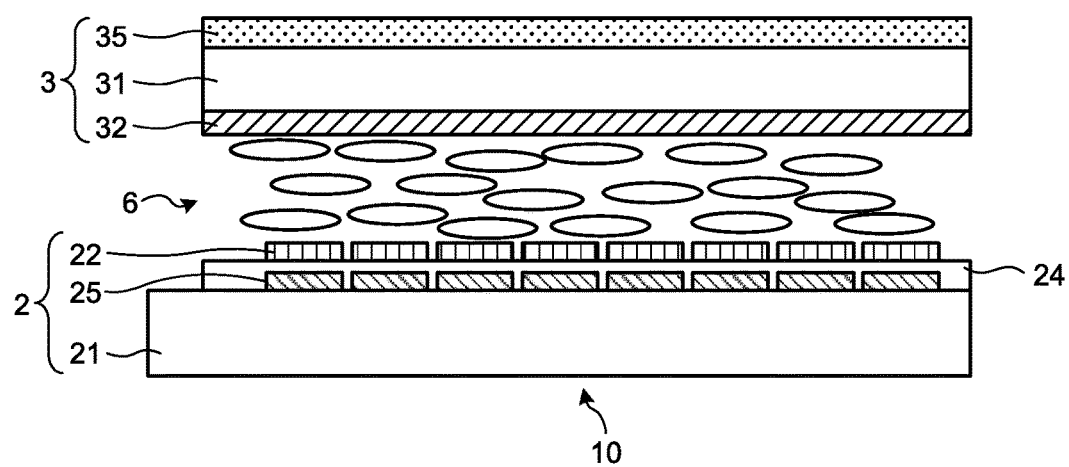
FIG. 6 is a cross-sectional view illustrating a schematic cross-sectional structure of a detection function-equipped display unit.

Next, an exemplary configuration of the detection function-equipped display unit 10 will be described in detail. FIG. 6 is a cross-sectional view illustrating a schematic cross-sectional structure of the detection function-equipped display unit. The detection function-equipped display unit 10 includes the pixel substrate 2, a counter substrate 3 arranged to face in a direction vertical to the surface of the pixel substrate 2, and a display function layer (for example, a liquid crystal layer 6) interposed between the pixel substrate 2 and the counter substrate 3 as illustrated in FIG. 6. In other words, the display function layer is arranged between the first substrate 21 and a second substrate 31. The display function layer may be configured as the pixel substrate 2. For example, the display function layer may be arranged between the first electrode 25 and a second electrode 22.

The pixel substrate 2 includes the first substrate 21 serving as a circuit substrate, a plurality of second electrodes (pixel electrodes) 22 arranged in a matrix form above the first substrate 21, a plurality of first electrodes (detection electrodes) 25 formed between the first substrate 21 and the second electrodes 22, and an insulating layer 24 that electrically insulates the first electrode 25 from the second electrode 22. A thin film transistor (TFT) is arranged on the first substrate 21. A polarizing plate (not illustrated) may be formed below the first substrate 21 with an adhesive layer interposed therebetween. For example, the first electrode 25 and the second electrode 22 are made of a transparent conductive material such as an indium tin oxide (ITO).

In the present embodiment, the first electrode 25, the insulating layer 24, and the second electrode 22 are stacked on the first substrate 21 in this order, but the present invention is not limited thereto. The second electrode 22, the insulating layer 24, and the first electrode 25 may be stacked on the first substrate 21 in this order, or the first electrode 25 and the second electrode 22 may be formed at the same layer with the insulating layer 24 interposed therebetween. Further, at least one of the first electrode 25 and the second electrode 22 may be arranged above the second substrate 31.

The counter substrate 3 includes the second substrate 31 and a color filter 32 formed on one surface of the second substrate 31. Further, a polarizing plate 35 is formed above the second substrate 31 with an adhesive layer interposed between. The color filter 32 may be arranged on the first substrate 21. In the present embodiment, the first substrate 21 and the second substrate 31 may be, for example, a glass substrate or a resin substrate.

The liquid crystal layer 6 is formed between the first substrate 21 and the second substrate 31. The liquid crystal layer 6 modulates light passing through the liquid crystal layer 6 according to a state of an electric field, and a liquid crystal of a horizontal electric field mode such as fringe field switching (FFS) or in-plane switching (IPS) is used. Further, an orientation film may be arranged between the liquid crystal layer 6 and the pixel substrate 2 and between the liquid crystal layer 6 and the counter substrate 3 illustrated in FIG. 6.

An illuminator (not illustrated) is formed below the first substrate 21. For example, the illuminator includes a light source such as an LED and radiates light from the light source toward the first substrate 21. The light from the illuminator passes through the pixel substrate 2, and a portion to which light is shielded and not emitted and a portion to which light is emitted are switched according to the state of the liquid crystal at the position, and thus an image is displayed on the display surface. In the case of a reflective liquid crystal display device in which a reflective electrode that reflects light incident from the second substrate 31 side is formed as the second electrode 22, and the transparent first electrode 25 is formed on the counter substrate 3 side, whereas the illuminator may not be formed below the first substrate 21. In the reflective liquid crystal display device, a front light may be installed above the second substrate 31. In this case, the light incident from the second substrate 31 side is reflected by the reflective electrode (the second electrode 22), passes through the second substrate 31, and arrives at the eyes of an observer. Further, when an organic EL display panel is used as the display panel 20 (see FIG. 1), a light-emitting element is formed for each sub pixel SPix, and an image is displayed by controlling a light emission amount of the light emitting element, and thus it is unnecessary to form the illuminator. Further, when the organic EL display panel is used as the display panel 20, the display function layer may be included in the pixel substrate 2. For example, a light emitting layer which is the display function layer may be arranged between the first electrode and the second electrode.

Figure 7:
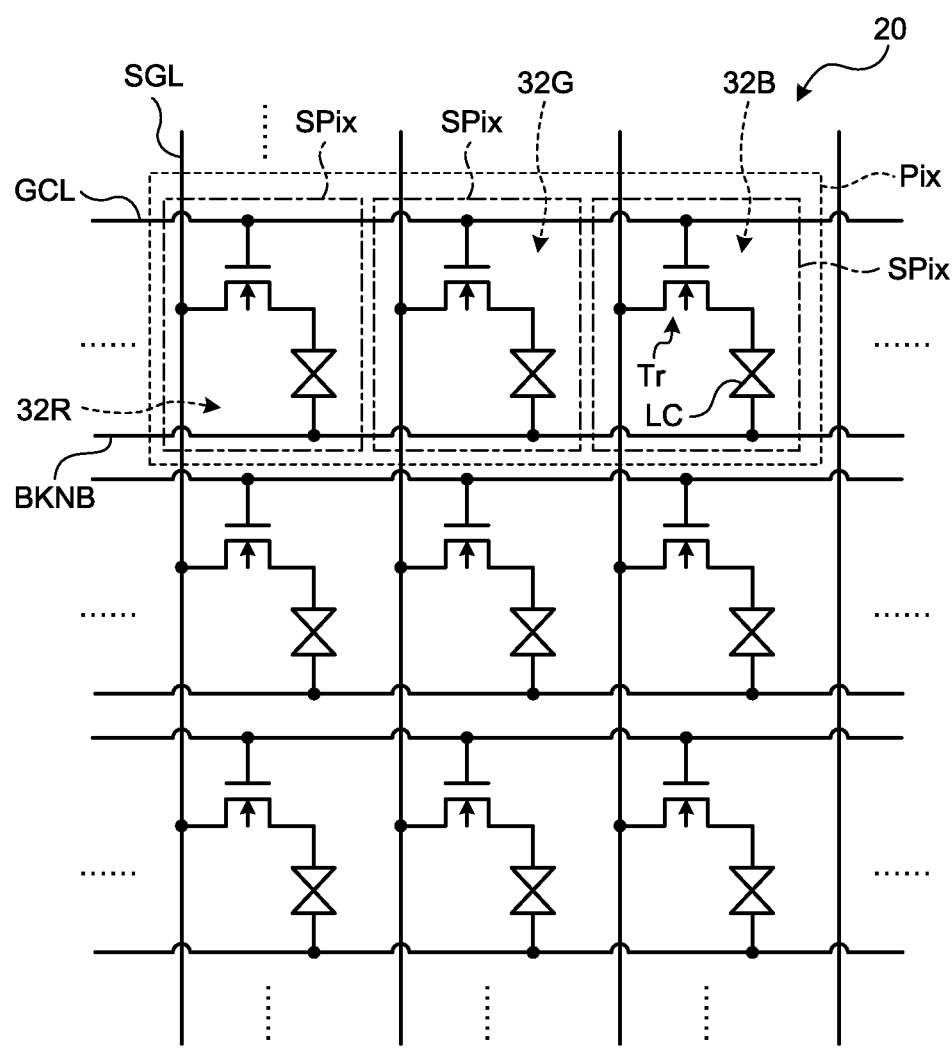
FIG. 7 is a circuit diagram illustrating a pixel array of a detection function-equipped display unit according to the first embodiment.

FIG. 7 is a circuit diagram illustrating a pixel array of the detection function-equipped display unit according to the first embodiment. Switching elements Tr of each of the sub pixels SPix illustrated in FIG. 7 and wires such as data lines SGL used to supply the pixel signal Vpix to the second electrodes 22, and gate lines GCL used to drive the switching elements Tr are formed on the first substrate 21 illustrated in FIG. 6. The data lines SGL and the gate lines GCL extend to a plane parallel to the surface of the first substrate 21.

The display panel 20 illustrated in FIG. 7 includes a plurality of sub pixels SPix arranged in a matrix form. Each of the sub pixel SPix includes the switching element Tr and a liquid crystal element LC. The switching element Tr is configured with a TFT, and in this example, the switching element Tr is configured with an n-channel metal oxide semiconductor (MOS) TFT. One of a source and a drain of the switching element Tr is coupled to the data line SGL, a gate of the switching element Tr is coupled to the gate line GCL, and the other of the source and the drain is coupled to one end of the liquid crystal element LC. The second electrode 22 (not illustrated in FIG. 7) is coupled to the other of the source and the drain of the switching element Tr, and the liquid crystal element LC is coupled with the switching element Tr through the second electrode 22. One end of the liquid crystal element LC is coupled to the other of the source and the drain of the switching element Tr, and the other end of the liquid crystal element LC is coupled to a selection electrode block 25A. The selection electrode block 25A includes a plurality of first electrodes 25 corresponding to one horizontal line of the sub pixels SPix. Further, the sub pixel SPix is driven according to the electric charges applied to the first electrode 25 and the second electrode 22.

The sub pixel SPix is coupled with other sub pixels SPix belonging to the same row in the display panel 20 through the gate line GCL. The gate line GCL is coupled with the display gate driver 12A (see FIG. 1), and the display gate driver 12A supplies the scanning signal Vscan to the gate line GCL. Further, the sub pixel SPix is coupled with other sub pixels SPix belonging to the same column in the display panel 20 through the data line SGL. The data line SGL is coupled with the source driver 13 (see FIG. 1), and the source driver 13 supplies the pixel signal Vpix to the data line SGL. The first electrode 25 (common electrode) is coupled with the first electrode driver 14 (see FIG. 1), and the first electrode driver 14 supplies the display drive signal Vcom to the first electrode 25. The display drive signal Vcom is a direct current (DC) voltage signal for applying a common potential to a plurality of sub pixels SPix. In this example, a plurality of sub pixels SPix belonging to the same row share one selection electrode block 25A.

In the present embodiment, the example in which the extension direction of the selection electrode block 25A is parallel to the extension direction of the gate line GCL has been described, but the present invention is not limited thereto. The extension direction of the selection electrode block 25A may be parallel to the extension direction of the data line SGL. In this case, a plurality of sub pixels SPix belonging to the same column share one selection electrode block 25A, and the first electrode driver 14 is arranged on any one edge in the extension direction of the data line SGL on the display panel 20.

The display gate driver 12A illustrated in FIG. 1 is driven to sequentially scan the gate lines GCL. The scanning signal Vscan is applied to the gates of the switching elements Tr of the sub pixels SPix via the gate line GCL, and one horizontal line of the sub pixels SPix are sequentially selected as a display drive target. Further, in the display device 1, the source driver 13 supplies the pixel signal Vpix to the sub pixels SPix belonging to one horizontal line, and thus display for each horizontal line is performed. When the display operation is performed, the first electrode driver 14 applies the display drive signal Vcom to the selection electrode block 25A corresponding to at least one horizontal line. The first electrode driver 14 may apply the display drive signal Vcom to a plurality of first electrodes 25 (the common electrodes) of the selection electrode block 25A corresponding to one horizontal line to which the scanning signal Vscan is applied or all the first electrodes 25 of the entire display region Ad.

The color filter 32 illustrated in FIG. 6 includes, for example, color regions 32R, 32G, and 32B which are colored in red (R), green (G), and blue (B) and periodically arranged. The color regions 32R, 32G, and 32B of three colors of R, G, and B are associated with each sub pixel SPix illustrated in FIG. 7 as one set, and the color regions 32R, 32G, and 32B constitute a pixel Pix as one set. The color filter 32 faces the liquid crystal layer 6 in the direction vertical to the first substrate 21 as illustrated in FIG. 6. The color filter 32 may have any other color combination as long as they are colored in different colors. The color filter 32 is not limited to a combination of three colors and may have a combination of four or more colors. Further, the detection function-equipped display unit 10 may not include the color filter 32, performing monochrome display.

Figure 8:
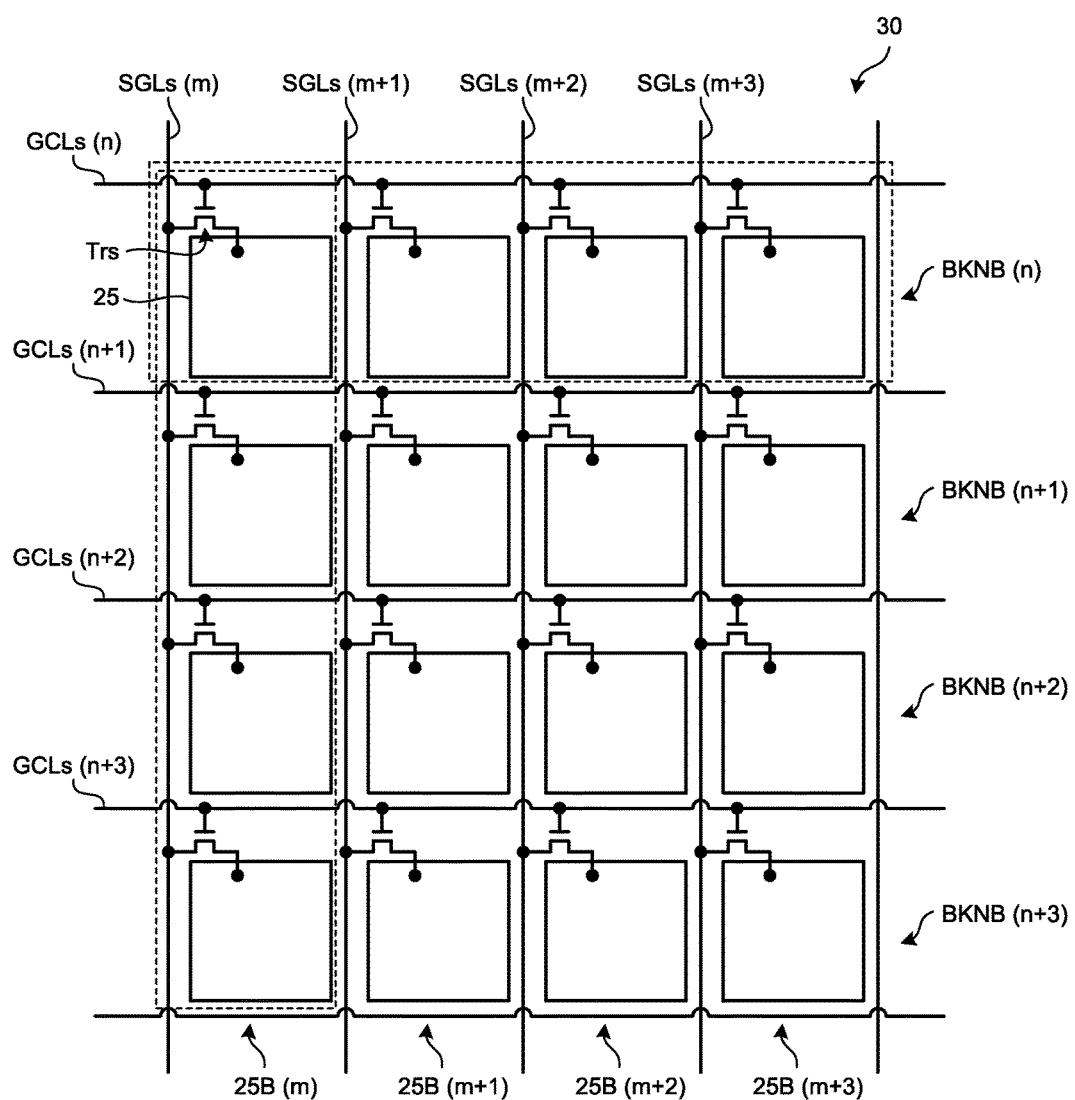
FIG. 8 is a circuit diagram illustrating an array of first electrodes of a detector according to the first embodiment.

The first electrode 25 illustrated in FIGS. 6 and 7 functions as the common electrode that applies the common potential to a plurality of sub pixels SPix in the display panel 20, and functions as a detection electrode when the touch detection of the detector 30 is performed. FIG. 8 is a circuit diagram illustrating an arrangement of the first electrodes of the detector according to the first embodiment.

The detector 30 illustrated in FIG. 8 includes the first electrodes 25 which are arranged in a matrix form on the first substrate 21 (see FIG. 6). One first electrode 25 (one detection electrode) may be arranged corresponding to one sub pixel SPix, or one first electrode 25 may be arranged corresponding to a plurality of sub pixels SPix. Each of the first electrodes 25 includes a detection switching element Trs. The detection switching element Trs is configured with a TFT, and in this example, the detection switching element Trs is configured with an re-channel metal oxide semiconductor (MOS) TFT. A detection gate lines GCLs extends in a row direction, and a plurality of detection gate lines GCLs are arranged in a column direction. A detection data line SGLs extends in the column direction, and a plurality of detection data lines SGLs are arranged in the row direction. The first electrode 25 is formed in a region surrounded by the detection gate lines GCLs and the detection data lines SGLs. The detection switching element Trs is formed near a crossing point of the detection gate line GCLs and the detection data line SGLs, and a plurality of detection switching elements Trs are formed corresponding to each of the first electrodes 25.

The detection switching element Trs may be formed on the same layer above the first substrate 21 as the switching element Tr illustrated in FIG. 7 or may be formed on a different layer. The detection gate line GCLs extends in a direction parallel to the gate line GCL illustrated in FIG. 7, and the detection data line SGLs extends in a direction parallel to the data line SGL illustrated in FIG. 7. The detection gate line GCLs may be formed on the same layer as or a different layer from the gate line GCL. The detection data line SGLs may be formed on the same layer as or a different layer from the gate line GCL. When the second electrode 22 is used as the detection electrode, the gate line GCL may be doubled as the detection data line SGLs. Further, the data line SGL may be doubled as the detection data line SGLs.

A source of the detection switching element Trs is coupled to the detection data line SGLs, a gate is coupled to the detection gate line GCLs, and a drain is coupled to the first electrode 25. Here, an electrode block including a plurality of first electrodes 25 coupled to the common detection gate line GCLs is referred to as the selection electrode block 25A, and an electrode block including a plurality of first electrodes 25 coupled to the common detection data line SGLs is referred to as the detection electrode block 25B. The detection data line SGLs and the detection electrode block 25B arranged in an m-th column are respectively denoted by a detection data line SGLs(m) and a detection electrode block 25B(m), and the detection gate line GCLs and the selection electrode block 25A arranged in an n-th row are respectively denoted by a detection gate line GCLs(n) and a selection electrode block 25A(n) as illustrated in FIG. 8. The selection electrode block 25A and the detection electrode block 25B correspond to a first electrode group. In other words, a group of the first electrodes 25 coupled to the common detection data line SGLs or the detection gate line GCLs are included in the first electrode group.

The detection gate driver 12B illustrated in FIG. 1 is a selection driver that performs driving such that one or more detection gate lines GCLs are selected. The scanning signal Vscans is applied to the gate of the detection switching element Trs via the selected detection gate line GCLs, and one or more selection electrode blocks 25A are selected as the detection target. Further, the first electrode driver 14 (see FIG. 1) supplies the detection drive signal Vs to the first electrodes 25 belonging to the selection electrode block 25A via the detection data line SGLs. Then, the first electrodes 25 belonging to the detection electrode block 25B output the detection signal Vdet according to a change in the capacitance of the first electrodes 25 to the signal processor 40 via the detection data line SGLs. The first electrode 25 of the present embodiment corresponds to the detection electrode E1 in the basic principle of the touch detection of the self-capacitance scheme, and the detector 30 can detect the finger that touches or approaches according to the basic principle of the touch detection of the self-capacitance scheme.

Figure 9:
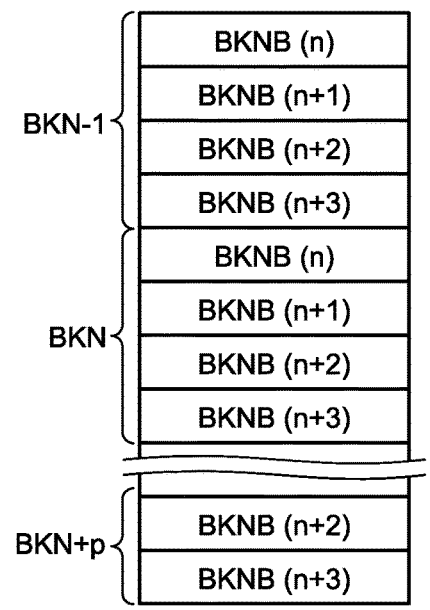
FIG. 9 is a schematic diagram illustrating an example of a detection operation.

FIG. 9 is a schematic diagram illustrating an example of the detection operation. A first electrode block BKN includes, for example, four selection electrode blocks 25A, and a plurality of first electrode block BKN-1, BKN, ..., and BKN+p are arranged in the column direction. The detection gate driver 12B sequentially selects a plurality of first electrode block BKN-1, BKN, ..., and BKN+p, and the selection electrode blocks 25A of a plurality of selected first electrode block BKN-1, BKN, ..., and BKN+p are supplied with the detection drive signal Vs. The first electrode blocks BKN-1, BKN, ..., and BKN+p which are not selected are supplied with no voltage signal and are in the floating state in which a potential is not fixed. A voltage signal having the same potential as the detection drive signal Vs may be supplied to some non-selected electrode blocks in order to reduce an additional capacitance between the selected first electrode blocks and the non-selection first electrode blocks. The first electrode block BKN corresponds to the first electrode group. In other words, the first electrode group includes a group of the first electrodes 25 controlled to be selected or not to be selected at the same time.

The detection operation is performed by sequentially selecting a plurality of first electrode block BKN-1, BKN, ..., and BKN+p, and thus detection of the whole of one detection surface is performed. Each of the first electrode blocks BKN-1, BKN, ..., and BKN+p includes four selection electrode blocks 25A, but the number of selection electrode blocks 25A is not limited to four, and two, three, or five or more selection electrode blocks 25A may be included in each of the first electrode blocks BKN-1, BKN, ..., and BKN+p. The first electrode blocks BKN-1, BKN, ..., and BKN+p may be arranged such that some selection electrode blocks 25A overlap. Further, a plurality of first electrode blocks BKN-1, BKN, ..., and BKN+p are not limited to the configuration in which they are arranged in the column direction and may be arranged in a matrix form.

As an example of an operation method of the display device 1, the display device 1 may perform the display operation (display period) and the touch detection operation (detection period) in a time division manner. The touch detection operation and the display operation may be divided by any method, but a method of dividing the touch detection operation and the display operation into two or more in one frame period (1F) of the display panel 20, that is, a period of time required for displaying video information corresponding to one screen will be described below.

Figure 10:
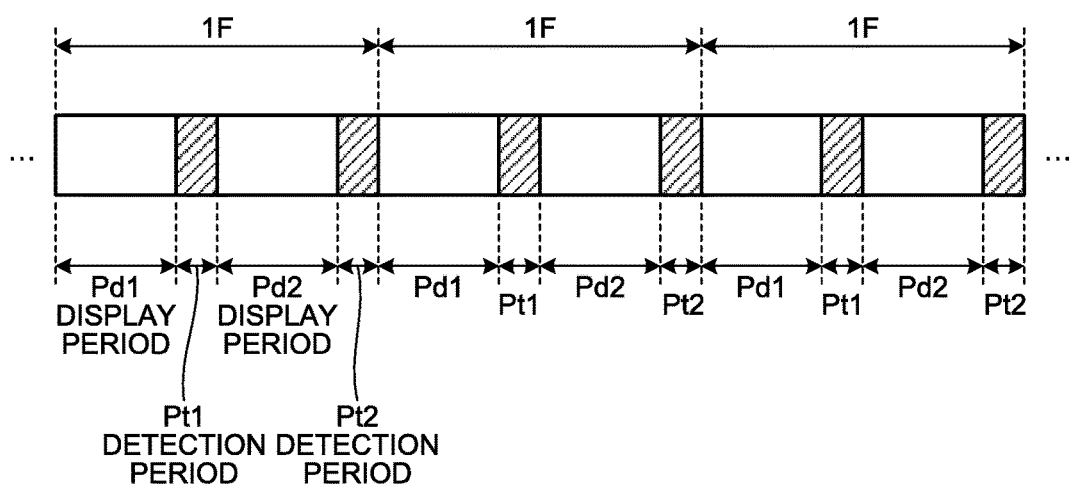
FIG. 10 is a schematic diagram illustrating an example of an arrangement of a display period and a detection period.

FIG. 10 is a schematic diagram illustrating an example of an arrangement of a display period and a detection period. One frame period (1F) includes two display periods Pd1 and Pd2 and two detection periods Pt1 and Pt2, and the periods are alternately arranged on a time axis such that the display period Pd1, the detection period Pt1, the display period Pd2, and the detection period Pt2 are arranged in the described order.

The controller 11 (see FIG. 1) supplies the pixel signal Vpix to a plurality of rows of sub pixels SPix (see FIG. 7) selected in each of the display periods Pd1 and Pd2 via the display gate driver 12A and the source driver 13.

Further, the controller 11 (see FIG. 1) supplies the detection drive signal Vs for the touch detection to the first electrodes 25 selected in each of the detection periods Pt1 and Pt2 by the first electrode driver 14 corresponding to the selection driver. The signal processor 40 performs determination of the presence or absence of the touch input and a calculation of coordinates of an input position based on the detection signal Vdet supplied from the first electrode 25.

In the present embodiment, since the first electrode 25 doubles as the common electrode of the display panel 20, the controller 11 supplies the display drive signal Vcom which is a potential of the common electrode for display to the first electrodes 25 of the selection electrode block 25A selected through the first electrode driver 14 in the display periods Pd1 and Pd2.

In FIG. 10, video display corresponding to one screen are performed twice in one frame period (1F), but more display periods may be set in one frame period (1F). More detection periods may be set in one frame period (1F).

In each of the detection periods Pt1 and Pt2, the touch detection for half of one detection surface may be performed, and the touch detection for one screen may be performed. In one of the detection periods Pt1 and Pt2, the touch detection for one first electrode block among the first electrode blocks BKN−1, BKN, ..., and BKN+p may be performed. Further, thinned-out detection or the like may be performed as necessary. Further, the display operation and the touch detection operation of one frame period (1F) may not be performed twice or more but may be performed once.

In the detection periods Pt1 and Pt2, the gate line GCL and the data line SGL (see FIG. 7) for display may be supplied with no voltage signal and be in the floating state in which a potential is not fixed. The gate line GCL and the data line SGL for display may be supplied with a signal having the same waveform synchronized with the detection drive signal Vs. Thus, parasitic capacitance between the first electrode 25 of the detection target and the gate line GCL and parasitic capacitance between the first electrode 25 and the data line SGL are reduced, and thus it is possible to suppress the occurrence of detection error or a reduction in detection sensitivity.

Figure 11:
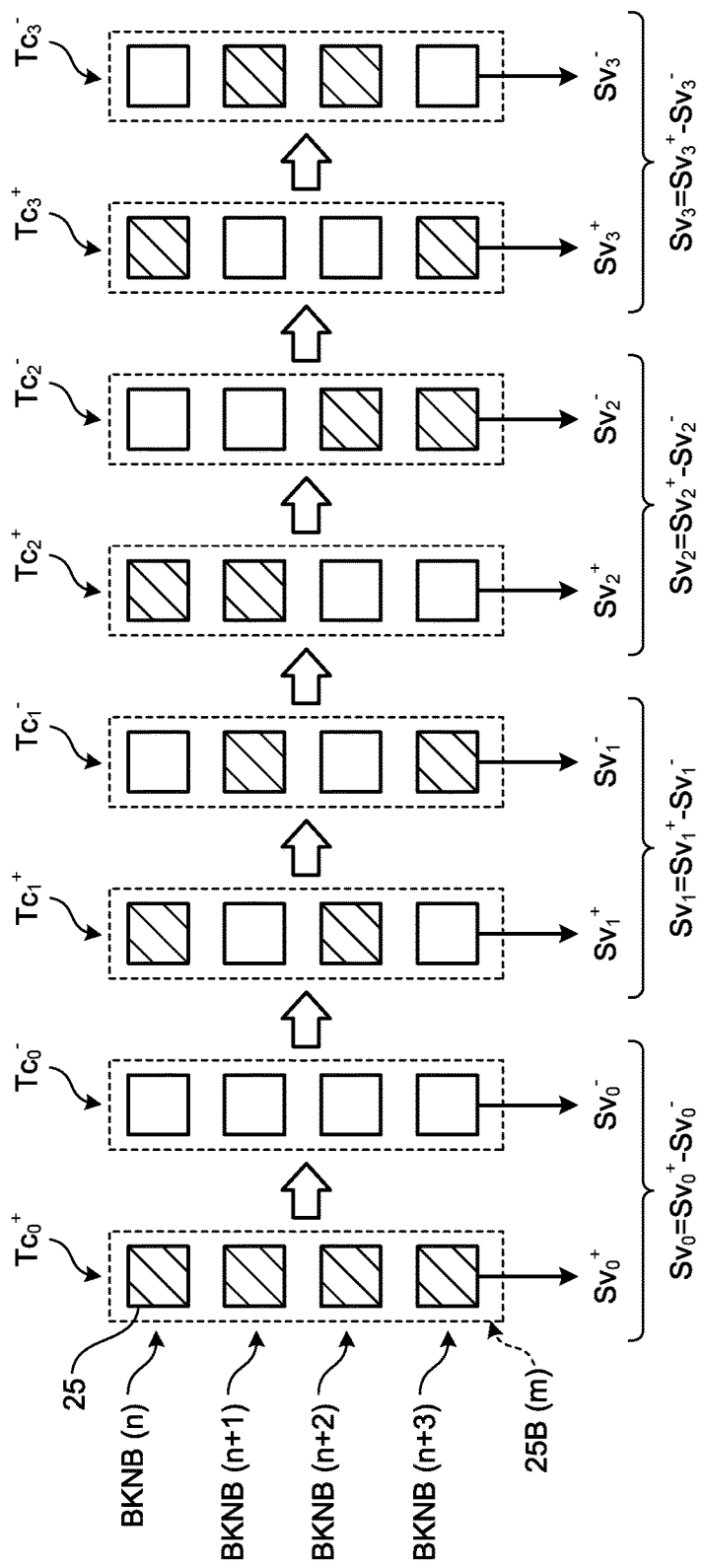
FIGS. 11A to 11D are explanatory diagrams for describing a selection pattern of first electrodes selected as a detection target.

Next, an example of the code division selection driving of the detector 30 according to the present embodiment will be described. FIGS. 11A to 11D are explanatory diagrams for describing a selection pattern of the first electrodes selected as the detection target. FIG. 11A illustrates a selection pattern of the first electrodes of a first detection operation $Tc_0$, FIG. 11B illustrates a selection pattern of the first electrodes of a second detection operation $Tc_1$, FIG. 11C illustrates a selection pattern of the first electrodes of a third detection operation $Tc_2$, and FIG. 11D illustrates a selection pattern of the first electrodes of a fourth detection operation $Tc_3$.

In FIGS. 11A to 11D, one detection electrode block 25B(m) will be described. The detection electrode block 25B(m) includes four first electrodes 25 arranged in the column direction, and the four first electrodes 25 corresponds to selection electrode blocks 25A(n), 25A(n+1), 25A(n+2), and 25A(n+3). The four first electrodes 25 are coupled to the common detection data line SGLs(m) (see FIG. 8). For the detection electrode block 25B(m), the detector 30 of the present embodiment selects the first electrodes 25 serving as the detection target based on a predetermined code. The detection drive signal Vs is supplied to the selected first electrodes 25, and the detection signal is output from each of the first electrodes 25 based on a change in the capacitance of the first electrode 25. An output signal $Sv_q$ corresponding to an integrated signal indicated by the following Formula (1) is output from the detection electrode block 25B(m) based on the detection signal of each of the first electrodes 25.

$$Sv_P = \sum_{q=0}^{Q-1} H_v Si_q \quad (1)$$

Here, $Si_q$ indicates a signal value corresponding to each of the first electrodes 25 of the selection electrode blocks 25A(n), 25A(n+1), 25A(n+2), and 25A(n+3). $Si_q$ indicates a signal value which is in proportion to the capacitance C1 of the detection electrode E1 (see FIG. 3) or the capacitance C1+C2 (see FIG. 3) obtained by adding the capacitance C2 caused by the touch or the approach of the finger or the like to the capacitance C1 of the detection electrode E1 in the basic principle of the touch detection of the self-capacitance scheme. $Sv_p$ is the output signal corresponding to the integrated signal of the detection electrode block 25B(m) and indicates a value obtained by integrating the output signal of the selected first electrode 25 based on a predetermined code in the detection electrode block 25B(m). For example, the predetermined code is defined by a square matrix $H_v$ of the following Formula (2). The square matrix $H_v$ is a Hadamard matrix and indicates a square matrix in which "1" or "−1" is an element, and arbitrary two different rows are orthogonal matrices. An order of the square matrix $H_v$ is the number of first electrodes 25 included in the detection electrode block 25B(m), that is, 4 which is the number of four selection electrode blocks 25A. In the present embodiment, the detection electrode block 25B(m) including the four first electrodes 25 will be described, but the present invention is not limited thereto, and the number of first electrodes 25 arranged in the column direction may be two, three, or five or more. In this case, the order of the square matrix $H_v$ also changes according to the number of first electrodes 25.

$$H_v = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

The order of the square matrix $H_v$ is the number of first electrodes 25 included in the detection electrode block 25B(m), that is, four which is the number of four selection electrode blocks 25A. In the present embodiment, the detection electrode block 25B(m) including the four first electrodes 25 will be described, but the present invention is not limited thereto, and the number of first electrodes 25 arranged in the column direction may be two, three, or five or more. In this case, the order of the square matrix $H_v$ also changes according to the number of first electrodes 25.

The first electrodes 25 corresponding to the square matrix $H_v$ correspond to a plurality of first electrode blocks BKN−1, BKN, ..., and BKN+p illustrated in FIG. 9. The detection operation is sequentially performed on each of the first electrode blocks BKN−1, BKN, ..., and BKN+p based on a square matrix $H_h$, and thus detection of the whole of one detection surface is performed. Each of the first electrode blocks BKN−1, BKN, ..., and BKN+p includes four selection electrode blocks 25A, but the number of selection electrode blocks 25A included in each of the first electrode blocks BKN−1, BKN, ..., and BKN+p is not limited to four and may be two, three, or five or more. The first electrode blocks BKN−1, BKN, ..., and BKN+p may be arranged such that some selection electrode blocks 25A overlap. In other words, the detection operation may be performed on the selection electrode blocks 25A in the eight columns twice based on the four square matrices $H_v$, or the detection operation may be duplicatedly performed on some first electrodes 25 so that the detection operation is performed twice based on the five square matrices. Further, a plurality of first electrode blocks BKN−1, BKN, ..., and BKN+p are not limited to the configuration in which they are arranged in the column direction and may be arranged in in a matrix form.

An example of the code division selection driving in which the detection operation is divided into four, that is, the first detection operation $Tc_0$, the second detection operation $Tc_1$, the third detection operation $Tc_2$, and the fourth detection operation $Tc_3$ as illustrated in FIGS. 11A to 11D will be described. The first detection operation $Tc_0$, the second detection operation $Tc_1$, the third detection operation $Tc_2$, and the fourth detection operation $Tc_3$ respectively include positive sign selection operations corresponding to a first driving $Tc_0^+$, $Tc_1^+$, $Tc_2^+$, and $Tc_3^+$ and negative sign selection operations corresponding to a second driving $Tc_0^-$, $Tc_1^-$, $Tc_2^-$, and $Tc_3^-$. In the present embodiment, in the positive sign selection operations $Tc_0^+$, $Tc_1^+$, $Tc_2^+$, and $Tc_3^+$, the first electrodes 25 of a first detection target corresponding to first detection electrodes in the detection electrode block 25B(m) are selected according to a first selection signal corresponding to an element "1" of the square matrix $H_v$. In FIGS. 11A to 11D, the selected first electrodes 25 are hatched. A first output signal $Sv_p^+$ (p=0, 1, 2, 3) is output from the first electrodes 25 of the first detection electrodes via the common detection data line SGLs (see FIG. 8). Here, the first output signal $Sv_p^+$ corresponding to a first integrated signal is an output signal which is obtained by integrating the detection signals of each first electrode 25 included in the detection electrode block 25B(m) and then output.

Further, in the negative sign selection operations $Tc_0^-$, $Tc_1^-$, $Tc_2^-$, and $Tc_3^-$ which are performed at different timing from the positive sign selection operation $Tc^+$, the first electrodes 25 of a second detection target corresponding to second detection electrodes which are not included in the first detection electrodes in the detection electrode block 25B(m) are selected according to a second selection signal corresponding to the element "−1" of the square matrix $H_v$. A second output signal $Sv_p^-$ (p=0, 1, 2, 3) corresponding to a second integrated signal is output from the first electrodes 25 of the second detection electrodes via the detection data line SGLs. Here, the second output signal $Sv_p^+$ is an output signal which is obtained by integrating the detection signals of each first electrode 25 included in the detection electrode block 25B(m) and then output. The signal operation circuitry 44 of the signal processor 40 (see FIG. 2) calculates the output signal $Sv_p=Sv_p^+-Sv_p^-$ by calculating the difference between the first output signal $Sv_p^+$ and the second output signal $Sv_p^-$. The signal operation circuitry 44 outputs the output signal $Sv_p$ to the storage 47 so that the output signal $Sv_p$ is temporarily stored. The first output signal $Sv_p^+$ and the second output signal $Sv_p^-$ correspond to the detection signal Vdet in the basic principle of the touch detection of the self-capacitance scheme.

When the order of the square matrix $H_v$ is 4, the four output signals ($Sv_0$, $Sv_1$, $Sv_2$, and $Sv_3$) are obtained from one detection electrode block 25B(m) as indicated in the following Formula (3). In this case, the output signals ($Sv_0$, $Sv_1$, $Sv_2$, and $Sv_3$) are respectively obtained based on four first output signals $Sv_0^+$, $Sv_1^+$, $Sv_2^+$, and $Sv_3^+$ and four second output signals $Sv_0^-$, $Sv_1^-$, $Sv_2^-$, $Sv_3^-$.

$$\begin{pmatrix} Sv_0 \\ Sv_1 \\ Sv_2 \\ Sv_3 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_0 \\ Si_1 \\ Si_2 \\ Si_3 \end{pmatrix} \quad (3)$$

An example in which the detection signal values detected from each first electrode 25 of the detection electrode block 25B(m) are ($Si_0$, $Si_1$, $Si_2$, and $Si_3$)=(1, 7, 3, and 2) will be described below. As illustrated in FIG. 11A, in the positive sign selection operation $Tc_0^+$ of the first detection operation $Tc_0$, the four first electrodes 25 are selected as the first detection electrodes corresponding to the elements "1" in the first row of the square matrix $H_v$. The first output signal $Sv_0^+$ is $Sv_0^+=1\times1+1\times7+1\times3+1\times2=13$ from Formula (3). In the negative sign selection operation $Tc_0^-$, since there is no the elements "−1" in the first row of the square matrix $H_v$, the first electrode 25 is not selected as the second detection electrodes corresponding to the element "−1." In other words, the second driving also includes a case in which the first electrode 25 is not selected from the first electrode group. Thus, the second output signal $Sv_0^-$ is $Sv_0^-=0\times1+0\times7+0\times3+0\times2=0$. In other words, the second output signal $Sv_0$ also includes an output value at which the first electrode 25 is not selected from the first electrode group. The output signal $Sv_0$ is $Sv_0=Sv_0^+-Sv_0^-=13-0=13$ from a difference between the first output signal $Sv_0^+$ and the second output signal $Sv_0^-$.

Then, as illustrated in FIG. 11B, in the positive sign selection operation $Tc_1^+$ of the second detection operation $Tc_1$, the two first electrodes 25 belonging to the selection electrode blocks 25A(n) and 25A(n+2) are selected as the first detection electrodes corresponding to the elements "1" in the second row of the square matrix $H_v$. The output signal is output from the first electrodes 25 selected as the first detection electrodes, but the output signal is not output from the first electrodes 25 belonging to the selection electrode blocks 25A(n+1) and 25A(n+3) which are not selected as the first detection electrodes. Thus, the first output signal $Sv_1^+$ is $Sv_1^+=1\times1+0\times7+1\times3+0\times2=4$ from Formula (3). In the negative sign selection operation $Tc_1^-$, the two first electrodes 25 belonging to the selection electrode blocks 25A(n+1) and 25A(n+3) are selected as the second detection electrodes corresponding to the elements "−1" in the second row of the square matrix $H_v$. The second output signal $Sv_1^-$ is $Sv_1^-=0\times1+1\times7+0\times3+1\times2=9$. $Sv_1=Sv_1^+-Sv_1^-=4-9=-5$ is obtained as the output signal $Sv_1$.

Then, as illustrated in FIG. 11C, in the positive sign selection operation $Tc_2^+$ of the third detection operation $Tc_2$, the two first electrodes 25 belonging to the selection electrode blocks 25A(n) and 25A(n+1) are selected as the first detection electrodes corresponding to the elements "1" in the third row of the square matrix $H_v$. The first output signal $Sv_2^+$ is $Sv_2^+=1\times1+1\times7+0\times3+0\times2=8$ from Formula (3). In the negative sign selection operation $Tc_2^-$, the two first electrodes 25 belonging to the selection electrode blocks 25A(n+2) and 25A(n+3) are selected as the second detection electrodes corresponding to the elements "−1" in the third row of the square matrix $H_v$. The second output signal $Sv_2^-$ is $Sv_2^-=0\times1+0\times7+1\times3+1\times2=5$. $Sv_2=Sv_2^+-Sv_2^-=8-5=3$ is obtained as the output signal $Sv_2$.

Then, as illustrated in FIG. 11D, in the positive sign selection operation $Tc_3^+$ of the fourth detection operation $Tc_3$, the two first electrodes 25 belonging to the selection electrode blocks 25A(n) and 25A(n+3) are selected as the first detection electrodes corresponding to the elements "1" in the fourth row of the square matrix $H_v$. The first output signal $Sv_3^+$ is $Sv_3^+=1\times1+0\times7+0\times3+1\times2=3$ from Formula (3). In the negative sign selection operation $Tc_3^-$, the two first electrodes 25 belonging to the selection electrode blocks 25A(n+1) and 25A(n+2) are selected as the second detection electrodes corresponding to the elements "−1" in the fourth row of the square matrix $H_v$. The second output signal $Sv_3^-$ is $Sv_3^-=0\times1+1\times7+1\times3+0\times2=10$. $Sv_3=Sv_3^+-Sv_3^-=3-10=-7$ is obtained as the output signal $Sv_3$.

The signal operation circuitry 44 sequentially outputs the four output signals ($Sv_0$, $Sv_1$, $Sv_2$, and $Sv_3$)=(13, −5, 3, and −7) to the storage 47. Further, the signal operation circuitry 44 may cause the four first output signals $Sv_0^+$, $Sv_1^+$, $Sv_2^+$, and $Sv_3^+$ and the four second output signals $Sv_0^-$, $Sv_1^-$, $Sv_2^-$, and $Sv_3^-$ to be stored in the storage 47, calculating the four output signals $Sv_0$, $Sv_1$, $Sv_2$, and $Sv_3$ after detection is performed in all the periods.

The coordinate extractor 45 (see FIG. 2) receives the output signals $Sv_0$, $Sv_1$, $Sv_2$, and $Sv_3$ calculated by the signal operation circuitry 44 from the storage 47, and decodes the four output signals $(Sv_0, Sv_1, Sv_2,$ and $Sv_3)=(13, -5, 3, -7)$ using the following Formula (4). The coordinate extractor 45 calculates decoded signal $(Si_0', Si_1', Si_2', Si_3')=(4, 28, 12, 8)$ based on Formula (4). When the finger touches or approaches, values of the decoded signal $Si_0'$, $Si_1'$, $Si_2'$, and $Si_3'$ of the first electrodes 25 corresponding to the position change. Thus, the coordinate extractor 45 can obtain coordinates at which the finger touches or approaches in the detection electrode block 25B(m) based on the decoded signals $Si_0'$, $Si_1'$, $Si_2'$, and $Si_3'$. Further, the coordinate extractor 45 may output the coordinates obtained based on the decoded signals $Si_0'$, $Si_1'$, $Si_2'$, and $Si_3'$ as the detection signal output Vout or may output the decoded signals $Si_0'$, $Si_1'$, $Si_2'$, and $Si_3'$ as the detection signal output Vout.

$$\begin{pmatrix} Si_0' \\ Si_1' \\ Si_2' \\ Si_3' \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sv_0 \\ Sv_1 \\ Sv_2 \\ Sv_3 \end{pmatrix} \quad (4)$$

According to the code division selection driving, the decoded signals $(Si_0', Si_1', Si_2',$ and $Si_3')=(4, 28, 12,$ and $8)$ are obtained by performing the decoding process of the coordinate extractor 45 with Formula (4) on the signal values $(Si_0, Si_1, Si_2,$ and $Si_3)=(1, 7, 3,$ and $2)$. In other words, a signal strength which is four times higher than in the time division selection driving is obtained without increasing a voltage of a signal value of each node. Further, since the output signal $Sv_p$ is obtained based on the difference between the first output signal $Sv_p^+$ and the second output signal $Sv_p^-$, even when a noise comes in from the outside, the noise component of the first output signal $Sv_p^+$ and the noise component of the second output signal $Sv_p^-$ are canceled. Accordingly, noise resistance can be improved. Further, according to the present embodiment, the detection operation of the first electrodes 25 of the first detection electrodes selected based on a predetermined code and the detection operation of the first electrodes 25 of the second detection electrodes which are selected based on a predetermined code but not included in the first detection electrodes are performed in different periods in the time division manner. Accordingly, it is possible to suppress capacitive coupling of the first electrodes 25 of the first detection electrodes and the first electrodes 25 of the second detection electrodes, suppressing a detection error or a reduction in detection sensitivity.

The square matrix $H_v$ indicated in Formula (2) is an example, and, for example, a square matrix $H_v$ indicated in the following Formula (5) or the like may be used. In this case, in the positive sign selection operation $Tc_p^+$ (p=0, 1, 2, 3), the three first electrodes 25 of the first detection electrodes corresponding to the element "1" are selected, and in the negative sign selection operation $Tc_p^-$ (p=0, 1, 2, 3), one first electrode 25 of the second detection electrodes corresponding to the element "−1" is selected.

$$H_v = \begin{pmatrix} -1 & 1 & 1 & 1 \\ 1 & -1 & 1 & 1 \\ 1 & 1 & -1 & 1 \\ 1 & 1 & 1 & -1 \end{pmatrix} \quad (5)$$

As illustrated in FIGS. 11A to 11D, a first selection pattern indicating a combination pattern of the first electrodes 25 selected as the first detection electrodes corresponding to the element "1" of the square matrix $H_v$ includes four patterns shown in the positive sign selection operation $Tc_p^+$ (p=0, 1, 2, 3). In other words, the first selection pattern of the first electrodes 25 selected as the first detection electrodes is equal in number to the first electrodes 25 included in the detection electrode block 25B(m). Further, a second selection pattern indicating a combination pattern of the first electrodes 25 selected as the second detection electrodes corresponding to the element "−1" of the square matrix $H_v$ includes four patterns shown in the negative sign selection operation $Tc_p^-$ (p=0, 1, 2, 3) and is equal in number to the first electrodes 25 included in the detection electrode block 25B(m).

As illustrated in FIGS. 11A to 11D, the positive sign selection operation $Tc_p^+$ and the negative sign selection operation $Tc_p^-$ are consecutively performed in the detection periods Pt1 and Pt2 (see FIG. 10), and a set of the positive sign selection operation $Tc_p^+$ and the negative sign selection operation $Tc_p^-$ which are consecutive are alternately performed. The present invention is not limited thereto, and an appropriate change may be made, for example, the four negative sign selection operations $Tc_p^-$ (p=0, 1, 2, 3) are performed after the four positive sign selection operations $Tc_p^+$ (p=0, 1, 2, 3) are consecutively performed. Further, the number of executions of the positive sign selection operation $Tc_p^+$ and the negative sign selection operation $Tc_p^-$ is equal to the number of first electrodes 25 included in the detection electrode block 25B(m), that is, four. In other words, the number of executions of the positive sign selection operation $Tc_p^+$ and the negative sign selection operation $Tc_p^-$ is equal to the number of elements in the row in the square matrix $H_v$ of Formula (1).

Further, the first electrodes 25 included in the detection electrode block 25B(m) are coupled to the common detection data line SGLs, but the present invention is not limited thereto, and the first electrodes 25 included in the detection electrode block 25B(m) may be coupled to individual detection data lines.

Figure 12:
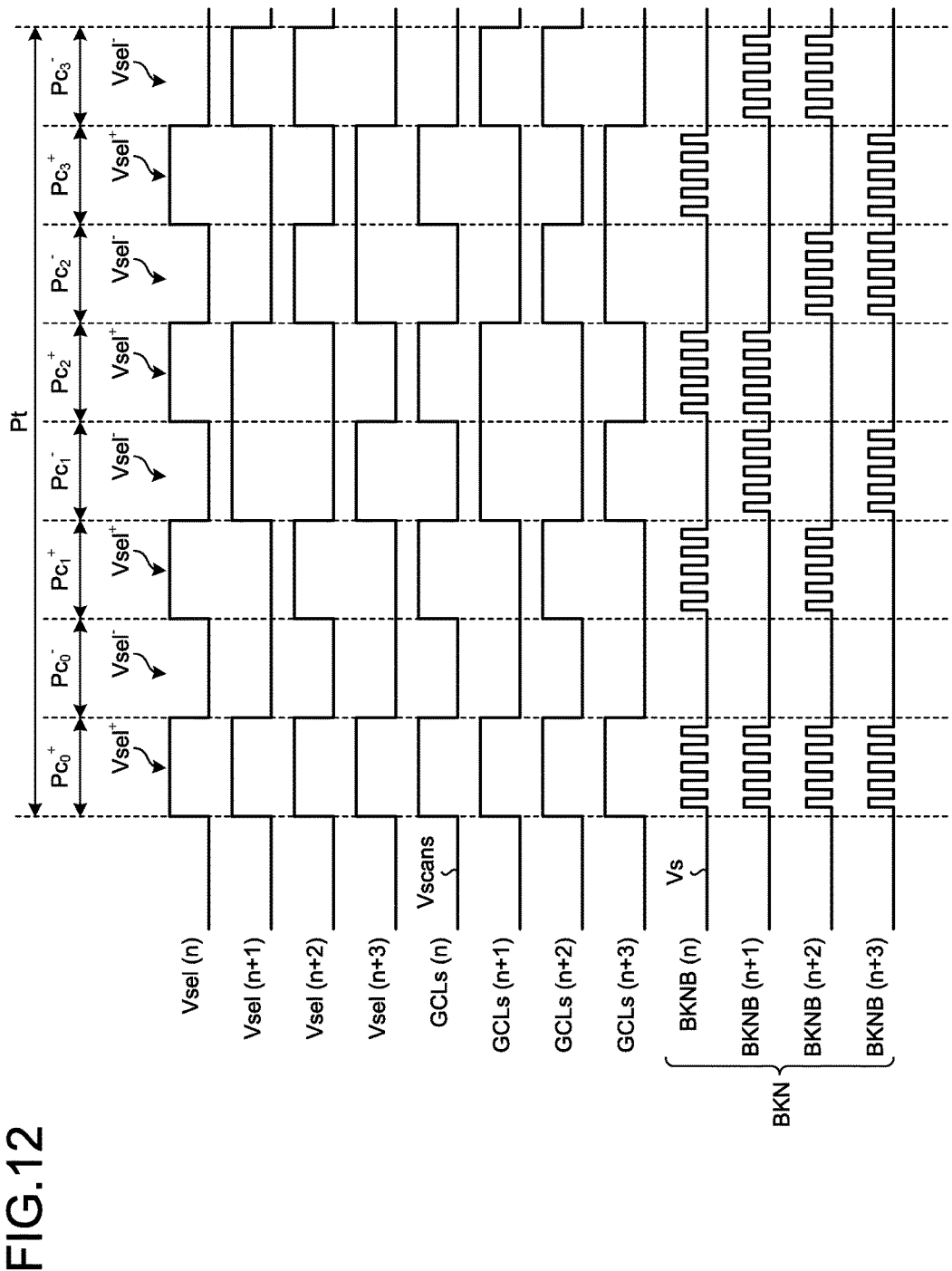
FIG. 12 is a timing waveform diagram illustrating an exemplary operation of a detector according to the present embodiment.

Next, an exemplary operation of a plurality of detection electrode blocks 25B will be described with reference to FIG. 8 and FIGS. 12 to 14. FIG. 12 is a timing waveform diagram illustrating an exemplary operation of the detector according to the present embodiment. FIGS. 13A and 13B are schematic diagrams for describing an exemplary operation of the code division selection driving of the detector according to the first embodiment. FIGS. 14A and 14B are schematic diagrams for describing an exemplary operation of the code division selection driving of the detector according to the first embodiment.

A positive sign selection operation period $Pc_p^+$ and a negative sign selection operation period $Pc_p^-$ are consecutively arranged as illustrated in FIG. 12. The positive sign selection operation $Tc_p^+$ is performed in the positive sign selection operation period $Pc_p^+$, and the negative sign selection operation $Tc_p^-$ is performed in the negative sign selection operation period $Pc_p^-$. The respective periods of the positive sign selection operation periods $Pc_1^+$, $Pc_2^+$, $Pc_3^+$, and $Pc_4^+$ are also indicated by $Pc^+$, and the respective periods of the negative sign selection operation periods $Pc_1^-$, $Pc_2^-$, $Pc_3^-$, and $Pc_4^-$ are also indicated by $Pc^-$. Selection signals Vsel(n), (n+1), (n+2), and (n+3) corresponding to each of the selection electrode blocks 25A(n), 25A(n+1), 25A(n+2), and 25A(n+3) are supplied to the detection gate driver 12B. The selection signal Vsel may be generated based on a predetermined code by the controller 11 or may be generated by an external control IC or the like, and the detection gate driver 12B may include a selection signal generator that generates the selection signal Vsel.

When the selection signals Vsel(n), (n+1), (n+2), and (n+3) become the on state (the high level), the detection gate driver 12B supplies the scanning signal Vscans to the detection gate line GCLs corresponding to the selection signal Vsel. The detection switching elements Trs of the selected detection gate line GCLs are turned on, and the selection electrode block 25A corresponding to the selection signal Vsel is selected as the detection target. The first electrode driver 14 sequentially or simultaneously selects the detection data line SGLs, and supplies the detection drive signal Vs to each first electrode 25 of the selection electrode block 25A via the detection data line SGLs. Accordingly, the detection signal is output from the first electrodes 25 according to the change in capacitance of the first electrodes 25 serving as the detection target in the detection electrode block 25B. The detection signals of each first electrode 25 are integrated, and the first output signal $Sv_p^+$ and the second output signal $Sv_p^-$ are output to the signal processor 40 via the detection data line SGLs.

Each of the selection signals Vsel(n), (n+1), (n+2), and (n+3) includes a first selection signal $Vsel^+$ corresponding to the element "1" of the square matrix $H_v$ of Formula (2) and a second selection signal $Vsel^-$ corresponding to the element "−1" of the square matrix $H_v$. The selection signals Vsel(n), (n+1), (n+2), and (n+3) are signals in which the four first selection signals $Vsel^+$ and the four second selection signals $Vsel^-$ are alternately arranged. Further, the selection signals Vsel(n), (n+1), (n+2), and (n+3) are not limited thereto, and a plurality of second selection signals $Vsel^-$ may be arranged after a plurality of first selection signals $Vsel^+$, or the selection signals Vsel(n), (n+1), (n+2), and (n+3) may not include the second selection signal $Vsel^-$ as will be described later.

For example, in the positive sign selection operation period $Pc_0^+$, the first selection signal $Vsel^+$ corresponds to the elements "1" in the first row of the square matrix $H_v$, and all the selection signals Vsel(n), (n+1), (n+2), and (n+3) become the on state (the high level). The detection gate lines GCLs(n), (n+1), (n+2), and (n+3) are selected according to the first selection signal $Vsel^+$, and the scanning signal Vscans becomes the on state (the high level) as illustrated in FIG. 13A. Each first electrode 25 of the selection electrode blocks 25A(n), 25A(n+1), 25A(n+2), and 25A(n+3) is selected as the first detection electrode, and the detection drive signal Vs is supplied from the first electrode driver 14. Accordingly, first output signals $Sv_0(m)^+$, $Sv_0(m+1)^+$, $Sv_0(m+2)^+$, and $Sv_0(m+3)^+$ are respectively output from a plurality of detection electrode blocks 25B(m), 25B(m+1), 25B(m+2), and 25B(m+3).

In the negative sign selection operation period $Pc_0^-$, the second selection signal $Vsel^-$ corresponds to the elements "−1" in the first row of the square matrix $H_v$, and all the selection signals Vsel(n), (n+1), (n+2), and (n+3) become the off state (the low level). In this case, as illustrated in FIG. 13B, in the negative sign selection operation period $Pc_0^-$, none of the detection gate lines GCLs(n), (n+1), (n+2), and (n+3) is selected, and the scanning signal Vscans become the off state (the low level). Second output signal $Sv_0(m)^-$, $Sv_0(m+1)^-$, $Sv_0(m+2)^-$, and $Sv_0(m+3)^-$ are respectively output from a plurality of detection electrode blocks 25B(m), 25B(m+1), 25B(m+2), 25B(m+3). In this case, signal values of the second output signals $Sv_0(m)^-$, $Sv_0(m+1)^-$, $Sv_0(m+2)^-$, $Sv_0(m+3)^-$ are 0.

As illustrated in FIG. 12, in the next positive sign selection operation period $Pc_1^+$, the first selection signal $Vsel^+$ corresponds to the elements "1" in the second row of the square matrix $H_v$, the selection signals Vsel(n) and (n+2) become the on state (the high level), and the selection signals Vsel(n+1) and (n+3) become the off state (the low level). The detection gate lines GCLs(n) and (n+2) are selected according to the first selection signal $Vsel^+$, and the scanning signal Vscans becomes the on state (the high level). Accordingly, each first electrode 25 of the selection electrode blocks 25A(n) and (n+2) is selected as the first detection electrode, and the detection drive signal Vs is supplied via the detection data line SGLs. Then, the first output signals $Sv_1(m)^+$, $Sv_1(m+1)^+$, $Sv_1(m+2)^+$, and $Sv_1(m+3)^+$ are respectively output from a plurality of detection electrode blocks 25B(m), 25B(m+1), 25B(m+2), and 25B(m+3). In the negative sign selection operation period $Pc_1^-$, the second selection signal $Vsel^-$ corresponds to the elements "−1" in the second row of the square matrix $H_v$, the selection signals Vsel(n+1) and (n+3) become the on state (the high level), and the selection signals Vsel(n), (n+2) become the off state (the low level). The detection gate lines GCLs(n+1) and (n+3) are selected, and the detection drive signal Vs is supplied to each first electrode 25 of the selection electrode blocks 25A(n+1) and (n+3). Further, the second output signals $Sv_1(m)^-$, $Sv_1(m+1)^-$, $Sv_1(m+2)^-$, and $Sv_1(m+3)^-$ are respectively output from a plurality of detection electrode blocks 25B(m), 25B(m+1), 25B(m+2), and 25B(m+3).

In the next positive sign selection operation period $Pc_2^+$, the first selection signal $Vsel^+$ corresponds to the elements "1" in the third row of the square matrix $H_v$, the selection signals Vsel(n) and (n+1) become the on state (the high level), and the selection signals Vsel(n+2) and (n+3) become the off state (the low level). As illustrated in FIG. 14A, the detection gate lines GCLs(n) and (n+1) are selected, and the scanning signal Vscans becomes the on state (the high level). The first electrode 25 belonging to the selection electrode blocks 25A(n) and (n+1) are selected as the first detection electrode, and the detection drive signal Vs is supplied via the detection data line SGLs. The first output signals $Sv_2(m)^+$, $Sv_2(mil)^+$, $Sv_2(m+2)^+$, and $Sv_2(m+3)^+$ are respectively output from a plurality of detection electrode blocks 25B(m), 25B(m+1), 25B(m+2), and 25B(m+3). In the negative sign selection operation period $Pc_2^-$, the second selection signal $Vsel^-$ corresponds to the elements "−1" in the third row of the square matrix $H_v$, the selection signals Vsel(n+2) and (n+3) become the on state (the high level), and the selection signals Vsel(n) and (n+1) become the off state (the low level). As illustrated in FIG. 14B, the detection gate lines GCLs(n+2) and (n+3) are selected, and the scanning signal Vscans becomes the on state (the high level). In the positive sign selection operation period $Pc_2^+$, the first electrodes 25 belonging to the selection electrode blocks 25A(n+2) and (n+3) which are not included in the first detection electrodes are selected as the second detection electrodes, and the detection drive signal Vs is supplied via the detection data line SGLs. Further, the second output signals $Sv_2(m)^-$, $Sv_2(m+1)^-$, $Sv_2(m+2)^-$, and $Sv_2(m+3)^-$ are respectively output from a plurality of detection electrode blocks 25B(m), 25B(m+1), 25B(m+2), and 25B(m+3).

As illustrated in FIG. 12, in the next positive sign selection operation period $Pc_3^+$, the first selection signal $Vsel^+$ corresponds to the elements "1" in the fourth row of the square matrix $H_v$, the selection signals Vsel(n) and (n+3) become the on state (the high level), and the selection signals Vsel(n+1) and (n+2) become the off state (the low level). The detection drive signal Vs is supplied to the first electrodes 25 belonging to the selection electrode blocks 25A(n) and (n+3). The first output signals $Sv_3(m)^+$, $Sv_3(m+1)^+$, $Sv_3(m+2)^+$, and $Sv_3(m+3)^+$ are respectively output from a plurality of detection electrode blocks 25B(m), 25B(m+1), 25B(m+2), and 25B(m+3). In the negative sign selection operation period $Pc_3^-$, the second selection signal Vsel$^-$ corresponds to the elements "−1" in the fourth row of the square matrix $H_v$, the selection signals Vsel(n+1) and (n+2) become the on state (the high level), and the selection signals Vsel(n) and (n+3) become the off state (the low level). The detection drive signal Vs is supplied to the first electrodes 25 belonging to the selection electrode blocks 25A(n+1), (n+2). Further, the second output signals $Sv_3(m)^-$, $Sv_3(m+1)^-$, $Sv_3(m+2)^-$, and $Sv_3(m+3)^-$ are respectively output from a plurality of detection electrode blocks 25B(m), 25B(m+1), 25B(m+2), and 25B(m+3).

As described above, a plurality of detection electrode blocks 25B(m), 25B(m+1), 25B(m+2), and 25B(m+3) are arranged in the row direction. The first output signals $Sv_p(m)^+$, $Sv_p(m+1)^+$, $Sv_p(m+2)^+$, and $Sv_p(m+3)^+$ and the second output signals $Sv_p(m)^-$, $Sv_p(m+1)^-$, $Sv_p(m+2)^-$, and $Sv_p(m+3)^-$ are respectively output from the detection electrode blocks 25B(m), 25B(m+1), 25B(m+2), and 25B(m+3). As illustrated in FIG. 12, the detection drive signal Vs corresponding to a first drive signal in the positive sign selection operation period Pc$^+$ and the detection drive signal Vs corresponding to a second drive signal in the negative sign selection operation period Pc$^-$ are positive voltage signals and have the same polarity. Thus, the first output signals $Sv_p^+$ and the second output signal $Sv_p(m)^-$ have the same polarity. The signal operation circuitry 44 calculates differences between the first output signals $Sv_p(m)^+$, $Sv_p(m+1)^+$, $Sv_p(m+2)^+$, and $Sv_p(m+3)^+$ and the second output signals $Sv_p(m)^-$, $Sv_p(m+1)^-$, $Sv_p(m+2)^-$, and $Sv_p(m+3)^-$. Accordingly, it is possible to obtain the output signals $Sv_p(m)$, $Sv_p(m+1)$, $Sv_p(m+2)$, and $Sv_p(m+3)$ of each of the detection electrode blocks 25B(m), 25B(m+1), 25B(m+2), and 25B(m+3). The coordinate extractor 45 performs the decoding process on the output signals $Sv_p(m)$, $Sv_p(m+1)$, $Sv_p(m+2)$, and $Sv_p(m+3)$, and outputs the touch panel coordinates at which the finger touches or approaches as the detection signal output Vout.

In each of the periods, the non-selected first electrode 25 is not provided with the voltage signal and is in the floating state in which a potential is not fixed. Thus, it is possible to reduce capacitive coupling between the selected first electrode 25 and the non-selected first electrode 25 and suppress a detection error or a reduction in detection sensitivity.

Figure 15:
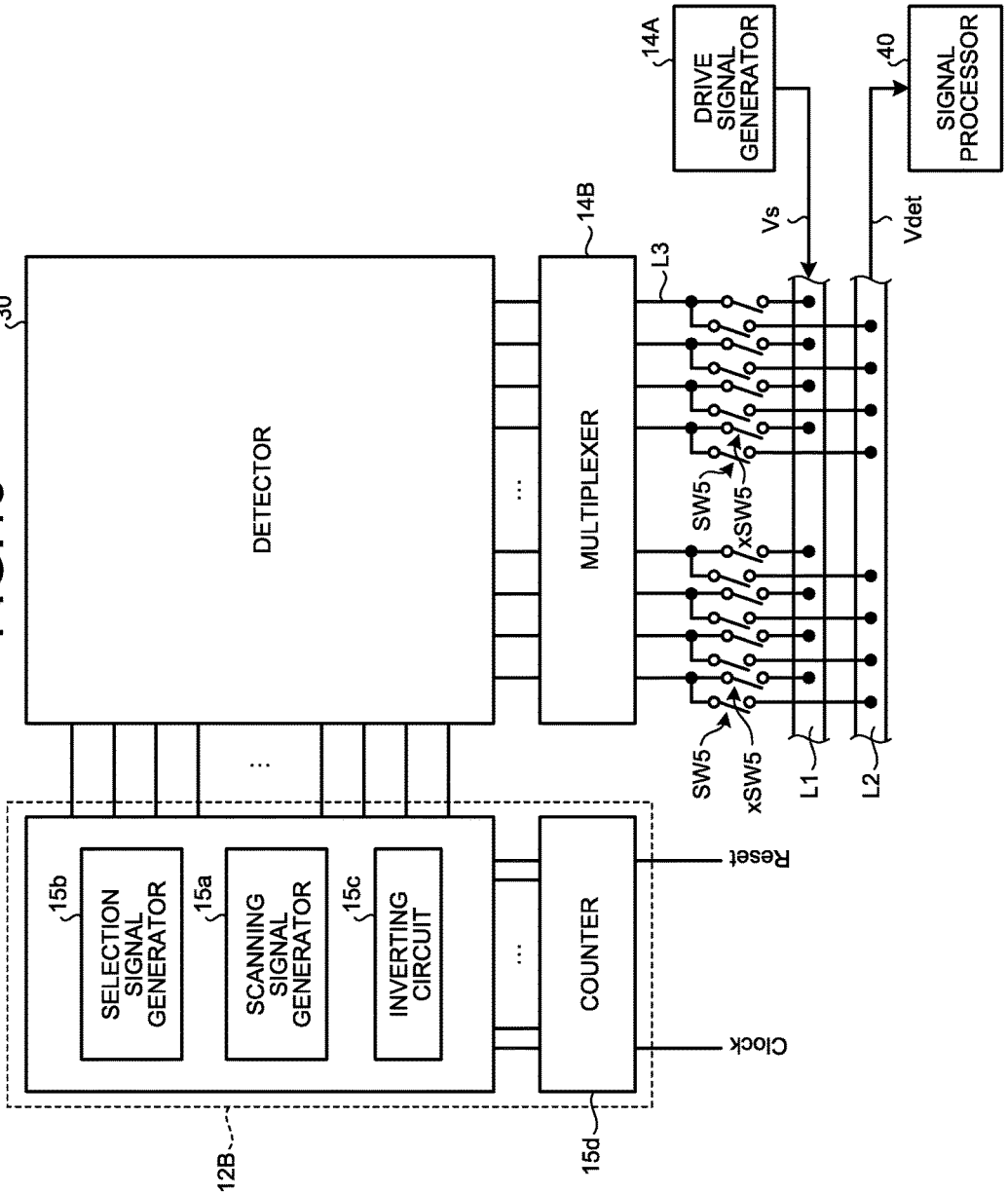
FIG. 15 is a block diagram illustrating an exemplary configuration of a drive circuit according to the first embodiment.
Figure 16:
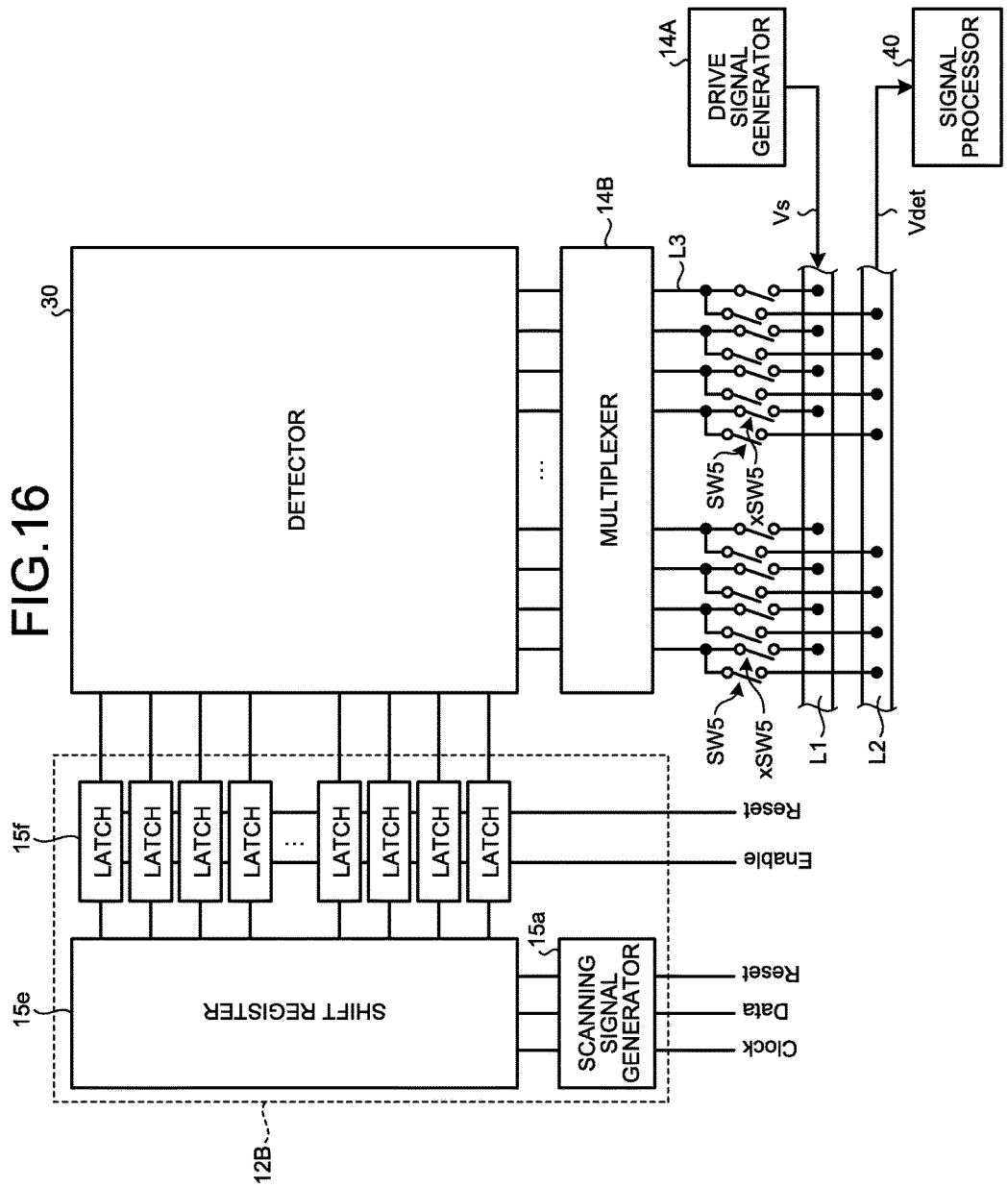
FIG. 16 is a block diagram illustrating another exemplary configuration of a drive circuit according to the first embodiment.

Next, an example of a drive circuit of the detector 30 of the present embodiment will be described. FIG. 15 is a block diagram illustrating an exemplary configuration of the drive circuit according to the present embodiment. FIG. 16 is a block diagram illustrating another exemplary configuration of the drive circuit according to the present embodiment. The drive circuit is an example of the selection driver.

As illustrated in FIG. 15, the detection gate driver 12B includes a scanning signal generator 15a, a selection signal generator 15b, an inverting circuit 15c, and a counter 15d. The scanning signal generator 15a generates the scanning signal Vscans, and supplies the scanning signal Vscans to the selected detection gate line GCLs based on the selection signal supplied from the selection signal generator 15b.

The selection signal generator 15b generates the first selection signal Vsel$^+$ that becomes the on state (the high level), corresponding to the element "1" of the square matrix of Formula (1) and become the off state (the low level), corresponding to the element "−1" of the square matrix. Further, the selection signal generator 15b generates the second selection signal Vsel$^-$ that becomes the off state (the low level), corresponding to the element "1" of the square matrix of Formula (1) and becomes the on state (the high level), corresponding to the element "−1" of the square matrix. In other words, the first selection signal Vsel$^+$ and the second selection signal Vsel$^-$ are signals in which the portion that becomes the on state (the high level) and the portion that become the off state (the low level) are inverted to each other. Accordingly, the selection is performed such that the first electrode 25 selected as the first detection electrode according to the first selection signal Vsel$^+$ and the first electrode 25 selected as the second detection electrode according to the second selection signal Vsel$^-$ do not overlap.

The counter 15d counts the number of pulses of a clock signal supplied from a clock signal generator (not illustrated). The selection signal generator 15b sequentially performs switching of the first selection signal Vsel$^+$ and the second selection signal Vsel$^-$ based on a count value from the counter 15d, and outputs the first selection signal Vsel$^+$ or the second selection signal Vsel$^-$ to the scanning signal generator 15a. Accordingly, the selection signal generator 15b outputs the first selection signal Vsel$^+$ corresponding to the elements "1" in one row in the square matrix $H_v$ in the positive sign selection operation period Pc$^+$ corresponding to a first period and outputs the second selection signal Vsel$^-$ corresponding to the elements "−1" in one row in the square matrix $H_v$ in the negative sign selection operation period Pc$^-$ corresponding to a second period as illustrated in FIG. 12. The clock signal generator is included in, for example, the controller 11 (see FIG. 1), and generates a reference clock used for switching each of the positive sign selection operation period Pc$^+$ and the negative sign selection operation period Pc$^-$ illustrated in FIG. 12.

For example, a reset signal Reset is supplied to the detection gate driver 12B at a timing at which the detection period Pt ends, and thus the scanning signal generator 15a, the selection signal generator 15b, the inverting circuit 15c, and the counter 15d are reset.

A multiplexer 14B is coupled to the detector 30 as illustrated in FIG. 15. A drive signal generator 14A sequentially or simultaneously supplies the detection drive signal Vs to the selected first electrode 25 through the multiplexer 14B according to the first selection signal Vsel$^+$ or the second selection signal Vsel$^-$. Further, the first output signals $Sv_p^+$ and the second output signal $Sv_p^-$ are sequentially output from the selected first electrode 25 to the signal processor 40 through the multiplexer 14B according to the first selection signal Vsel$^+$ or the second selection signal Vsel$^-$. Thus, it is possible to simplify the configuration of the signal processor 40.

The supply of the detection drive signal Vs and the output of the first output signals $Sv_p^+$ and the second output signal $Sv_p^-$ can be switched by, for example, switch elements SW5 and xSW5. When the switch element SW5 is turned on (opened), the switch element xSW5 is turned off (closed), and the first output signals $Sv_p^+$ and the second output signal $Sv_p^-$ are output to the signal processor 40 via wires L2 and L3. When the switch element SW5 is turned off (closed), the switch element xSW5 is turned on (opened), and the detection drive signal Vs is supplied to the first electrode 25 of the detection target via wires L1 and L3.

The functions of the drive signal generator 14A, the multiplexer 14B, the switch elements SW5 and xSW5, and the wires L1, L2, and L3 may be included in the first electrode driver 14 or may be included in a circuit installed separately from the first electrode driver 14. The controller 11 may be provided with the function of the drive signal generator 14A. The multiplexer 14B, the switch elements SW5 and xSW5, and the wires L1, L2, and L3 are formed on the first substrate 21.

In the present embodiment, the selection signal generator 15b generates the first selection signal Vsel$^+$ and the second selection signal Vsel$^-$ based on a predetermined code, but the present invention is not limited thereto. For example, the inverting circuit 15c may be provided, generating the second selection signal Vsel$^-$ by inverting the on state (the high level) and the off state (the low level) of the first selection signal Vsel$^+$ as illustrated in FIG. 15. An exemplary configuration of the inverting circuit 15c will be described later.

The drive circuit of the detector 30 illustrated in FIG. 15 is an example and can be variously modified. For example, as illustrated in FIG. 16, the detection gate driver 12B may include a scanning signal generator 15a, a shift register 15e, and latches 15f. In this case, the first selection signal Vsel$^+$ and the second selection signal Vsel$^-$ based on the square matrix $H_v$ of Formula (2) are sequentially, for example, serially supplied from the controller 11 to the scanning signal generator 15a. The scanning signal generator 15a generates the scanning signal Vscans based on the first selection signal Vsel$^+$ and the second selection signal Vsel$^-$.

The shift register 15e sequentially transfers the scanning signal Vscans received from the scanning signal generator 15a to the latch 15f. The latches 15f are formed corresponding to the detection gate lines GCLs illustrated in FIG. 8, respectively. For example, after the scanning signal Vscans corresponding to the first selection signal Vsel$^+$ is sequentially transferred to the latch 15f, the scanning signal Vscans is supplied to each detection gate line GCLs based on the clock signal. Thereafter, the scanning signal Vscans corresponding to the second selection signal Vsel$^-$ is transferred to the latch 15f, and rewriting is performed in the latch 15f. As described above, the first selection signal Vsel$^+$ and the second selection signal Vsel$^-$ may be serially transferred, and the scanning signal Vscans may be supplied from the latch 15f based on a predetermined clock signal.

The functions of the drive signal generator 14A, the multiplexer 14B, the switch elements SW5 and xSW5, and the wires L1, L2, and L3 illustrated in FIG. 16 are included in the first electrode driver 14 but may be included in a circuit formed separately from the first electrode driver 14. The controller 11 may be provided with the function of the drive signal generator 14A. The multiplexer 14B, the switch elements SW5 and xSW5, and the wires L1, L2, and L3 are formed on the first substrate 21.

Figure 17:
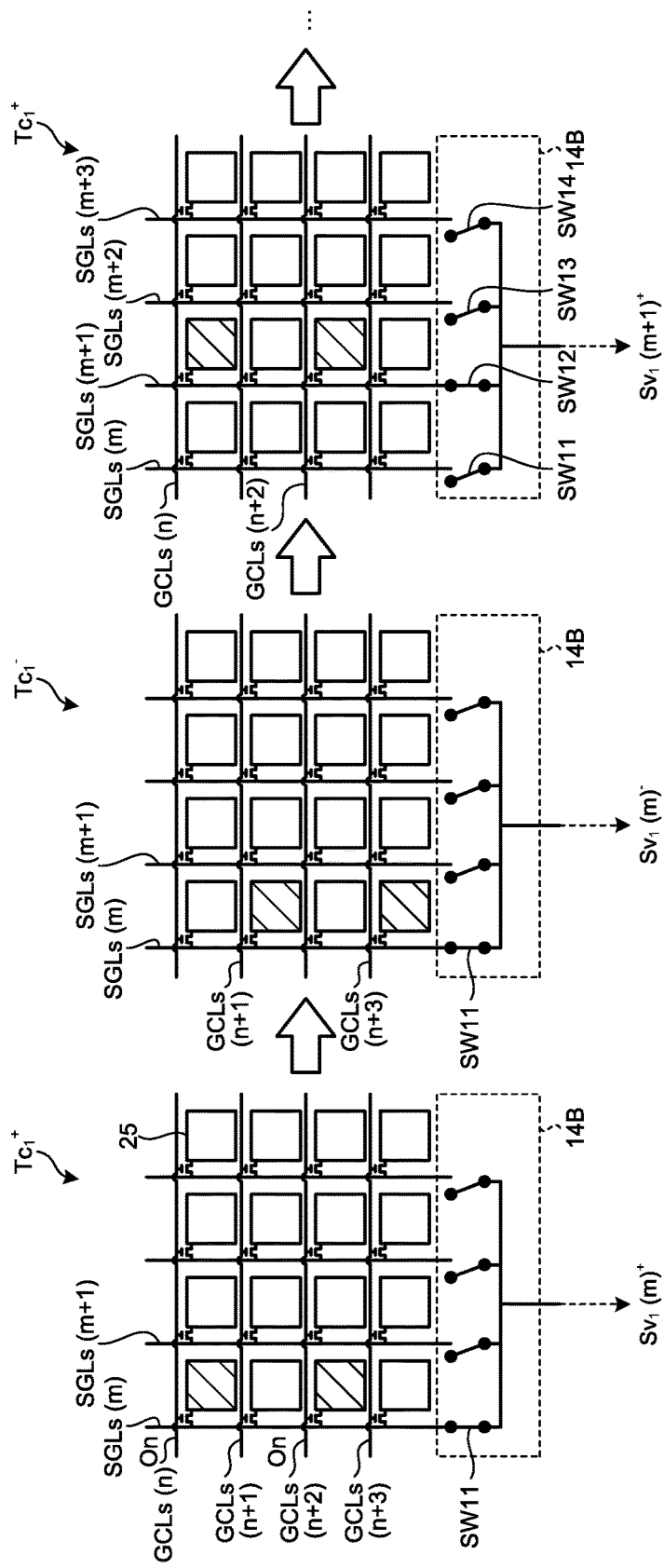
FIGS. 17A to 17C are explanatory diagrams illustrating an exemplary operation of a drive circuit according to the first embodiment.

FIGS. 17A to 17C are explanatory diagrams illustrating an exemplary operation of the drive circuit according to the first embodiment. FIG. 17A illustrates the positive sign selection operation $Tc_1^+$ of the second detection operation $Tc_1$, FIG. 17B illustrates the negative sign selection operation $Tc_1^-$ of the second detection operation $Tc_1$, and FIG. 17C illustrates the positive sign selection operation $Tc_1^+$ of the second detection operation $Tc_1$. The multiplexer 14B is coupled to the detector 30 as illustrated in FIGS. 15 and 16. In the multiplexer 14B, switches SW11 to SW14 are coupled to each of the detection data lines SGLs as illustrated in FIGS. 17A to 17C. First, as illustrated in FIG. 17A, in the positive sign selection operation $Tc_1^+$, the switch SW11 coupled to the detection data line SGLs(m) is turned on (opened), and the first output signals $Sv_1(m)^+$ is output from the selected first electrode 25. Then, as illustrated in FIG. 17B, in the negative sign selection operation $Tc_1^-$, the first electrodes 25 which are not included in the selection target in the positive sign selection operation $Tc_1^+$ are selected, and the second output signal $Sv_1(m)^-$ is output via the detection data line SGLs(m). Then, as illustrated in FIG. 17C, in the positive sign selection operation $Tc_1^+$, the switch SW12 coupled to the detection data line SGLs(m+1) is turned on (opened), and the first output signals $Sv_1(m+1)^+$ is output from the selected first electrode 25. In FIGS. 17A to 17C, the same first selection signal Vsel$^+$ is output, and the first electrodes 25 belonging to the same column are selected. As described above, the first selection signal Vsel$^+$ and the second selection signal Vsel$^-$ may be switched in units of detection data lines SGLs, and the detection operation may be performed.

Figure 18:
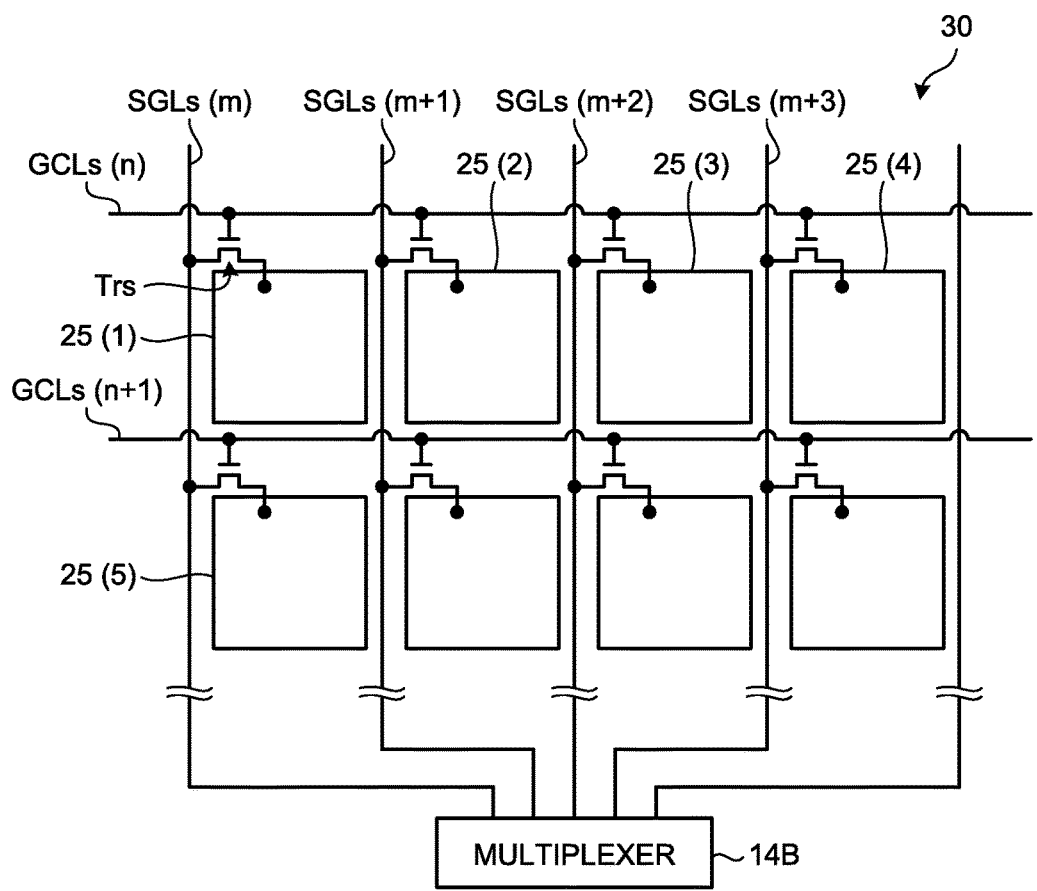
FIG. 18 is a schematic diagram for describing a detection order of the first electrodes.
Figure 19:
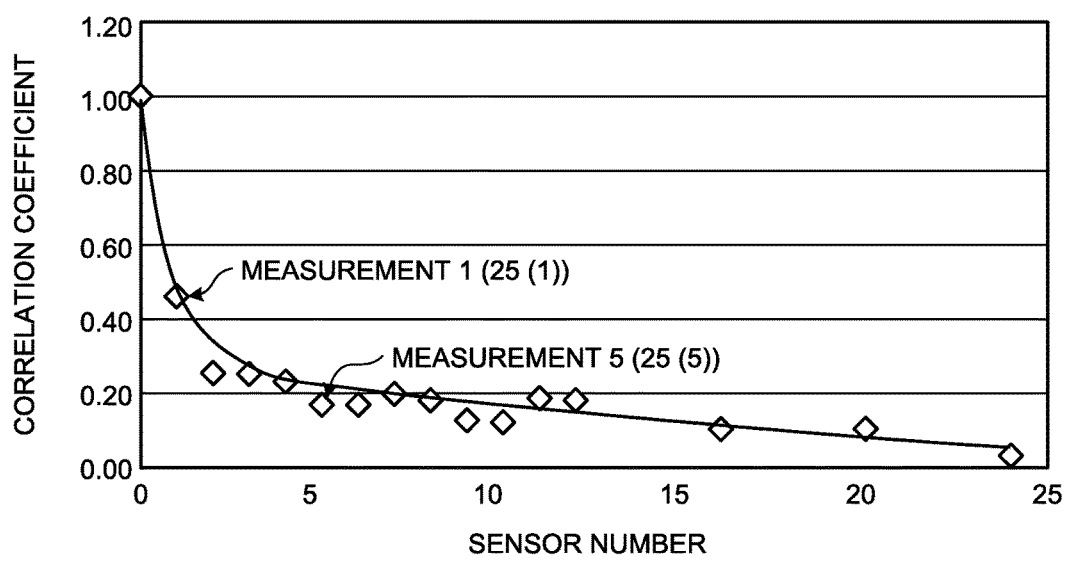
FIG. 19 is a graph schematically illustrating a relation between a sensor number and a correlation function.

FIG. 18 is a schematic diagram for describing a detection order of the first electrodes. FIG. 19 is a graph schematically illustrating a relation between a sensor number and a correlation function. FIGS. 18 and 19 are diagrams illustrating a relation between influence of noise and a detection timing in the detection device having the same configuration as in the present invention and diagrams for describing how influence of noise transitions. As illustrated in FIG. 18, among a plurality of first electrodes 25, first electrodes 25(1), 25(2), ... 25(5), ... are selected in this order, and the detection operation is performed. Specifically, the detection gate line GCLs(n) is selected, and the detection switching element Trs corresponding to the detection gate line GCLs(n) is turned on. The multiplexer 14B sequentially selects the detection data lines SGLs(m), SGLs(m+1), SGLs(m+2), and SGLs(m+3), and the detection drive signal Vs is supplied. Accordingly, the detection operation is performed in the order of the first electrodes 25(1), 25(2), 25(3), and 25(4). Then, the detection gate line GCLs(n+1) is selected, and the multiplexer 14B sequentially selects the detection data line SGLs(m), SGLs(m+1), SGLs(m+2), and SGLs(m+3), and the first electrodes 25(5), ... undergo the detection operation. The detection order illustrated in FIG. 18 is an order used for description, and the detection operation of the display device 1 and the detector 30 of the present embodiment is not limited thereto.

In FIG. 19, a horizontal axis indicates the sensor number and corresponds to a measurement order of the first electrode 25. A vertical axis indicates the correlation function of the output signal of each first electrode 25. When noise comes in to the detector 30, an error occurs in the output signal of each first electrode 25. The correlation function of the output signal of each first electrode 25 tends to decrease as the sensor number increases as illustrated in FIG. 19. In other words, it indicates that an error component caused by noise is increased with the lapse of time. For example, an error caused by influence of noise increases between the output signal of the first electrode 25(1) which is firstly measured and the output signal of the first electrode 25(5) which is fifthly measured.

Thus, the four first output signals $Sv_0^+$, $Sv_1^+$, $Sv_2^+$, and $Sv_3^+$ and the four second output signals $Sv_0^-$, $Sv_1^-$, $Sv_2^-$, and $Sv_3^-$ illustrated in FIGS. 11A to 11D are preferably measured in the order of $Sv_0^+$, $Sv_0^-$, $Sv_1^+$, $Sv_1^-$, $Sv_2^+$, $Sv_2^-$, $Sv_3^+$, and $Sv_3^-$. In this case, an interval between the detection periods of time of the first output signals $Sv_p^+$ and the second output signal $Sv_p^-$ (p=1, 2, 3, 4) decreases, and a difference of the noise component decreases. Since the output signal $Sv_p$ is obtained based on the difference between the first output signals $Sv_p^+$ and the second output signal $Sv_p^-$ as in $Sv_p = Sv_p^+ - Sv_p^-$, the noise component of the first output signals $Sv_p^+$ and the noise component of the second output signal $Sv_p^-$ are canceled.

Second Embodiment

Figure 20:
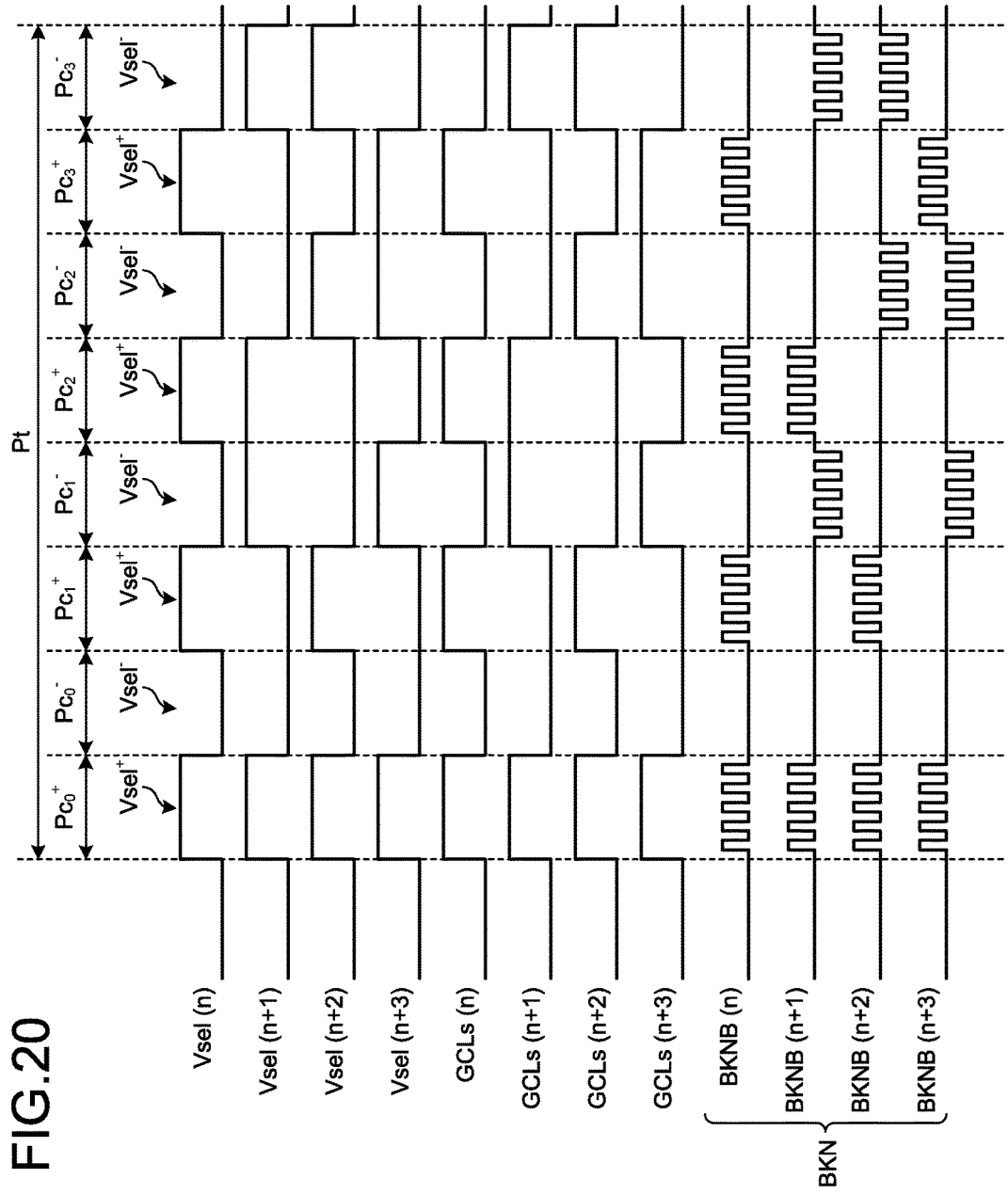
FIG. 20 is a timing waveform diagram illustrating an exemplary operation of a detector according to a second embodiment.

FIG. 20 is a timing waveform diagram illustrating an exemplary operation of a detector according to a second embodiment. In the present embodiment, as illustrated in FIG. 20, a polarity of the detection drive signal Vs supplied to the first electrodes 25 of the selection electrode block 25A in the positive sign selection operation period Pc$^+$ and a polarity of the detection drive signal Vs supplied to the first electrodes 25 of the selection electrode block 25A in the negative sign selection operation period Pc$^-$ are inverted to each other. In other words, the first drive signal and the second drive signal have different polarities. In other words, a positive voltage signal is supplied as the detection drive signal Vs to the first electrodes 25 of the first detection electrodes corresponding to the elements "1" of the square matrix $H_v$. Further, a negative voltage signal is supplied as the detection drive signal Vs to the first electrodes 25 of the second detection electrodes corresponding to the elements "–1" of the square matrix $H_v$.

In the present embodiment, for example, a positive signal is detected as the first output signal $Sv_p^+$, and a negative signal is detected as the second output signal $Sv_p^-$. Thus, the coordinate extractor 45 can calculate the output signal $Sv_p$ ($Sv_p = Sv_p^+ + Sv_p^-$) by calculating a sum of the first output signals $Sv_p^+$ and the second output signal $Sv_p^-$. The detection drive signal Vs is not limited thereto, and the negative voltage signal may be supplied to the first electrodes 25 of the first detection electrodes, and the positive voltage signal may be supplied to the first electrodes 25 of the second detection electrodes.

As described above, even when the detection drive signals Vs having the different polarities are supplied to the first electrode 25, the positive detection drive signal Vs and the negative detection drive signal Vs are supplied in different periods, and thus it is possible to reduce parasitic capacitance between the selected first electrode 25 and the non-selected first electrode 25 and suppress the occurrence of detection error or a reduction in detection sensitivity.

Third Embodiment

Figure 21:
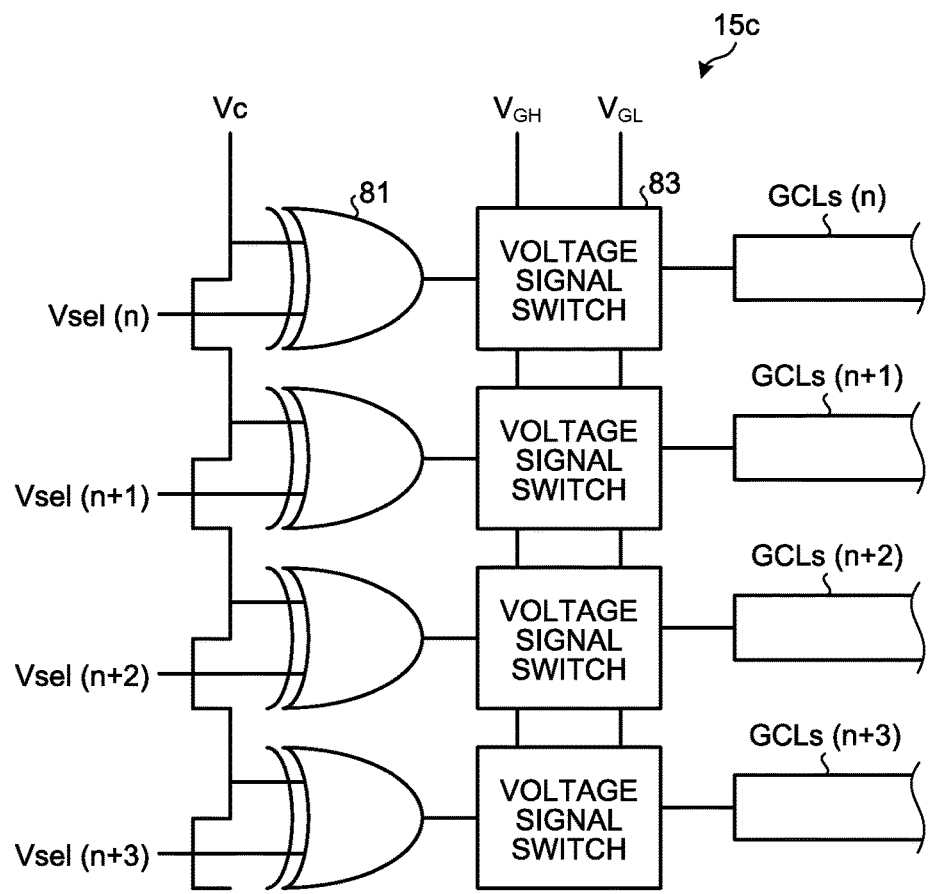
FIG. 21 is a circuit diagram for describing an example of an inverting circuit of a drive circuit according to a third embodiment.
Figure 22:
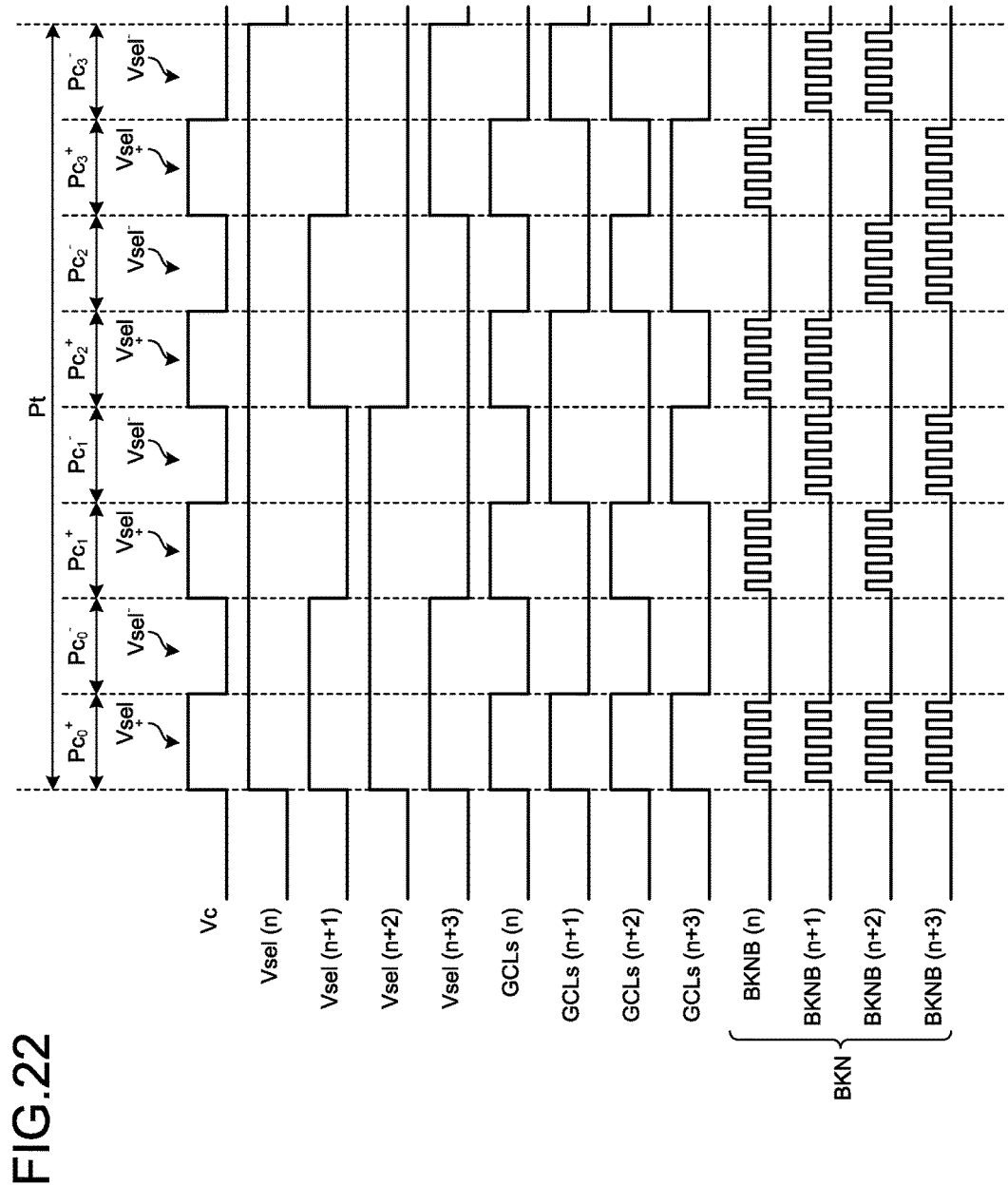
FIG. 22 is a timing waveform diagram illustrating an exemplary operation of the detector according to the third embodiment.

FIG. 21 is a circuit diagram for describing an example of an inverting circuit of a drive circuit according to a third embodiment. FIG. 22 is a timing waveform diagram illustrating an exemplary operation of a detector according to the third embodiment. In the first embodiment, the first electrodes 25 of the detection target are selected based on the first selection signal Vsel$^+$ corresponding to the elements "1" of the square matrix $H_v$ and the second selection signal Vsel$^-$ corresponding to the elements "–1" of the square matrix $H_v$, but the present invention is not limited thereto. The detection gate driver 12B may be equipped with the inverting circuit 15c as described above.

The inverting circuit 15c includes exclusive OR (XOR) circuits 81 and voltage signal switches 83 as illustrated in FIG. 21. The XOR circuits 81 and the voltage signal switches 83 are respectively coupled to the detection gate lines GCLs(n), GCLs(n+1), GCLs(n+2), and GCLs(n+3). The XOR circuits 81 are coupled to a clock generator (not illustrated) and supplied with a clock signal Vc. The XOR circuits 81 are supplied with the selection signals Vsel(n), Vsel(n+1), Vsel(n+2), and Vsel(n+3) of the selection signal generator 15b.

When the clock signal Vc is in the on state (the high level), and the selection signal Vsel is in the on state (the high level) or when the clock signal Vc is in the off (the low level), and the selection signal Vsel is in the off (the low level), the XOR circuit 81 outputs a high level signal. When the clock signal Vc is in the on state (the high level), and the selection signal Vsel is in the off (the low level) or when the clock signal Vc is in the off (the low level), and the selection signal Vsel is in the on state (the high level), the XOR circuit 81 outputs a low level signal.

The voltage signal switch 83 is supplied with a high level voltage signal $V_{GH}$ and a low level voltage signal $V_{GL}$. The voltage signal switch 83 performs switching of the high level voltage signal $V_{GH}$ and the low level voltage signal $V_{GL}$ according to the output signal of the XOR circuit 81, and outputs the high level voltage signal $V_{GH}$ or the low level voltage signal $V_{GL}$ as the scanning signal Vscans to the detection gate lines GCLs(n), GCLs(n+1), and GCLs(n+2), GCLs(n+3). When the high level signal is supplied from the XOR circuit 81, the voltage signal switch 83 outputs the high level voltage signal $V_{GH}$. When the low level signal is supplied from the XOR circuit 81, the voltage signal switch 83 outputs the low level voltage signal $V_{GL}$.

The clock signal Vc is a reference clock signal for performing switching of the positive sign selection operation period Pc$^+$ and the negative sign selection operation period Pc$^-$, and becomes the on state (the high level) in the positive sign selection operation period Pc$^+$ and become the off state (the low level) in the negative sign selection operation period Pc$^-$ as illustrated in FIG. 22.

The selection signals Vsel(n), (n+1), (n+2), and (n+3) are signals that become the on state (the high level), corresponding to the elements "1" of the square matrix $H_v$, and become the off state (the low level), corresponding to the elements "–1" as illustrated in FIG. 22. In the present embodiment, the first selection signal Vsel$^+$ of the positive sign selection operation period Pc$^+$ and the second selection signal Vsel$^-$ of the negative sign selection operation period Pc$^-$ are signals that become the on state (the high level), corresponding to the elements "1" of the square matrix $H_v$.

As described above, the selection signals Vsel(n), Vsel(n+1), Vsel(n+2), and Vsel(n+3) of the selection signal generator 15b and the clock signal Vc are input to the XOR circuit 81. Accordingly, since the clock signal Vc become the on state (the high level) in the positive sign selection operation period Pc$^+$, when the selection signal Vsel become the on state (the high level), the XOR circuit 81 outputs the high level signal as illustrated in FIG. 22. Accordingly, the voltage signal switch 83 outputs the high level voltage signal $V_{GH}$ to the detection gate line GCLs. As described above, the first electrodes 25 of the first detection electrodes corresponding to the elements "1" of the square matrix $H_v$ are selected according to the selection signal Vsel.

Since the clock signal Vc becomes the off (the low level) in the negative sign selection operation period Pc$^-$, when the selection signal Vsel becomes the off (the low level), the XOR circuit 81 outputs the high level signal. Accordingly, the voltage signal switch 83 outputs the high level voltage signal $V_{GH}$ to the detection gate line GCLs. Accordingly, as illustrated in FIG. 22, in the negative sign selection operation period Pc$^-$, the first electrodes 25 of the second detection electrodes corresponding to the elements "–1" of the square matrix $H_v$ are selected according to the selection signal Vsel.

As described above, the inverting circuit 15c is installed, and the first electrodes 25 of the first detection electrodes corresponding to the elements "1" of the square matrix $H_v$ and the first electrodes 25 of the second detection electrodes corresponding to the elements "–1" of the square matrix $H_v$ are selected in the time division manner based on the selection signal Vsel that becomes the on state (the high level) according to the element "1" of the square matrix $H_v$. The inverting circuit 15c illustrated in FIG. 21 is merely an example and may be appropriately modified.

Fourth Embodiment

In the above embodiments, the example in which the code division selection driving is performed on the detection electrode block 25B(m), and the touch input position in the column direction is detected has been described, but the above embodiments may be applied to detection in the row direction. FIGS. 23A to 23D are explanatory diagrams for describing another example of the selection pattern of the first electrodes selected as the detection target according to a fourth embodiment. FIG. 23A illustrates a positive sign selection operation $Td_0^+$ and a negative sign selection operation $Td_0^-$ of a first detection operation $Td_0$. FIG. 23B illustrates a positive sign selection operation $Td_1^+$ and a negative sign selection operation $Td_1^-$ of a second detection operation $Td_1$. FIG. 23C illustrates a positive sign selection operation $Td_2^+$ and a negative sign selection operation $Td_2^-$ of a third detection operation $Td_2$. FIG. 23D illustrates a positive sign selection operation $Td_3^+$ and a negative sign selection operation $Td_3^-$ of the fourth detection operation $Td_3$.

In FIGS. 23A to 23D, one second electrode block BKNB(n) will be described. The second electrode block BKNB(n) includes a plurality of first electrodes 25 coupled to a multiplexer 14B via the common wire L3. The second electrode block BKNB(n) includes four first electrodes 25 arranged in the row direction, and the four first electrodes 25 respectively correspond to the detection electrode blocks 25B(m), 25B(m+1), 25B(m+2), and 25B(m+3). The four first electrodes 25 are coupled to the multiplexer 14B. In the detector 30 of the present embodiment, the multiplexer 14B selects the first electrodes 25 serving as the detection target in the second electrode block BKNB(n) based on a predetermined code. The detection drive signal Vs is supplied to the selected first electrode 25, and each of the first electrodes 25 outputs the detection signal based on a change in the capacitance of the first electrode 25. Similarly to Formula (1), an output signal $Sh_r$ (r=0, 1, 2, 3) obtained by integrating the detection signals of each of the first electrodes 25 is output.

For example, the predetermined code is defined by a square matrix $H_h$ of the following Formula (6) and similar to the square matrix $H_v$ indicated by Formula (1). The square matrix $H_h$ is not limited thereto, and may be any other Hadamard matrix. An order of the square matrix $H_h$ is the number of first electrodes 25 included in the second electrode block BKNB(n), that is, 4 which is the number of four detection electrode blocks 25B. In the present embodiment, the second electrode block BKNB(n) including the four first electrodes 25 will be described, but the present invention is not limited thereto, the number of first electrodes 25 arranged in the row direction may be two, three, or five or more. In this case, the order of the square matrix $H_h$ also changes according to the number of first electrodes 25.

$$H_h = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (6)$$

In FIGS. 23A to 23D, an example of the code division selection driving in which the detection operation is divided into four, the first detection operation $Td_0$, the second detection operation $Td_1$, the third detection operation $Td_2$, and the fourth detection operation $Td_3$ will be described. In the first detection operation $Td_0$ illustrated in FIG. 23A, the first electrodes 25 are selected according to selection signals corresponding to a first row of the square matrix $H_h$. In the second detection operation $Td_1$ illustrated in FIG. 23B, the first electrodes 25 are selected according to selection signals corresponding to a second row of the square matrix $H_h$. In the third detection operation $Td_2$ illustrated in FIG. 23C, the first electrodes 25 are selected according to selection signals corresponding to a third row of the square matrix $H_h$. In the fourth detection operation $Td_3$ illustrated in FIG. 23D, the first electrodes 25 are selected according to selection signals corresponding to a fourth row of the square matrix $H_h$.

The first detection operation $Td_0$, the second detection operation $Td_1$, the third detection operation $Td_2$, and the fourth detection operation $Td_3$ include positive sign selection operations $Td_0^+$, $Td_1^+$, $Td_2^+$, and $Td_3^+$ and negative sign selection operations $Td_0^-$, $Td_1^-$, $Td_2^-$, and $Td_3^-$, respectively. In the positive sign selection operations $Td_0^+$, $Td_1^+$, $Td_2^+$, and $Td_3^+$, the first electrodes 25 serving as the first detection electrodes in the second electrode block BKNB(n) are selected according to a first selection signal corresponding to the element "1" of the square matrix $H_h$. In FIGS. 23A to 23D, the selected first electrodes 25 are hatched. A first output signal $Sh_p^+$ (p=0, 1, 2, 3) is output from the first electrodes 25 of the first detection electrodes through the multiplexer 14B. Here, the first output signal $Sh_p^+$ is a signal obtained by integrating the detection signals of the first electrodes 25 of the first detection electrodes included in the second electrode block BKNB(n).

In the negative sign selection operations $Td_0^-$, $Td_1^-$, $Td_2^-$, and $Td_3^-$, the first electrodes 25 of the second detection electrodes which are not included in the first detection electrodes in the second electrode block BKNB(n) are selected according to a second selection signal corresponding to the element "−1" of the square matrix $H_h$. A second output signal $Sh_p^-$ (p=0, 1, 2, 3) is output from the first electrodes 25 of the second detection electrodes through the multiplexer 14B. Here, the second output signal $Sh_p^-$ is a signal obtained by integrating the detection signals of the first electrodes 25 of the second detection electrodes included in the second electrode block BKNB(n). In the present embodiment, the positive sign selection operation $Td_p^+$ (p=0, 1, 2, 3) and the negative sign selection operation $Td_p^-$ (p=0, 1, 2, 3) are performed in the time division manner. Thus, since the output signals are output to one voltage detector DET (see FIG. 3) in the time division manner, it is possible to simplify the configuration of the signal processor 40.

The signal operation circuitry 44 of the signal processor 40 (see FIG. 2) calculates the output signal $Sh_p = Sh_p^+ - Sh_p^-$ by calculating a difference between the first output signals $Sh_p^+$ and the second output signal $Sh_p^-$. The signal operation circuitry 44 outputs the output signal $Sh_p$ to the storage 47 so that the output signal $Sh_p$ is temporarily stored. The first output signals $Sh_p^+$ and the second output signal $Sh_p^-$ correspond to the detection signal Vdet in the basic principle of the touch detection of the self-capacitance scheme.

When the order of the square matrix $H_h$ is 4, similarly to Formula (3), four output signals ($Sh_0$, $Sh_1$, $Sh_2$, $Sh_3$) are obtained from one second electrode block BKNB(n). In this case, the output signals ($Sh_0$, $Sh_1$, $Sh_2$, and $Sh_3$) are respectively obtained from four first output signals $Sh_0^+$, $Sh_1^+$, $Sh_2^+$, and $Sh_3^+$ and four second output signals $Sh_0^-$, $Sh_1^-$, $Sh_2^-$, and $Sh_3^-$.

As illustrated in FIG. 23A, in the positive sign selection operation $Td_0^+$ of the first detection operation $Td_0$, the four first electrodes 25 are selected as the first detection electrodes corresponding to the elements "1" in the first row of the square matrix $H_h$. Specifically, the four first electrodes 25 is coupled to the multiplexer 14B, and the detection of the basic principle of the self-capacitance scheme is performed by the first electrodes 25 of the first detection electrodes. A signal obtained by integrating the detection signals of the four first electrodes 25 is output as the first output signal $Sh_0^+$.

In the negative sign selection operation $Td_0^-$ of the first detection operation $Td_0$, since there is no element "−1" in the first row of the square matrix $H_h$, the first electrode 25 are not selected as the second detection electrodes corresponding to the element "−1." Thus, the second output signal $Sh_0^-$ is $Sh_0^-=0$. The output signal $Sh_0=Sh_0^+-Sh_0^-$ is calculated based on a difference between the first output signal $Sh_0^+$ and the second output signal $Sh_0^-$.

Then, as illustrated in FIG. 23B, in the positive sign selection operation $Td_1^+$ of the second detection operation $Td_1$, the two first electrodes 25 belonging to the detection electrode blocks 25B(m) and 25B(m+2) are selected as the first detection electrodes corresponding to the elements "1" in the second row of the square matrix $H_h$ and coupled to the multiplexer 14B. The first output signal $Sh_1^+$ is output from the first electrode 25 selected as the first detection electrode.

In the negative sign selection operation $Td_1^-$ of the second detection operation $Td_1$, the two first electrodes 25 belonging to the detection electrode blocks 25B(m+1) and 25B(m+3) are selected as the second detection electrode corresponding to the elements "−1" in the second row of the square matrix $H_h$. The second output signal $Sh_1^-$ is output from the first electrode 25 selected as the second detection electrode. The output signal $Sh_1=Sh_1^+-Sh_1^-$ is calculated based on a difference between the first output signals $Sh_1^+$ and the second output signal $Sh_1^-$.

Then, as illustrated in FIG. 23C, in the positive sign selection operation $Td_2^+$ of the third detection operation $Td_2$, the two first electrodes 25 belonging to the detection electrode blocks 25B(m) and 25B(m+1) are selected as the first detection electrodes corresponding to the elements "1" in the third row of the square matrix $H_h$. The first output signal $Sh_2^+$ is output from the first electrode 25 selected as the first detection electrode.

In the negative sign selection operation $Td_2^-$ of the third detection operation $Td_2$, the two first electrodes 25 belonging to the detection electrode blocks 25B(m+2) and 25B(m+3) are selected as the second detection electrodes corresponding to the elements "−1" in the third row of the square matrix $H_h$. The second output signal $Sh_2^-$ is output from the first electrode 25 selected as the second detection electrode. The output signal $Sh_2=Sh_2^+-Sh_2^-$ is calculated based on a difference between the first output signals $Sh_2^+$ and the second output signal $Sh_2^-$.

Then, as illustrated in FIG. 23D, in the positive sign selection operation $Td_3^+$ of the fourth detection operation $Td_3$, the two first electrodes 25 belonging to the detection electrode blocks 25B(m) and 25B(m+3) are selected as the first detection electrodes corresponding to the elements "1" in the fourth row of the square matrix $H_h$. The first output signal $Sh_3^+$ is output from the first electrode 25 selected as the first detection electrode.

In the negative sign selection operation $Td_3^-$ of the fourth detection operation $Td_3$, the two first electrodes 25 belonging to the detection electrode blocks 25B(m+1) and 25B(m+2) are selected the second detection electrodes corresponding to the elements "−1" in the fourth row of the square matrix $H_h$. The second output signal $Sh_3^-$ is output from the first electrode 25 selected as the second detection electrode. The output signal $Sh_3=Sh_3^+-Sh_3^-$ is calculated based on a difference between the first output signal $Sh_3^+$ and the second output signal $Sh_3^-$.

The signal operation circuitry 44 sequentially outputs the four output signals $Sh_0$, $Sh_1$, $Sh_2$, and $Sh_3$ to the storage 47. The coordinate extractor 45 (see FIG. 2) receives the output signals $Sh_0$, $Sh_1$, $Sh_2$, and $Sh_3$ calculated by the signal operation circuitry 44 from the storage 47, and performs the decoding process, similarly to Formula (4). The coordinate extractor 45 can obtain coordinates at which the finger touches or approaches in the second electrode block BKNB(n) by calculating the decoded signal.

As described above, the detection of the touch input position in the row direction can be performed through the code division selection driving. In the present embodiment, by performing the decoding process, a signal strength which is four times higher than in the time division selection driving is obtained from the output signal obtained by integrating the detection signals of the first electrodes 25 without increasing a voltage of a signal value of each node.

In the present embodiment, the four first electrodes 25 of the second electrode block BKNB(n) are coupled to the common multiplexer 14B. Thus, the positive sign selection operation $Td_r^+$ and the negative sign selection operation $Td_r^-$ may be performed in the time division manner or may be performed simultaneously. When the positive sign selection operation $Td_r^+$ and the negative sign selection operation $Td_r^-$ are performed simultaneously, two voltage detectors DET (see FIG. 3) may be installed to detect the first output signal $Sh_3^+$ and the second output signal $Sh_3^-$.

Fifth Embodiment

Next, an exemplary operation when the code division selection driving is applied to detection of a touch input position in a first direction $D_x$ and a second direction $D_y$ will be described with reference to FIGS. 24A to 31D. FIGS. 24A to 24D are explanatory diagrams for describing an example of a selection pattern of first electrodes selected as the detection target in first and second detection operations according to a fifth embodiment. FIGS. 25A to 25D is an explanatory diagram for describing an example of a selection pattern of first electrodes selected as the detection target in third and fourth detection operations. FIGS. 26A to 26D are explanatory diagrams for describing an example of a selection pattern of first electrodes selected as the detection target in fifth and sixth detection operations. FIGS. 27A to 27D are explanatory diagrams for describing an example of a selection pattern of first electrodes selected as the detection target in seventh and eighth detection operations. FIGS. 28A to 28D are explanatory diagrams for describing an example of a selection pattern of first electrodes selected as the detection target in ninth and tenth detection operations. FIGS. 29A to 29D are explanatory diagrams for describing an example of a selection pattern of first electrodes selected as the detection target in eleventh and twelfth detection operations. FIGS. 30A to 30D are explanatory diagrams for describing an example of a selection pattern of first electrodes selected as the detection target in thirteenth and fourteenth detection operations. FIGS. 31A to 31D are explanatory diagram for describing an example of a selection pattern of first electrodes selected as the detection target in fifteenth and sixteenth detection operations.

In FIGS. 24A to 31D, the code division selection driving is performed using a combination of the selection pattern of the first electrodes illustrated in FIG. 12 and the selection pattern of the first electrodes illustrated in FIG. 19.

Figure 24A:
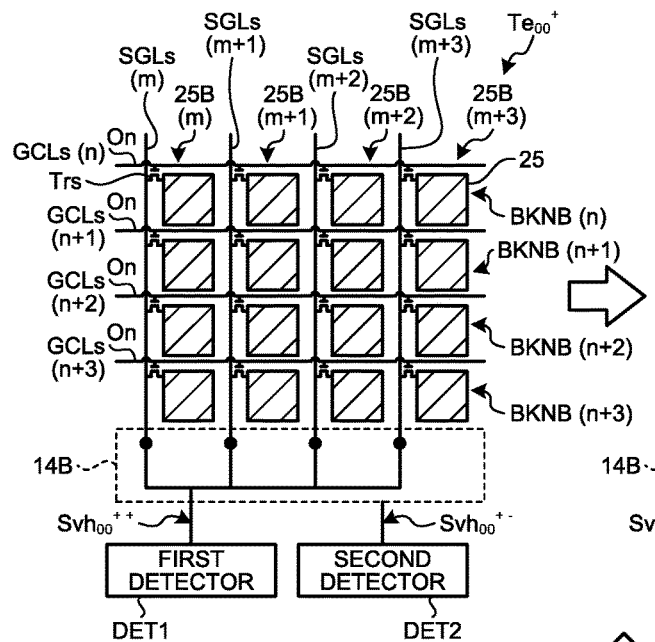
FIGS. 24A to 24D are explanatory diagrams for describing an example of a selection pattern of first electrodes selected as a detection target in first and second detection operations according to a fifth embodiment.
Figure 24B:
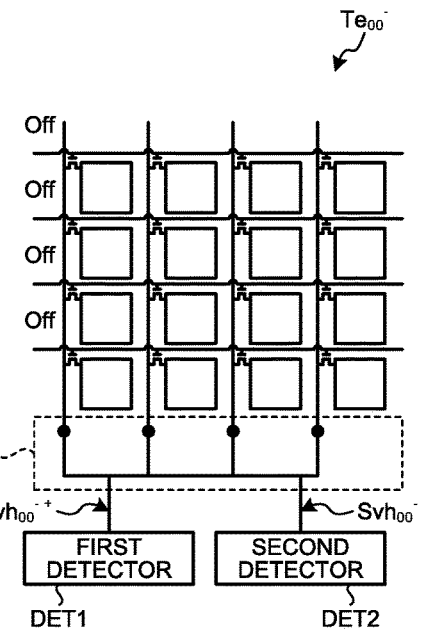
Figure 24C:
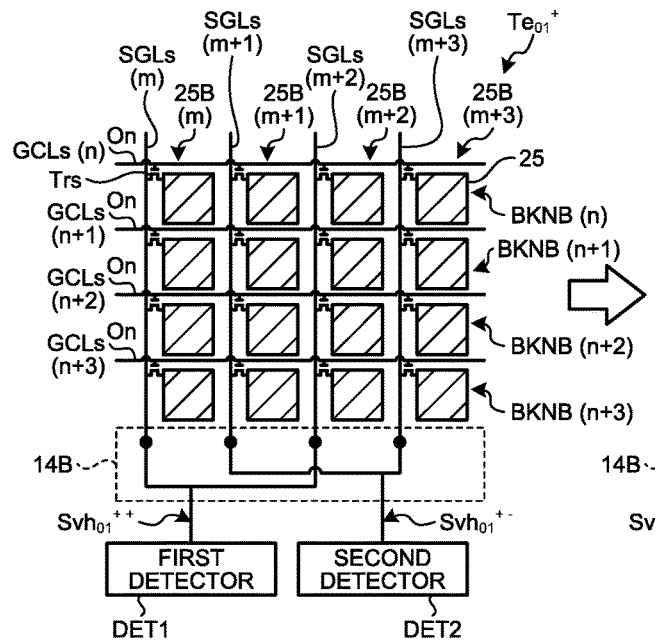
Figure 24D:
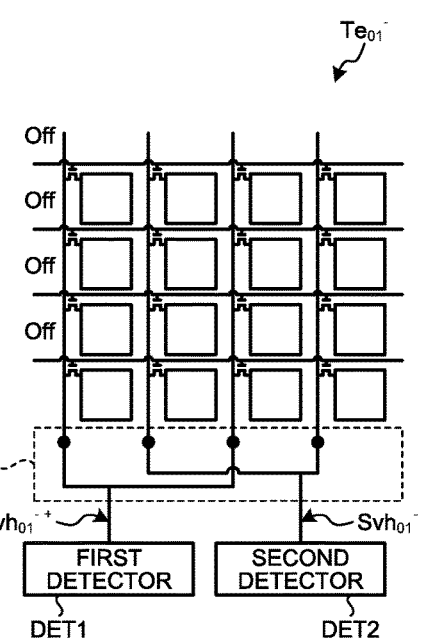

FIG. 24A illustrates a positive sign selection operation $Te_{00}^+$ of the first detection operation, FIG. 24B illustrates a negative sign selection operation $Te_{00}^-$ of the first detection operation, FIG. 24C illustrates a positive sign selection operation $Te_{01}^+$ of the second detection operation, and FIG. 24D illustrates a negative sign selection operation $Te_{01}^-$ of the second detection operation. In FIG. 24A, in the code division selection driving in the second direction $D_y$, the first electrodes 25 belonging to the second electrode blocks BKNB(n), BKNB(n+1), BKNB(n+2), and BKNB(n+3) are selected as the first electrodes 25 of the first detection electrodes of the square matrix $H_v$, corresponding to the elements "1" in the first row of the square matrix $H_v$. In other words, the first electrodes 25 coupled to the detection gate lines GCLs(n), GCLs(n+1), GCLs(n+2), and GCLs(n+3) are selected.

Further, in FIG. 24A, in the code division selection driving in the first direction $D_x$, the positive sign selection operation and the negative sign selection operation are simultaneously performed. The first electrodes 25 belonging to the detection electrode blocks 25B(m), 25B(m+1), 25B(m+2), and 25B(m+3) are selected as the first electrodes 25 of the first detection electrodes of the square matrix $H_h$, corresponding to the elements "1" in the first row of the square matrix $H_h$ and coupled to a first detector DET1 through the multiplexer 14B. Since there is no element "−1" in the first row of the square matrix $H_h$, the first electrode 25 is not selected as the second detection electrode of the square matrix $H_h$ corresponding to the element "−1."

A signal obtained by integrating the detection signals of each first electrode 25 is output as a first output signal $Svh_{00}^{++}$. A second output signal $Svh_{00}^{+-}$ is $Svh_{00}^{+-}=0$. An output signal $Svh_{00}^+ = Svh_{00}^{++} - Svh_{00}^{+-}$ is calculated based on a difference thereof.

In FIG. 24B, in the code division selection driving in the second direction $D_y$, since there is no element "−1" in the first row of the square matrix $H_v$, the first electrodes 25 belonging to the second electrode blocks BKNB(n), BKNB(n+1), BKNB(n+2), and BKNB(n+3) are not selected as the second detection electrodes of the square matrix $H_v$ corresponding to the element "−1."

A first output signal $Svh_{00}^{-+}$ and a second output signal $Svh_{00}^-$ are $Svh_{00}^{-+}=Svh_{00}^{--}=0$. An output signal $Svh_{00}^- = Svh_{00}^{-+} - Svh_{00}^{--}$ is calculated based on a difference thereof. An output signal $Svh_{00}$ in the first detection operation is calculated based on a difference between the output signal $Svh_{00}^+$ and the output signal $Svh_{00}^-$.

In FIGS. 24C and 24D, in the code division selection driving in the second direction $D_y$, selection similar to those of FIGS. 24A and 24B is performed. In the code division selection driving in the first direction $D_x$, the first electrodes 25 of the detection electrode blocks 25B(m) and 25B(m+2) are selected as the first detection electrodes of the square matrix $H_h$, corresponding to the elements "1" in the second row of the square matrix $H_h$. Further, the first electrodes 25 of the detection electrode blocks 25B(m+1) and 25B(m+3) are selected as the second detection electrodes of the square matrix $H_h$, corresponding to the elements "−1" in the second row of the square matrix $H_h$. In the positive sign selection operation $Te_{01}^+$ of the second detection operation illustrated in FIG. 24C, an output signal $Svh_{01}^+ = Svh_{01}^{++} - Svh_{01}^{+-}$ is calculated. In the negative sign selection operation $Te_{01}^-$ of the second detection operation illustrated in FIG. 24D, an output signal $Svh_{01}^- = Svh_{01}^{-+} - Svh_{01}^{--}$ is calculated. An output signal $Svh_{01}$ in the second detection operation is calculated based on a difference between the output signal $Svh_{01}^+$ and the output signal $Svh_{01}^-$.

FIG. 25A illustrates a positive sign selection operation $Te_{02}^+$ of the third detection operation, FIG. 25B illustrates a negative sign selection operation $Te_{02}^-$ of the third detection operation, FIG. 25C illustrates a positive sign selection operation $Te_{03}^+$ of the fourth detection operation, and FIG. 25D illustrates a negative sign selection operation $Te_{03}^-$ of the fourth detection operation. In FIGS. 25A to 25D, the code division selection driving in the second direction $D_y$ is similar to that in FIGS. 24A to 24D. In other words, the first electrodes 25 of the first detection electrodes of the square matrix $H_v$ and the first electrodes 25 of the second detection electrodes of the square matrix $H_v$ are selected, corresponding to the elements "1" in the first row of the square matrix $H_v$.

In FIGS. 25A and 25B, in the code division selection driving in the first direction $D_x$, the first electrodes 25 of the detection electrode blocks 25B(m) and 25B(m+1) are selected as the first detection electrodes of the square matrix $H_h$, corresponding to the elements "1" in the third row of the square matrix $H_h$. Further, the first electrodes 25 of the detection electrode blocks 25B(m+2) and 25B(m+3) are selected as the second detection electrodes of the square matrix $H_h$, corresponding to the elements "−1" in the third row of the square matrix $H_h$. In the positive sign selection operation $Te_{02}^+$ of the third detection operation illustrated in FIG. 25A, an output signal $Svh_{02}^+ = Svh_{02}^{++} - Svh_{02}^{+-}$ is calculated. In the negative sign selection operation $Te_{02}^-$ of the third detection operation illustrated in FIG. 25B, an output signal $Svh_{02}^- = Svh_{02}^{-+} - Svh_{02}^{--}$ is calculated. An output signal $Svh_{02}$ in the third detection operation is calculated based on a difference between the output signal $Svh_{02}^+$ and the output signal $Svh_{02}^-$.

In FIGS. 25C and 25D, in the code division selection driving in the first direction $D_x$, the first electrodes 25 of the detection electrode blocks 25B(m) and 25B(m+3) are selected as the first detection electrodes of the square matrix $H_h$, corresponding to the elements "1" in the fourth row of the square matrix $H_h$. Further, the first electrodes 25 of the detection electrode blocks 25B(m+1) and 25B(m+2) are selected as the second detection electrodes of the square matrix $H_h$, corresponding to the elements "−1" in the third row of the square matrix $H_h$. In the positive sign selection operation $Te_{03}^+$ of the fourth detection operation illustrated in FIG. 25C, an output signal $Svh_{03}^+ = Svh_{03}^{++} - Svh_{03}^{+-}$ is calculated. In the negative sign selection operation $Te_{03}^-$ of the fourth detection operation illustrated in FIG. 25D, an output signal $Svh_{03}^- = Svh_{03}^{-+} - Svh_{03}^{--}$ is calculated. An output signal $Svh_{03}$ in the fourth detection operation is calculated based on a difference between the output signal $Svh_{03}^+$ and the output signal $Svh_{03}^-$.

Figure 26A:
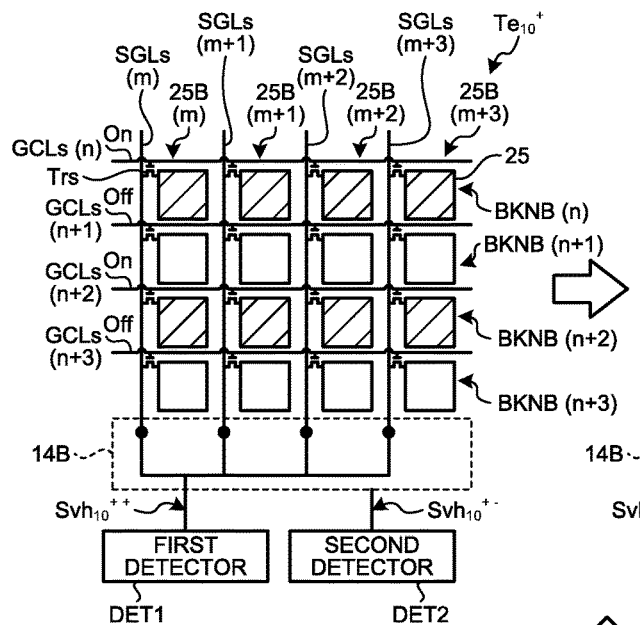
FIGS. 26A to 26D are explanatory diagrams for describing an example of a selection pattern of first electrodes selected as a detection target in fifth and sixth detection operations.
Figure 26B:
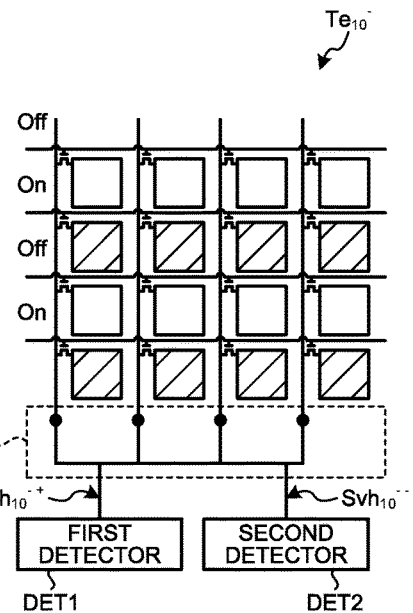
Figure 26C:
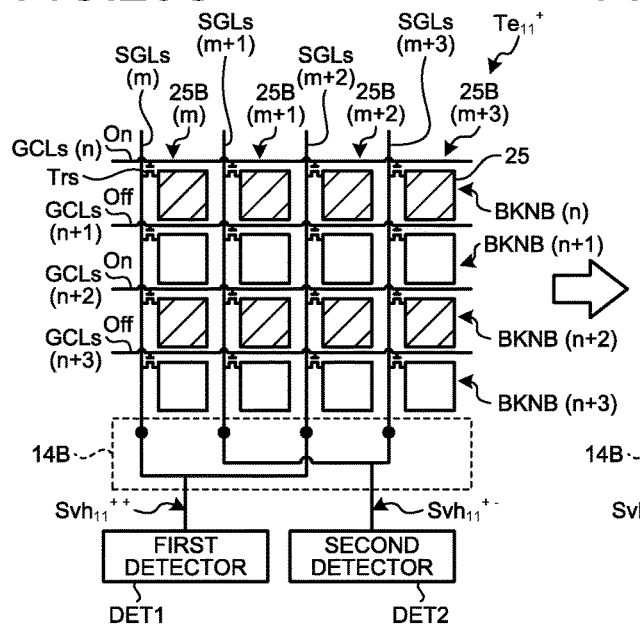
Figure 26D:
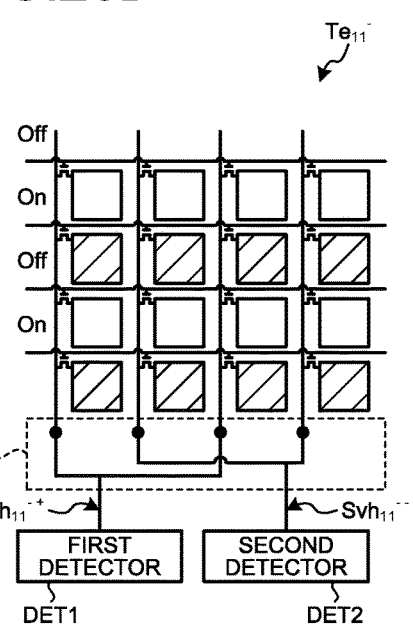
Figure 27A:
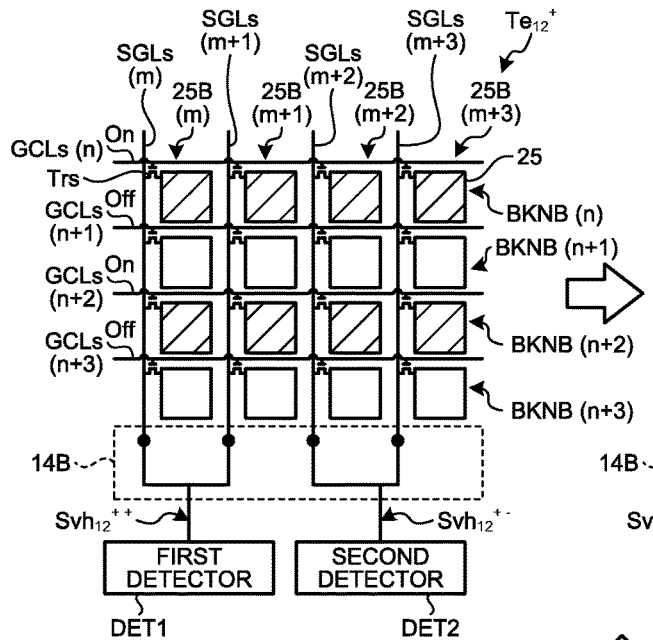
FIGS. 27A to 27D are explanatory diagrams for describing an example of a selection pattern of first electrodes selected as a detection target in seventh and eighth detection operations.
Figure 27B:
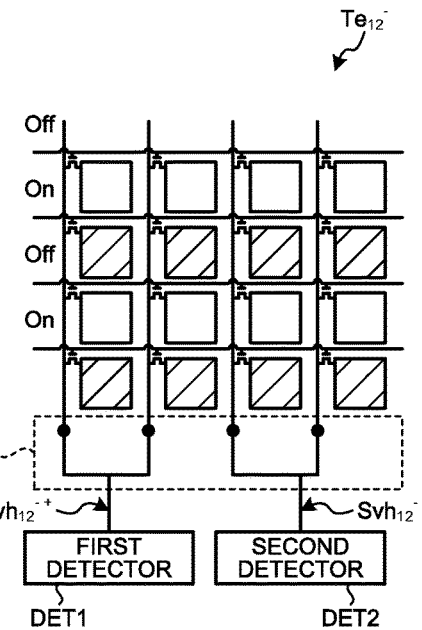
Figure 27C:
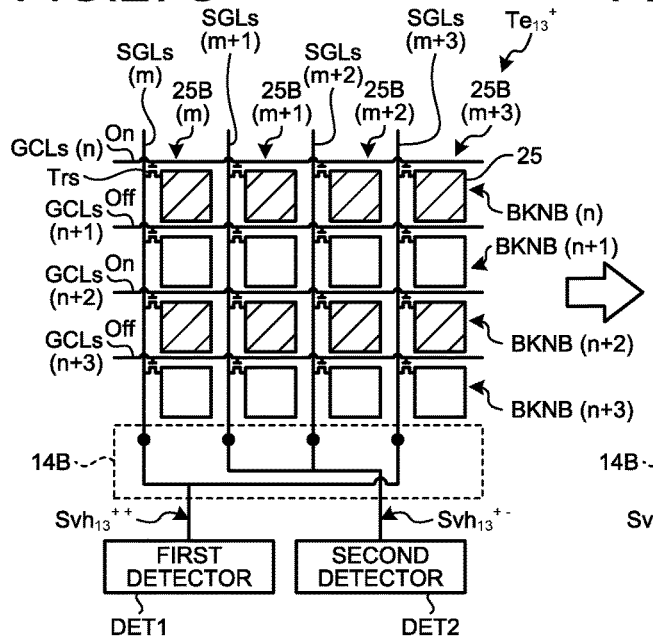
Figure 27D:
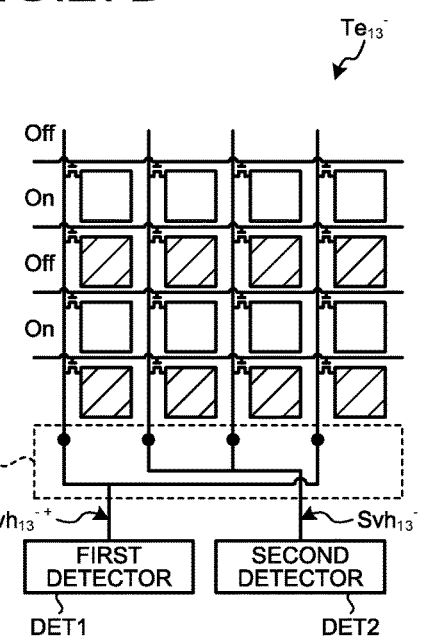

FIG. 26A illustrates a positive sign selection operation $Te_{10}^+$ of the fifth detection operation, FIG. 26B illustrates a negative sign selection operation $Te_{10}^-$ of the fifth detection operation, FIG. 26C illustrates a positive sign selection operation $Te_{11}^+$ of the sixth detection operation, and FIG. 26D illustrates a negative sign selection operation $Te_{11}^-$ of the sixth detection operation. FIG. 27A illustrates a positive sign selection operation $Te_{12}^+$ of the seventh detection operation, FIG. 27B illustrates a negative sign selection operation $Te_{12}^-$ of the seventh detection operation, FIG. 27C illustrates a positive sign selection operation $Te_{13}^+$ of the eighth detection operation, and FIG. 27D illustrates a negative sign selection operation $Te_{13}^-$ of the eighth detection operation.

As illustrated in FIGS. 26A to 26D and FIGS. 27A to 27D, in the code division selection driving in the first direction $D_x$ of the fifth to eighth detection operations, similarly to FIGS. 24A to 24D and FIGS. 25A to 25D, the first electrodes 25 of the first detection electrodes of the square matrix $H_h$ and the first electrodes 25 of the second detection electrodes of the square matrix $H_h$ are selected.

In the positive sign selection operation $Te_{10}^+$ of the fifth detection operation illustrated in FIG. 26A, the first electrodes 25 of the second electrode blocks BKNB(n) and BKNB(n+2) are selected as the first electrodes 25 of the first detection electrodes of the square matrix $H_v$, corresponding to the elements "1" in the second row of the square matrix $H_v$. Further, the first electrodes 25 belonging to the detection electrode blocks 25B(m), 25B(m+1), 25B(m+2), and 25B(m+3) are selected as the first electrodes 25 of the first detection electrodes of the square matrix $H_h$, corresponding to the elements "1" in the first row of the square matrix $H_h$. In the positive sign selection operation $Te_{10}^+$ of the fifth detection operation illustrated in FIG. 26A, an output signal $Svh_{10}^+ = Svh_{10}^{++} - Svh_{10}^{+-}$ is calculated.

In the negative sign selection operation $Te_{10}^-$ of the fifth detection operation illustrated in FIG. 26B, the first electrodes 25 of the second electrode blocks BKNB(n+1) and BKNB(n+3) are selected as the first electrodes 25 of the second detection electrodes of the square matrix $H_v$, corresponding to the elements "−1" in the second row of the square matrix $H_v$. In the negative sign selection operation $Te_{10}^-$ of the fifth detection operation illustrated in FIG. 26B, an output signal $Svh_{10}^- = Svh_{10}^{-+} - Svh_{10}^{--}$ is calculated. An output signal $Svh_{10}$ in the fifth detection operation is calculated based on a difference between the output signal $Svh_{10}^+$ and the output signal $Svh_{10}^-$.

In the sixth detection operations of FIGS. 26C and 26D, in the code division selection driving in the second direction $D_y$, selection similar to that in FIGS. 26A and 26B is performed. In the code division selection driving in the first direction $D_x$, the first electrodes 25 of the detection electrode blocks 25B(m) and 25B(m+2) are selected as the first detection electrodes of the square matrix $H_h$, corresponding to the elements "1" in the second row of the square matrix $H_h$. Further, the first electrodes 25 of the detection electrode blocks 25B(m+1) and 25B(m+3) are selected as the second detection electrodes of the square matrix $H_h$, corresponding to the elements "−1" in the second row of the square matrix $H_h$. In the positive sign selection operation $Te_{11}^+$ of the sixth detection operation illustrated in FIG. 26C, an output signal $Svh_{11}^+ = Svh_{11}^{++} - Svh_{11}^{+-}$ is calculated. In the negative sign selection operation $Te_{11}^-$ of the sixth detection operation illustrated in FIG. 26D, an output signal $Svh_{11}^- = Svh_{11}^{-+} - Svh_{11}^{--}$ is calculated. An output signal $Svh_{11}$ in the sixth detection operation is calculated based on a difference between the output signal $Svh_{11}^+$ and the output signal $Svh_{11}^-$.

In the seventh detection operations illustrated in FIGS. 27A and 27B, in the code division selection driving in the second direction $D_y$, selection similar to that in FIGS. 26A and 26B is performed. In the seventh detection operation, in the code division selection driving in the first direction $D_x$, the first electrodes 25 of the detection electrode blocks 25B(m) and 25B(m+1) are selected as the first detection electrodes of the square matrix $H_h$, corresponding to the elements "1" in the third row of the square matrix $H_h$. Further, the first electrodes 25 of the detection electrode blocks 25B(m+2) and 25B(m+3) are selected as the second detection electrodes of the square matrix $H_h$, corresponding to the elements "−1" in the third row of the square matrix $H_h$.

In the positive sign selection operation $Te_{12}^+$ of the seventh detection operation illustrated in FIG. 27A, the output signal $Svh_{12}^+ = Svh_{12}^{++} - Svh_{12}^{+-}$ is calculated. In the negative sign selection operation $Te_{12}^-$ of the seventh detection operation illustrated in FIG. 27B, an output signal $Svh_{12}^- = Svh_{12}^{-+} - Svh_{12}^{--}$ is calculated. An output signal $Svh_{12}$ in the seventh detection operation is calculated based on a difference between the output signal $Svh_{12}^+$ and the output signal $Svh_{12}^-$.

In the eighth detection operations illustrated in FIGS. 27C and 27D, in the code division selection driving in the second direction $D_y$, selection similar to that in FIGS. 26A and 26B is performed. In the eighth detection operation, in the code division selection driving in the first direction $D_x$, the first electrodes 25 of the detection electrode blocks 25B(m) and 25B(m+3) are selected as the first detection electrodes of the square matrix $H_h$, corresponding to the elements "1" in the fourth row of the square matrix $H_h$. Further, the first electrodes 25 of the detection electrode blocks 25B(m+1) and 25B(m+2) are selected as the second detection electrodes of the square matrix $H_h$, corresponding to the elements "−1" in the fourth row of the square matrix $H_h$.

In the positive sign selection operation $Te_{13}^+$ of the eighth detection operation illustrated in FIG. 27C, the output signal $Svh_{13}^+ = Svh_{13}^{++} - Svh_{13}^{+-}$ is calculated. In the negative sign selection operation $Te_{13}^-$ of the eighth detection operation illustrated in FIG. 27D, an output signal $Svh_{13}^- = Svh_{13}^{-+} - Svh_{13}^{--}$ is calculated. An output signal $Svh_{13}$ in the eighth detection operation is calculated based on a difference between the output signal $Svh_{13}^+$ and the output signal $Svh_{13}^-$.

Figure 29A:
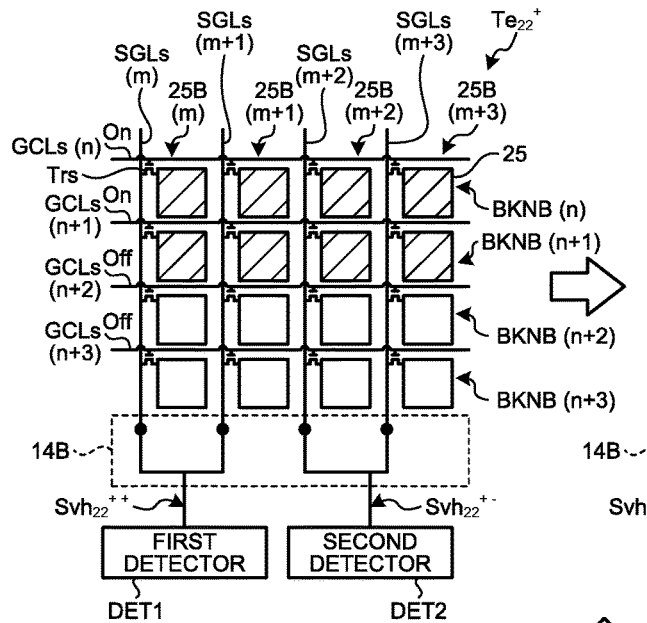
FIGS. 29A to 29D are explanatory diagrams for describing an example of a selection pattern of first electrodes selected as a detection target in eleventh and twelfth detection operations.
Figure 29B:
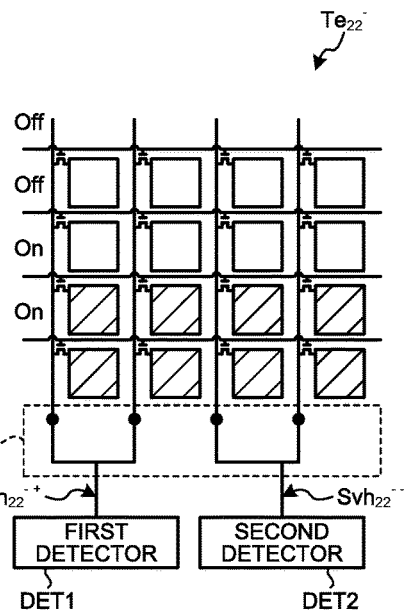
Figure 29C:
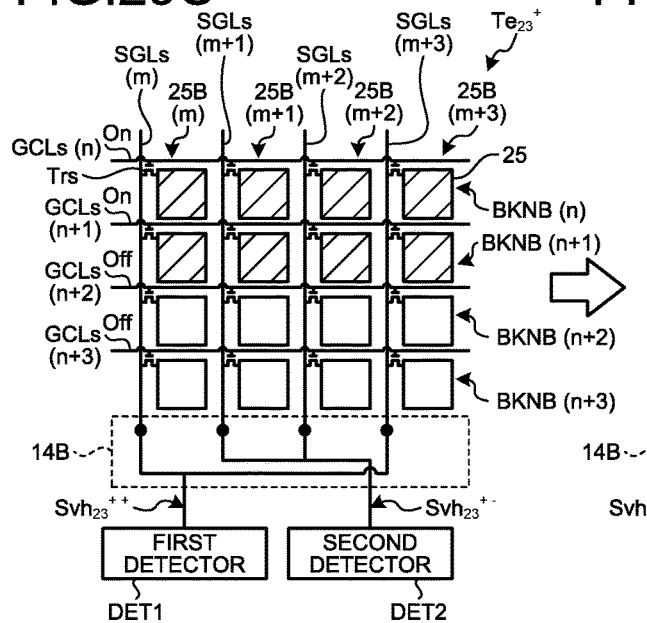
Figure 29D:
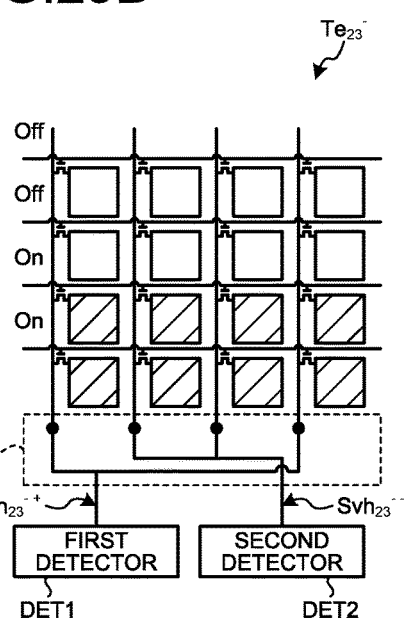

FIG. 28A illustrates a positive sign selection operation $Te_{20}^+$ of the ninth detection operation, FIG. 28B illustrates a negative sign selection operation $Te_{20}^-$ of the ninth detection operation, FIG. 28C illustrates a positive sign selection operation $Te_{21}^+$ of the tenth detection operation, and FIG. 28D illustrates a negative sign selection operation $Te_{21}^-$ of the tenth detection operation. FIG. 29A illustrates a positive sign selection operation $Te_{22}^+$ of the eleventh detection operation, FIG. 29B illustrates a negative sign selection operation $Te_{22}^-$ of the eleventh detection operation, FIG. 29C illustrates a positive sign selection operation $Te_{23}^+$ of the twelfth detection operation, and FIG. 29D illustrates a negative sign selection operation $Te_{23}^-$ of the twelfth detection operation.

As illustrated in FIGS. 28A to 28D and 29A to 29D, in the code division selection driving in the first direction $D_x$ in the ninth to twelfth detection operations, similarly to FIGS. 24A to 24D and 25A to 25D, the first electrodes 25 of the first detection electrodes of the square matrix $H_h$ and the first electrodes 25 of the second detection electrodes of the square matrix $H_h$ are selected.

In the positive sign selection operation $Te_{20}^+$ of the ninth detection operation illustrated in FIG. 28A, the first electrodes 25 of the second electrode blocks BKNB(n) and BKNB(n+1) are selected as the first electrodes 25 of the first detection electrodes of the square matrix $H_v$, corresponding to the elements "1" in the third row of the square matrix $H_v$. Further, the first electrodes 25 belonging to the detection electrode blocks 25B(m), 25B(m+1), 25B(m+2), and 25B(m+3) are selected as the first electrodes 25 of the first detection electrodes of the square matrix $H_h$, corresponding to the elements "1" in the first row of the square matrix $H_h$.

In the positive sign selection operation $Te_{20}^+$ of the ninth detection operation illustrated in FIG. 28A, an output signal $Svh_{20}^+ = Svh_{20}^{++} - Svh_{20}^{+-}$ is calculated.

In the negative sign selection operation $Te_{20}^-$ of the ninth detection operation illustrated in FIG. 28B, the first electrodes 25 of the second electrode blocks BKNB(n+2) and BKNB(n+3) are selected as the first electrodes 25 of the second detection electrodes of the square matrix $H_v$, corresponding to the elements "−1" in the third row of the square matrix $H_v$. In the negative sign selection operation $Te_{20}^-$ of the ninth detection operation illustrated in FIG. 28B, an output signal $Svh_{20}^- = Svh_{20}^{-+} - Svh_{20}^{--}$ is calculated. An output signal $Svh_{20}$ in the ninth detection operation is calculated based on a difference between the output signal $Svh_{20}^+$ and the output signal $Svh_{20}^-$.

In the tenth detection operations of FIGS. 28C and 28D, in the code division selection driving in the second direction $D_y$, selection similar to that in FIGS. 28A and 28B is performed. In the code division selection driving in the first direction $D_x$, the first electrodes 25 of the detection electrode blocks 25B(m) and 25B(m+2) are selected as the first detection electrodes of the square matrix $H_h$, corresponding to the elements "1" in the second row of the square matrix $H_h$. Further, the first electrodes 25 of the detection electrode blocks 25B(m+1) and 25B(m+3) are selected as the second detection electrodes of the square matrix $H_h$, corresponding to the elements "−1" in the second row of the square matrix $H_h$. In the positive sign selection operation $Te_{21}^+$ of the tenth detection operation illustrated in FIG. 28C, an output signal $Svh_{21}^+ = Svh_{21}^{++} - Svh_{21}^{+-}$ is calculated. In the negative sign selection operation $Te_{21}^-$ of the tenth detection operation illustrated in FIG. 28D, an output signal $Svh_{21}^- = Svh_{21}^{-+} - Svh_{21}^{--}$ is calculated. An output signal $Svh_{21}$ in the tenth detection operation is calculated based on a difference between the output signal $Svh_{21}^+$ and the output signal $Svh_{21}^-$.

In the eleventh detection operations illustrated in FIGS. 29A and 29B, in the code division selection driving in the second direction $D_y$, selection similar to that in FIGS. 28A and 28B is performed. In the eleventh detection operation, in the code division selection driving in the first direction $D_x$, the first electrodes 25 of the detection electrode blocks 25B(m) and 25B(m+1) are selected as the first detection electrodes of the square matrix $H_h$, corresponding to the elements "1" in the third row of the square matrix $H_h$. Further, the first electrodes 25 of the detection electrode blocks 25B(m+2) and 25B(m+3) are selected as the second detection electrodes of the square matrix $H_h$, corresponding to the elements "−1" in the third row of the square matrix $H_h$.

In the positive sign selection operation $Te_{22}^+$ of the eleventh detection operation illustrated in FIG. 29A, an output signal $Svh_{22}^+ = Svh_{22}^{++} - Svh_{22}^{+-}$ is calculated. In the negative sign selection operation $Te_{22}^-$ of the eleventh detection operation illustrated in FIG. 29B, an output signal $Svh_{22}^- = Svh_{22}^{-+} - Svh_{22}^{--}$ is calculated. An output signal $Svh_{22}$ in the eleventh detection operation is calculated based on a difference between the output signal $Svh_{22}^+$ and the output signal $Svh_{22}^-$.

In the twelfth detection operations illustrated in FIGS. 29C and 29D, in the code division selection driving in the second direction $D_y$, selection similar to that in FIGS. 28A and 28B is performed. In the twelfth detection operation, in the code division selection driving in the first direction $D_x$, the first electrodes 25 of the detection electrode blocks 25B(m) and 25B(m+3) are selected as the first detection electrodes of the square matrix $H_h$, corresponding to the elements "1" in the fourth row of the square matrix $H_h$. Further, the first electrodes 25 of the detection electrode blocks 25B(m+1) and 25B(m+2) are selected as the second detection electrodes of the square matrix $H_h$, corresponding to the elements "−1" in the fourth row of the square matrix $H_h$.

In the positive sign selection operation $Te_{23}^+$ of the twelfth detection operation illustrated in FIG. 29C, an output signal $Svh_{23}^+ = Svh_{23}^{++} - Svh_{23}^{+-}$ is calculated. In the negative sign selection operation $Te_{23}^-$ of the twelfth detection operation illustrated in FIG. 29D, an output signal $Svh_{23}^- = Svh_{23}^{-+} - Svh_{23}^{--}$ is calculated. An output signal $Svh_{23}$ in the twelfth detection operation is calculated based on a difference between the output signal $Svh_{23}^+$ and the output signal $Svh_{23}^-$.

Figure 30A:
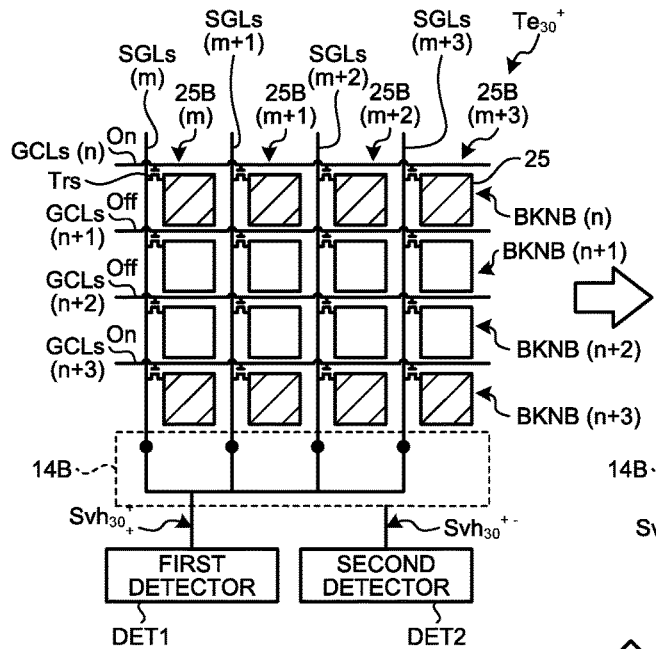
FIGS. 30A to 30D are explanatory diagrams for describing an example of a selection pattern of first electrodes selected as a detection target in thirteenth and fourteenth detection operations.
Figure 30B:
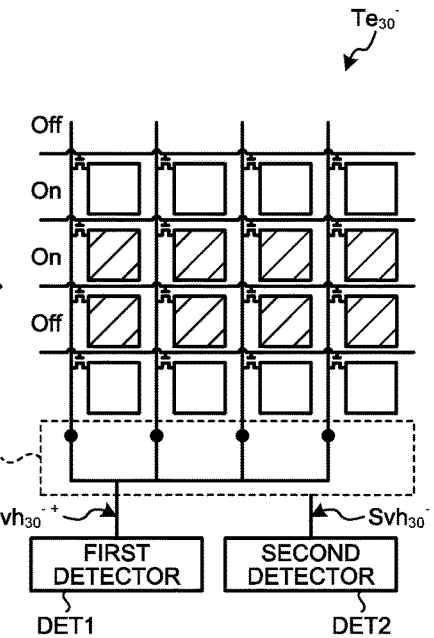
Figure 30C:
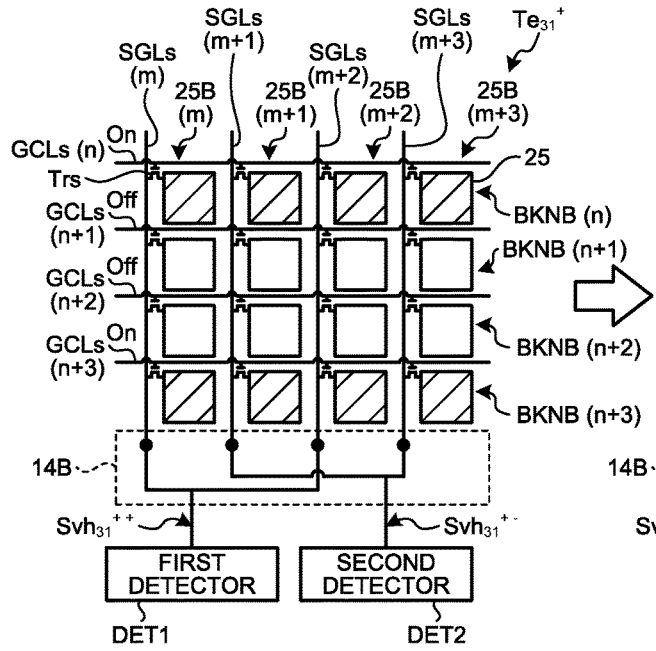
Figure 30D:
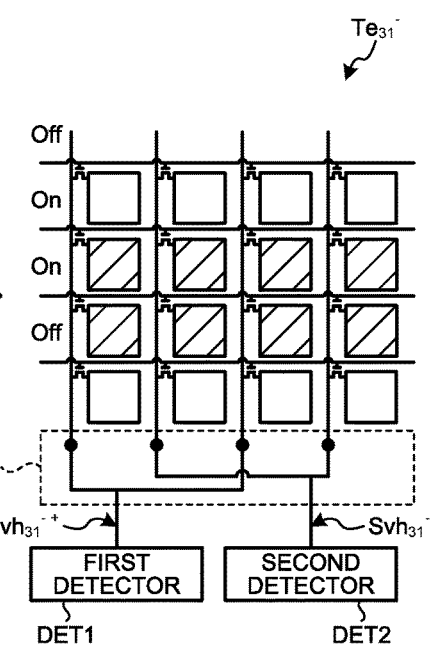
Figure 31A:
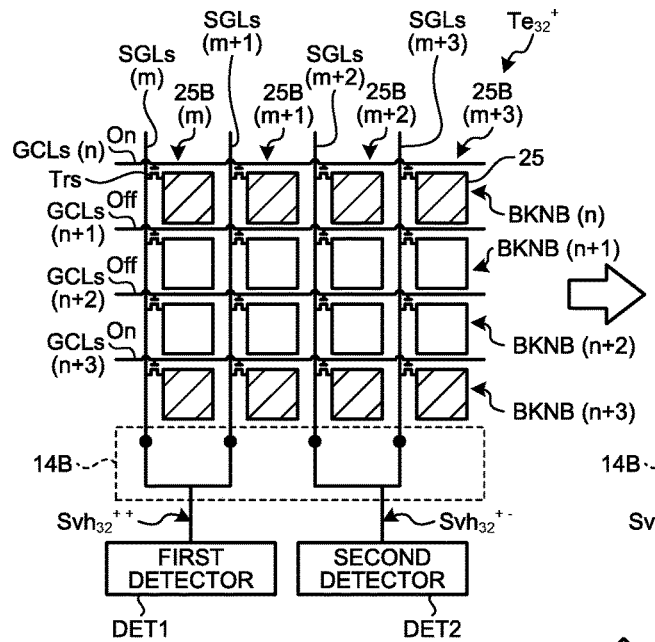
FIGS. 31A to 31D are explanatory diagrams for describing an example of a selection pattern of first electrodes selected as a detection target in fifteenth and sixteenth detection operations.
Figure 31B:
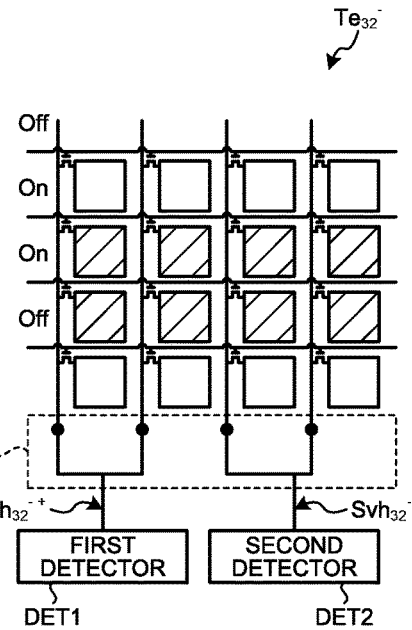
Figure 31C:
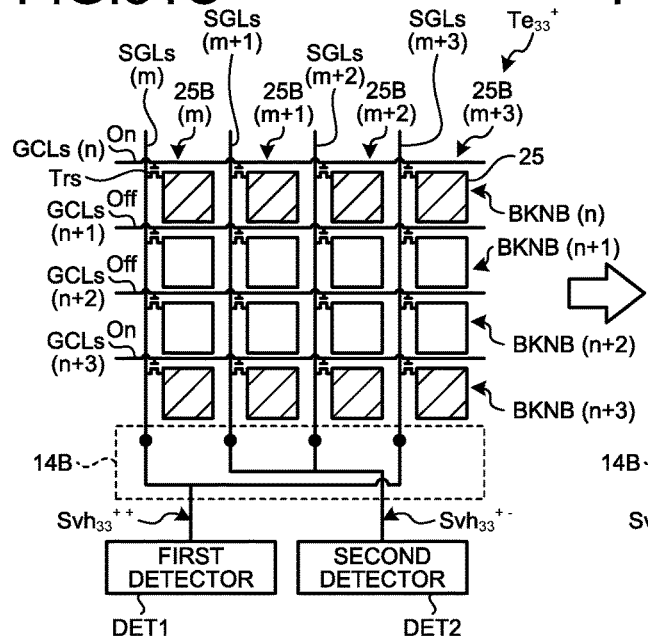
Figure 31D:
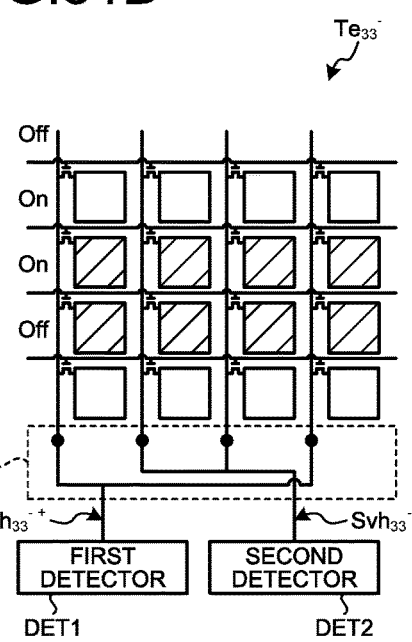

FIG. 30A illustrates the positive sign selection operation $Te_{30}^+$ of the thirteenth detection operation, FIG. 30B illustrates the negative sign selection operation $Te_{30}^-$ of the thirteenth detection operation, FIG. 30C illustrates the positive sign selection operation $Te_{31}^+$ of the fourteenth detection operation, and FIG. 30D illustrates the negative sign selection operation $Te_{31}^-$ of the fourteenth detection operation. FIG. 31A illustrates the positive sign selection operation $Te_{32}^+$ of the fifteenth detection operation, FIG. 31B illustrates the negative sign selection operation $Te_{32}^-$ of the fifteenth detection operation, FIG. 31C illustrates the positive sign selection operation $Te_{33}^+$ of the sixteenth detection operation, and FIG. 31D illustrates the negative sign selection operation $Te_{33}^-$ of the sixteenth detection operation.

As illustrated in FIGS. 30A to 30D and FIGS. 31A to 31D, in the code division selection driving in the first direction $D_x$ in the thirteenth to sixteenth detection operations, similarly to FIGS. 24A to 24D and 25A to 25D, the first electrodes 25 of the first detection electrodes of the square matrix $H_h$ and the first electrodes 25 of the second detection electrodes of the square matrix $H_h$ are selected.

In the positive sign selection operation $Te_{30}^+$ of the thirteenth detection operation illustrated in FIG. 30A, the first electrodes 25 of the second electrode blocks BKNB(n) and BKNB(n+3) are selected as the first electrodes 25 of the first detection electrodes of the square matrix $H_v$, corresponding to the elements "1" in the fourth row of the square matrix $H_v$. Further, the first electrodes 25 belonging to the detection electrode blocks 25B(m), 25B(m+1), 25B(m+2), and 25B(m+3) are selected as the first electrodes 25 of the first detection electrodes of the square matrix $H_h$, corresponding to the elements "1" in the first row of the square matrix $H_h$. In the positive sign selection operation $Te_{30}^+$ of the thirteenth detection operation illustrated in FIG. 30A, an output signal $Svh_{30}^+ = Svh_{30}^{++} - Svh_{30}^{+-}$ is calculated.

In the negative sign selection operation $Te_{30}^-$ of the thirteenth detection operation illustrated in FIG. 30B, the first electrodes 25 of the second electrode blocks BKNB(n+1) and BKNB(n+2) are selected as the first electrodes 25 of the second detection electrodes of the square matrix $H_v$, corresponding to the elements "−1" in the fourth row of the square matrix $H_v$. In the negative sign selection operation $Te_{30}^-$ of the thirteenth detection operation illustrated in FIG. 30B, an output signal $Svh_{30}^- = Svh_{30}^{-+} - Svh_{30}^{--}$ is calculated. An output signal $Svh_{30}$ in the thirteenth detection operation is calculated based on a difference between the output signal $Svh_{30}^+$ and the output signal $Svh_{30}^-$.

In the fourteenth detection operations of FIGS. 30C and 30D, in the code division selection driving in the second direction $D_y$, selection similar to that in FIGS. 30A and 30B is performed. In the code division selection driving in the first direction $D_x$, the first electrodes 25 of the detection electrode blocks 25B(m) and 25B(m+2) are selected as the first detection electrodes of the square matrix $H_h$, corresponding to the elements "1" in the second row of the square matrix $H_h$. Further, the first electrodes 25 of the detection electrode blocks 25B(m+1) and 25B(m+3) are selected as the second detection electrodes of the square matrix $H_h$, corresponding to the elements "−1" in the second row of the square matrix $H_h$. In the positive sign selection operation $Te_{31}^+$ of the fourteenth detection operation illustrated in FIG. 30C, an output signal $Svh_{31}^+ = Svh_{31}^{++} - Svh_{31}^{+-}$ is calculated. In the negative sign selection operation $Te_{31}^-$ of the fourteenth detection operation illustrated in FIG. 30D, an output signal $Svh_{31}^- = Svh_{31}^{-+} - Svh_{31}^{--}$ is calculated. An output signal $Svh_{31}$ in the fourteenth detection operation is calculated based on a difference between the output signal $Svh_{31}^+$ and the output signal $Svh_{31}^-$.

In the fifteenth detection operations in illustrated in FIGS. 31A and 31B, in the code division selection driving in the second direction $D_y$, selection similar to that in FIGS. 30A and 30B is performed. In the fifteenth detection operation, in the code division selection driving in the first direction $D_x$, the first electrodes 25 of the detection electrode blocks 25B(m) and 25B(m+1) are selected as the first detection electrodes of the square matrix $H_h$, corresponding to the elements "1" in the third row of the square matrix $H_h$. Further, the first electrodes 25 of the detection electrode blocks 25B(m+2) and 25B(m+3) are selected as the second detection electrodes of the square matrix $H_h$, corresponding to the elements "−1" in the third row of the square matrix $H_h$.

In the positive sign selection operation $Te_{32}^+$ of the fifteenth detection operation illustrated in FIG. 31A, an output signal $Svh_{32}^+ = Svh_{32}^{++} - Svh_{32}^{+-}$ is calculated. In the negative sign selection operation $Te_{32}^-$ of the fifteenth detection operation illustrated in FIG. 31B, an output signal $Svh_{32}^- = Svh_{32}^{-+} - Svh_{32}^{--}$ is calculated. An output signal $Svh_{32}$ in the fifteenth detection operation is calculated based on a difference between the output signal $Svh_{32}^+$ and the output signal $Svh_{32}^-$.

In the sixteenth detection operations illustrated in FIGS. 31C and 31D, in the code division selection driving in the second direction $D_y$, selection similar to that in FIGS. 30A and 30B is performed. In the sixteenth detection operation, in the code division selection driving in the first direction $D_x$, the first electrodes 25 of the detection electrode blocks 25B(m) and 25B(m+3) are selected as the first detection electrodes of the square matrix $H_h$, corresponding to the elements "1" in the fourth row of the square matrix $H_h$. Further, the first electrodes 25 of the detection electrode blocks 25B(m+1) and 25B(m+2) are selected as the second detection electrodes of the square matrix $H_h$, corresponding to the elements "−1" in the fourth row of the square matrix $H_h$.

In the positive sign selection operation $Te_{33}^+$ of the sixteenth detection operation illustrated in FIG. 31C, an output signal $Svh_{33}^+ = Svh_{33}^{++} - Svh_{33}^{+-}$ is calculated. In the negative sign selection operation $Te_{33}^-$ of the sixteenth detection operation illustrated in FIG. 31D, an output signal $Svh_{33}^- = Svh_{33}^{-+} - Svh_{33}^{--}$ is calculated. An output signal $Svh_{33}$ in the sixteenth detection operation is calculated based on a difference between the output signal $Svh_{33}^+$ and the output signal $Svh_{33}^-$.

As described above, the signal operation circuitry 44 (see FIG. 2) calculates data of the 16 output signals Svh through the first to sixteenth detection operations. The data of the output signal Svh is stored in the storage 47. The coordinate extractor 45 (see FIG. 2) receives the data of the output signal Svh from the storage 47, and performs the decoding process based on Formula (7).

$$Si' = H_v \times Svh \times H_h \quad (7)$$

Here, Si' indicates a decoded signal and is a matrix corresponding to the first electrodes 25 illustrated in FIGS. 24A to 31D. $H_v$ indicates the square matrix indicated by Formula (2) and is a transformation matrix of the second direction $D_y$. $H_h$ indicates the square matrix indicated by Formula (6) and is a transformation matrix of the second direction $D_y$. The coordinate extractor 45 (see FIG. 2) can calculate two-dimensional coordinates of the finger or the like that touches or approaches based on the decoded signals Si'. In the present embodiment, the decoding process is performed based on the output signal obtained by integrating the detection signals of each first electrode 25, and thus a signal strength which is sixteen times higher than in the time division selection driving is obtained without increasing a voltage of a signal value of each node.

The positive sign selection operation and the negative sign selection operation are consecutively performed, and thus it is possible to improve the noise resistance. For example, in the first detection operation illustrated in FIG. 20, the four first output signals $Svh_{00}^{++}$, the second output signal $Svh_{00}^{+-}$, the first output signals $Svh_{00}^{-+}$, the second output signal $Svh_{00}^{--}$ are preferably measured in this order when measurement is performed in the time division manner. Since the interval between the detection period of time of the first detection electrode and the detection period of time of the second detection electrode of the square matrix $H_h$ is reduced, the noise component of the each output signal is canceled. Alternatively, for example, the first output signals $Svh_{00}^{++}$, the first output signals $Svh_{00}^{-+}$, the second output signal $Svh_{00}^{+-}$, and the second output signal $Svh_{00}^{--}$ may be measured in this order. In this case, since the interval between the detection period of time of the first detection electrode and the detection period of time of the second detection electrode of the square matrix $H_v$ is reduced, the noise component of each output signal is canceled. The present invention is not limited thereto, and the negative sign selection operation may be performed after the positive sign selection operation is consecutively performed twice or more. Further, the order of each detection operation illustrated in FIGS. 24A to 31D may be appropriately changed.

Sixth Embodiment

FIG. 32 is a cross-sectional view illustrating a schematic cross-sectional structure of the display device according to the sixth embodiment. In the first to third embodiments, the example in which the first electrode 25 doubles the detection electrode of the detector 30 and the common electrode of the display panel 20 has been described, but the present invention is not limited thereto. A display device 1A illustrated in FIG. 32 includes a pixel substrate 2, a counter substrate 3 which is opposite to the pixel substrate 2, and a liquid crystal layer 6. In the pixel substrate 2, a common electrode COML is formed on a first substrate 21, and a second electrode (pixel electrode) 22 is formed above the common electrode COML with an insulating layer 24 interposed therebetween. The common electrode COML is supplied with the display drive signal Vcom having the common potential to the sub pixels SPix at the time of the display operation.

In the present embodiment, the common electrode COML, the insulating layer 24, and the second electrode 22 are stacked on the first substrate 21 in this order, but the present invention is not limited thereto. The second electrode 22, the insulating layer 24, and the common electrode COML may be stacked on the first substrate 21 in this order, and the common electrode COML and the second electrode 22 may be formed on the same layer with the insulating layer 24 interposed therebetween. Further, at least one of the common electrode COML and the second electrode 22 may be arranged above the second substrate 31. The common electrodes COML may be consecutively formed on the entire surface of a region overlapping the display region Ad (see FIG. 5) and may be distributedly formed on a plurality of regions. Further, the first electrode 25 may be formed on a different substrate from the second substrate 31, and the detector 30 may be mounted on the display panel 20.

Further, in the counter substrate 3, the color filter 32 is formed below the second substrate 31, and the first electrode 25 serving as the detection electrode is formed on the second substrate 31. In this case, the detection switching element Trs, the detection data line SGLs, the detection gate line GCLs, and the like are formed on the second substrate 31 side. In the present embodiment, the second substrate 31 and the first electrode 25 constitute the detector 30. Even in this aspect, the detector 30 can obtain excellent detection sensitivity by suppressing capacitive coupling between the first electrodes 25 through the code division selection driving.

The exemplary embodiments of the present invention have been described above, but the present invention is not limited to the above embodiments. The details disclosed in the embodiments are merely an example, and various modifications can be made within the scope not departing from the gist of the present invention. It will be appreciated that an appropriate modification made within the scope not departing from the gist of the present invention is also included in the technical scope of the present invention.

For example, the detection device may include the detector 30 with no display panel 20. In this case, it is desirable that the detection device include at least the first substrate 21, the first electrode 25, the first electrode driver 14, the detection gate driver 12B, the signal processor 40, and the controller 11. In each embodiment, the detector 30 performs the touch detection of the self-capacitance scheme, but the present invention is not limited thereto. The touch detection of the mutual-capacitance scheme may be performed. In this case, an electrode opposite to the first electrode 25 is formed, the drive signal is supplied to the first electrode 25 based on the code division selection driving, and an output signal is detected from the electrode opposite to the first electrode 25.

What is claimed is:

1. A detection device, comprising:
a plurality of first electrodes, each of the plurality of first electrodes outputting a detection signal;
a plurality of electrode groups including a first electrode group and a second electrode group, the first electrode group including a first subset of the plurality of first electrodes, and the second electrode group including a second subset of the plurality of first electrodes that is different from the first subset; and
a selection driver configured to perform a plurality of driving operations including
a first driving operation to the first subset, and
a second driving operation to the second subset,
wherein each of the plurality of driving operations includes at least one driving set including
a first driving during a first period; and
a second driving during a second period that is different from the first period,
wherein, in the first driving operation and during the first driving, the selection driver is configured to, select a plurality of first detection electrodes from the first subset in accordance with a first selection signal; and
output a plurality of first integrated signals, each of the plurality of first integrated signals being an integrated value of a plurality of first detection signals, and each of the plurality of first detection signals being output by the plurality of first detection electrodes on a one-to-one basis, and
wherein, in the first driving operation and during the second driving, the selection driver is configured to
select a plurality of second detection electrodes from the first subset in accordance with a second selection signal, the plurality of second detection electrodes being different from the plurality of first detection electrodes, and the second selection signal being different from the first selection signal,
output a plurality of second integrated signals, the plurality of second integrated signals being an integrated value of a plurality of second detection signals, and each of the plurality of second detection signals being output by the plurality of second detection electrodes on a one-to-one basis,
wherein, in the second driving operation and during the first driving, the selection driver is configured to
select a plurality of first detection electrodes from the second subset in accordance with a first selection signal; and
output a plurality of first integrated signals, each of the plurality of first integrated signals being an integrated value of a plurality of first detection signals, and each of the plurality of first detection signals being output by the plurality of first detection electrodes on a one-to-one basis, and
wherein, in the second driving operation and during the second driving, the selection driver is configured to
select a plurality of second detection electrodes from the second subset in accordance with a second selection signal, the plurality of second detection electrodes being different from the plurality of first detection electrodes, and the second selection signal being different from the first selection signal, and
output a plurality of second integrated signals, each of the plurality of second integrated signals being an integrated value of a plurality of second detection signals, and each of the plurality of second detection signals being output by the plurality of second detection electrodes on a one-to-one basis, and
wherein the plurality of first detection electrodes selected in the first driving operation are different from the plurality of first detection electrodes selected in the second driving operation.

2. The detection device according to claim 1, wherein, the selection driver is configured to supply a drive signal to one of the plurality of first electrodes,
wherein the one of the plurality of first electrodes is supplied with the drive signal and outputs the detection signal based on a change in capacitance of the one of the plurality of first electrodes.

3. The detection device according to claim 1,
wherein at least one of the plurality of first detection electrodes or the plurality of second detection electrodes includes two or more first electrodes coupled to a common data line.

4. The detection device according to claim 1,
wherein the first selection signal and the second selection signal are generated based on a predetermined code.

5. The detection device according to claim 1,
wherein the first selection signal includes a plurality of first selection patterns,
the selection driver is configured to select the plurality of first detection electrodes from one of the plurality of electrode groups on a basis of the plurality of first selection patterns, and
a number of the plurality of first selection patterns is equal to a number of first electrodes included in the first subset.

6. The detection device according to claim 5,
wherein the second selection signal includes a plurality of second selection patterns,
the selection driver is configured to select the plurality of second detection electrodes from the first subset on a basis of the plurality of second selection patterns, and
a number of the plurality of second selection patterns is equal to the number of the plurality of first selection patterns.

7. The detection device according to claim 1,
wherein the detection signal of one of the plurality of first electrodes is calculated based on the plurality of first integrated signals and the plurality of second integrated signals in each of the first driving operation and the second driving operation.

8. The detection device according to claim 1, wherein each of the first driving operation and the second driving operation includes the at least one driving set consisting of:
the first driving during the first period; and
the second driving during the second period, and
the first period and the second period are consecutively arranged.

9. The detection device according to claim 1,
wherein the selection driver includes an inverting circuit configured to generate the second selection signal by inverting a high level portion and a low level portion of the first selection signal.

10. The detection device according to claim 1,
wherein the selection driver is configured to
supply a first drive signal to one of the plurality of first detection electrodes; and
supply a second drive signal to one of the plurality of second detection electrodes, and
the first drive signal and the second drive signal have different polarities.

11. The detection device according to claim 1,
wherein the selection driver is configured to
supply a first drive signal to one of the plurality of first detection electrodes; and
supply a second drive signal to one of the plurality of second detection electrodes, and
the first drive signal and the second drive signal have the same polarity.

12. The detection device according to claim 1, further comprising a plurality of switches,
wherein the plurality of first electrodes are present in a matrix form and are coupled to the plurality of switches on one-to-one basis, and
the selection driver is configured to supply a scanning signal to respective gate lines of the plurality of switches coupled to the plurality of first electrodes.

13. The detection device according to claim 1,
wherein the selection driver is configured to perform the plurality of driving operations including the at least one driving set consisting of:
the first driving during the first period, and
the second driving during the second period following the first period.

14. The detection device according to claim 1,
wherein the second driving further includes a case in which the selection driver does not select one of the plurality of first electrodes from the first subset in the first driving operation, and
the second driving further includes a case in which the selection driver does not select one of the plurality of first electrodes from the second subset in the second driving operation.

15. The detection device according to claim 1,
wherein the second driving further includes a case in which the selection driver selects only one of the plurality of first electrodes from the first subset in the first driving operation, and
wherein the second driving further includes a case in which the selection driver selects only one of the plurality of first electrodes from the second subset in the second driving operation.

16. The detection device according to claim 1, wherein
in the first driving operation, the plurality of second detection electrodes are all of the plurality of first electrodes other than the plurality of first detection electrodes among the first subset of the first electrode group, and
in the second driving operation, the plurality of second detection electrodes are all of the plurality of first electrodes other than the plurality of first detection electrodes among the second subset of the second electrode group.

17. A display device, comprising:
a display function layer that displays an image;
a plurality of first electrodes, each of the plurality of first electrodes outputting a detection signal;
a plurality of electrode groups including a first electrode group and a second electrode group, the first electrode group including a first subset of the plurality of first electrodes, and the second electrode group includes a second subset of the plurality of first electrodes that is different from the first subset; and
a selection driver configured to perform a plurality of driving operations including
a first driving operation to the first subset, and
a second driving operation to the second subset,
wherein each of the plurality of driving operations includes at least one driving set including
a first driving during a first period; and
a second driving during a second period that is different from the first period,
wherein, in the first driving operation and during the first driving, the selection driver is configured to
select a plurality of first detection electrodes from the first subset according to a first selection signal; and
output a plurality of first integrated signals, each of the plurality of first integrated signals being an integrated value of a plurality of first detection signals, and each of the plurality of first detection signals being output by the plurality of first detection electrodes on a one-to-one basis,
wherein, in the first driving operation, and during the second driving, the selection driver is configured to
select a plurality of second detection electrodes from the first subset in accordance with a second selection signal, the plurality of second detection electrodes being different from the plurality of first detection electrodes, and the second selection signal being different from the first selection signal, and output a plurality of second integrated signals, each of the plurality of second integrated signals being an integrated value of a plurality of second detection signals, and each of the plurality of second detection signals being output by the plurality of second detection electrodes on a one-to-one basis, wherein, in the second driving operation and during the first driving, the selection driver is configured to select a plurality of first detection electrodes from the second subset in accordance with a first selection signal, and output a plurality of first integrated signals, each of the plurality of first integrated signals being an integrated value of a plurality of first detection signals, and each of the plurality of first detection signals being output by the plurality of first detection electrodes on a one-to-one basis, and wherein, in the second driving operation and during the second driving, the selection driver is configured to select a plurality of second detection electrodes from the second subset in accordance with a second selection signal, the plurality of second detection electrodes being different from the plurality of first detection electrodes, and the second selection signal being different from the first selection signal, and output a plurality of second integrated signals, each of the plurality of second integrated signals being an integrated value of a plurality of second detection signals, and each of the plurality of second detection signals being output by the plurality of second detection electrodes on a one-to-one basis, and wherein the plurality of first detection electrodes selected in the first driving operation are different from the plurality of first detection electrodes selected in the second driving operation.

18. The display device according to claim 17, further comprising:

a plurality of second electrodes that are opposite to the plurality of first electrodes, wherein the display function layer is controlled through the plurality of first electrodes and the plurality of second electrodes.

19. A detection method of a detection device including a plurality of first electrodes, each of the plurality of first electrodes outputting a detection signal;

a plurality of electrode groups including a first electrode group and a second electrode group, the first electrode group including a first subset of the plurality of first electrodes, and the second electrode group includes a second subset of the plurality of first electrodes that is different from the first subset and a selection driver configured to perform a plurality of driving operations including a first driving operation to the first subset, and a second driving operation to the second subset, wherein each of the plurality of driving operations includes at least one driving set including a first driving during a first period; and a second driving during a second period that is different from the first period, the detection method comprising in the first driving operation and during the first driving, selecting a plurality of first detection electrodes from the first electrode group according to a first selection signal; and outputting a plurality of first integrated signals, each of the plurality of first integrated signals being an integrated value of a plurality of first detection signals, and each of the plurality of first detection signals being output by the plurality of first detection electrodes on a one-to-one basis, and in the first driving operation and during the second driving, selecting a plurality of second detection electrodes from the first electrode group in accordance with a second selection signal, the plurality of second detection electrodes being different from the plurality of first detection electrodes, and the second selection signal being different from the first selection signal, and outputting a plurality of second integrated signals, each of the plurality of second integrated signals being an integrated value of a plurality of second detection signals, and each of the plurality of second detection signals being output by the plurality of second detection electrodes on a one-to-one basis, in the second driving operation and during the first driving, selecting a plurality of first detection electrodes from the second subset according to a first selection signal; and outputting a plurality of first integrated signals, each of the plurality of first integrated signals being an integrated value of a plurality of first detection signals, and each of the plurality of first detection signals being output by the plurality of first detection electrodes on a one-to-one basis, and in the second driving operation and during the second driving, selecting a plurality of second detection electrodes from the second subset in accordance with a second selection signal, the plurality of second detection electrodes being different from the plurality of first detection electrodes, and the second selection signal being different from the first selection signal, and outputting a plurality of second integrated signals, each of the plurality of second integrated signals being an integrated value of a plurality of second detection signals, and each of the plurality of second detection signals being output by the plurality of second detection electrodes on a one-to-one basis, wherein the plurality of first detection electrodes selected in the first driving operation are different from the plurality of first detection electrodes selected in the second driving operation.

* * * * *